United States Patent
Clem et al.

(10) Patent No.: US 9,262,915 B2
(45) Date of Patent: Feb. 16, 2016

(54) INTELLIGENT URBAN COMMUNICATIONS PORTAL AND METHODS

(71) Applicant: KERBspace, Inc., Bozeman, MT (US)

(72) Inventors: William E Clem, Bozeman, MT (US); Leif Summerfield, Bozeman, MT (US)

(73) Assignee: KERBspace, Inc, Bozeman, MT (US)

( * ) Notice: Subject to any disclaimer, the term of this patent is extended or adjusted under 35 U.S.C. 154(b) by 0 days.

(21) Appl. No.: 14/274,633

(22) Filed: May 9, 2014

(65) Prior Publication Data

US 2014/0335897 A1 Nov. 13, 2014

Related U.S. Application Data

(60) Provisional application No. 61/821,410, filed on May 9, 2013, provisional application No. 61/821,700, filed on May 9, 2013.

(51) Int. Cl.
| | |
|---|---|
| *H04W 24/00* | (2009.01) |
| *G08G 1/01* | (2006.01) |
| *H04W 4/02* | (2009.01) |
| *H04W 4/04* | (2009.01) |

(Continued)

(52) U.S. Cl.
CPC ............ *G08G 1/0112* (2013.01); *G08G 1/0116* (2013.01); *G08G 1/0133* (2013.01); *G08G 1/0145* (2013.01); *G08G 1/08* (2013.01); *G08G 1/144* (2013.01); *G08G 1/147* (2013.01); *G08G 1/148* (2013.01); *H04W 4/021* (2013.01); *H04W 4/046* (2013.01)

(58) Field of Classification Search
CPC ... H04W 4/02; H04W 64/00; H04L 29/68657
USPC ............ 455/456.3, 456.1, 404.2, 414.1
See application file for complete search history.

(56) References Cited

U.S. PATENT DOCUMENTS

| | | | |
|---|---|---|---|
| 7,102,504 B2 | 9/2006 | Kates | |
| 7,555,658 B2 | 6/2009 | Vahid | |
| 8,275,404 B2 * | 9/2012 | Berger | .......... G06Q 10/06 455/404.1 |

(Continued)

FOREIGN PATENT DOCUMENTS

WO 2011057287 5/2011

OTHER PUBLICATIONS

Parameswaran, M et al. 2009. Is RSSI a Reliable Parameter in Sensor Localization Algorithms—an experimental study.

(Continued)

*Primary Examiner* — Nghi H Ly
(74) *Attorney, Agent, or Firm* — K Karel Lambert; Lambert Patent Service LLC

(57) ABSTRACT

A system, device, and methods for monitoring and responding to information needs of users in an urban grid or local map area. The system is a platform to virtualize an urban space, provide map overlayers with local data content, and allow users to access personalized content having relevance based on proximity, location, time, and keyword search criteria such as guest entries, local ties recent user internet activity, time of day, special events related to a user's profile, appointments in a user's calendar, traffic conditions, destinations along a user's footpath having possible significance, schedules and routes for transit, taxi or rental information for visitors, environmental conditions, and the like. In a second embodiment, the system may be expanded to assist guests with parking and traffic management issues.

11 Claims, 31 Drawing Sheets

(51) Int. Cl.
*G08G 1/08* (2006.01)
*G08G 1/14* (2006.01)

(56) References Cited

U.S. PATENT DOCUMENTS

| | | | |
|---|---|---|---|
| 8,299,920 B2 | 10/2012 | Hamm | |
| 8,421,619 B2 | 4/2013 | Scalisi | |
| 8,559,977 B2* | 10/2013 | Busch | H04W 4/02 455/456.1 |
| 8,600,406 B2 | 12/2013 | Pan | |
| 8,604,925 B2 | 12/2013 | Monte | |
| 8,620,343 B1 | 12/2013 | Lau | |
| 8,620,841 B1 | 12/2013 | Filson | |
| 8,665,784 B2 | 3/2014 | Kang | |
| 8,761,804 B2 | 6/2014 | Johnson | |
| 8,812,013 B2 | 8/2014 | Agarwal | |
| 8,812,028 B2 | 8/2014 | Yariv | |
| 8,880,204 B2 | 11/2014 | Frei | |
| 8,942,732 B2 | 1/2015 | Johnson | |
| 2003/0133594 A1 | 7/2003 | Sefton | |
| 2003/0144890 A1 | 7/2003 | Dan | |
| 2004/0252034 A1 | 12/2004 | Slemmer | |
| 2005/0083212 A1 | 4/2005 | Chew | |
| 2005/0280555 A1 | 12/2005 | Warner | |
| 2006/0170566 A1 | 8/2006 | Slemmer | |
| 2007/0040701 A1 | 2/2007 | Browne | |
| 2007/0061192 A1 | 3/2007 | Chew | |
| 2007/0155401 A1* | 7/2007 | Ward | H04W 64/00 455/456.1 |
| 2007/0192910 A1* | 8/2007 | Vu | B25J 5/007 700/245 |
| 2009/0309760 A1 | 12/2009 | Chew | |
| 2010/0069035 A1* | 3/2010 | Johnson | H04W 4/02 455/404.1 |
| 2011/0099126 A1 | 4/2011 | Belani | |
| 2011/0254760 A1 | 10/2011 | Lloyd | |
| 2012/0052870 A1 | 3/2012 | Habicher | |
| 2012/0062395 A1 | 3/2012 | Sonnabend | |
| 2012/0092190 A1 | 4/2012 | Stefik | |
| 2012/0092191 A1 | 4/2012 | Stefik | |
| 2012/0127308 A1 | 5/2012 | Eldershaw | |
| 2013/0147954 A1 | 6/2013 | Song | |
| 2013/0166198 A1 | 6/2013 | Funk | |
| 2015/0005011 A1 | 1/2015 | Bluecats | |

OTHER PUBLICATIONS

Culler D et al. 2002. MICA The commercialization of microsensor motes. Sensors Online Apr. 2002.

Parameswaran AT et al. 2009. Is RSSI a reliable parameter is sensor localization algorithms—an experimental study. Field Failure Data Analysis Workshop (F2DA09), 5 pp.

* cited by examiner

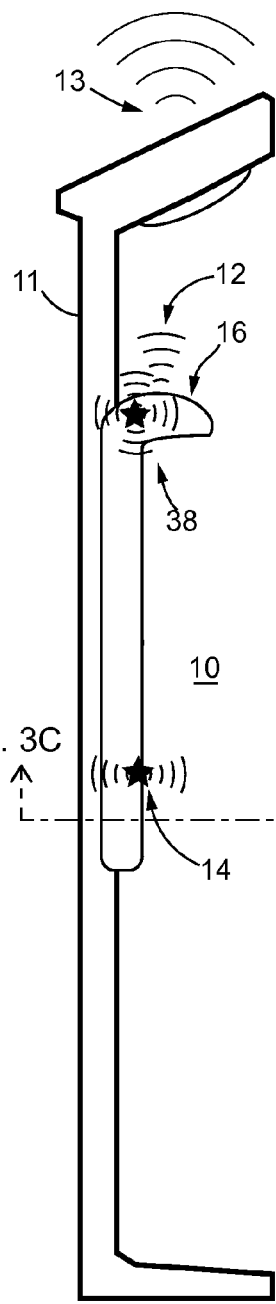
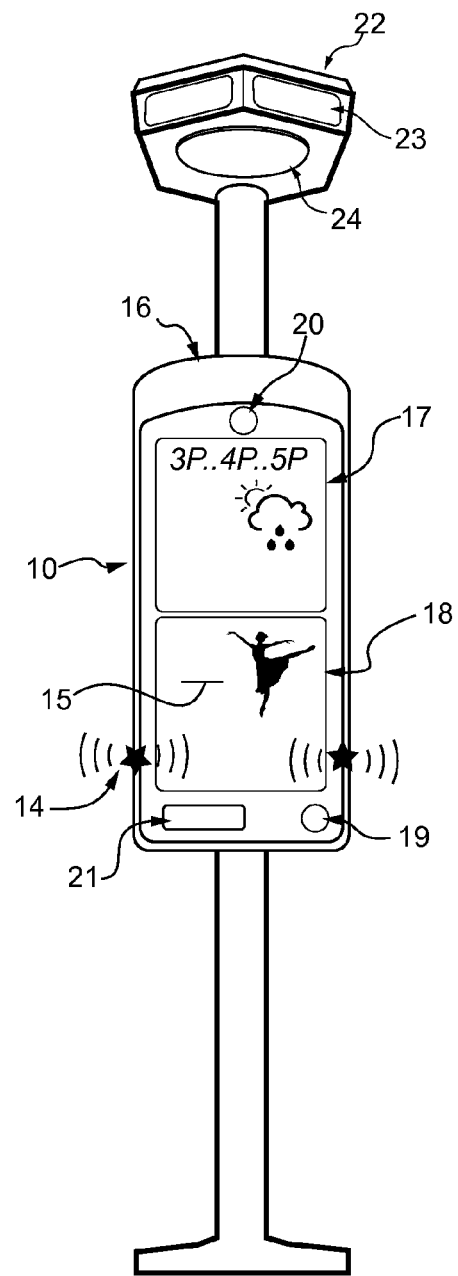
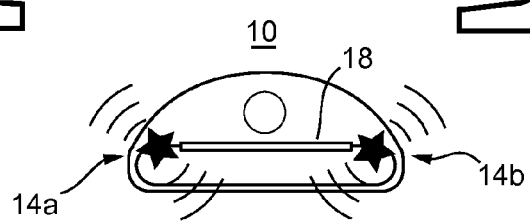
*Fig. 3A*
*Fig. 3B*
*Fig. 3C*

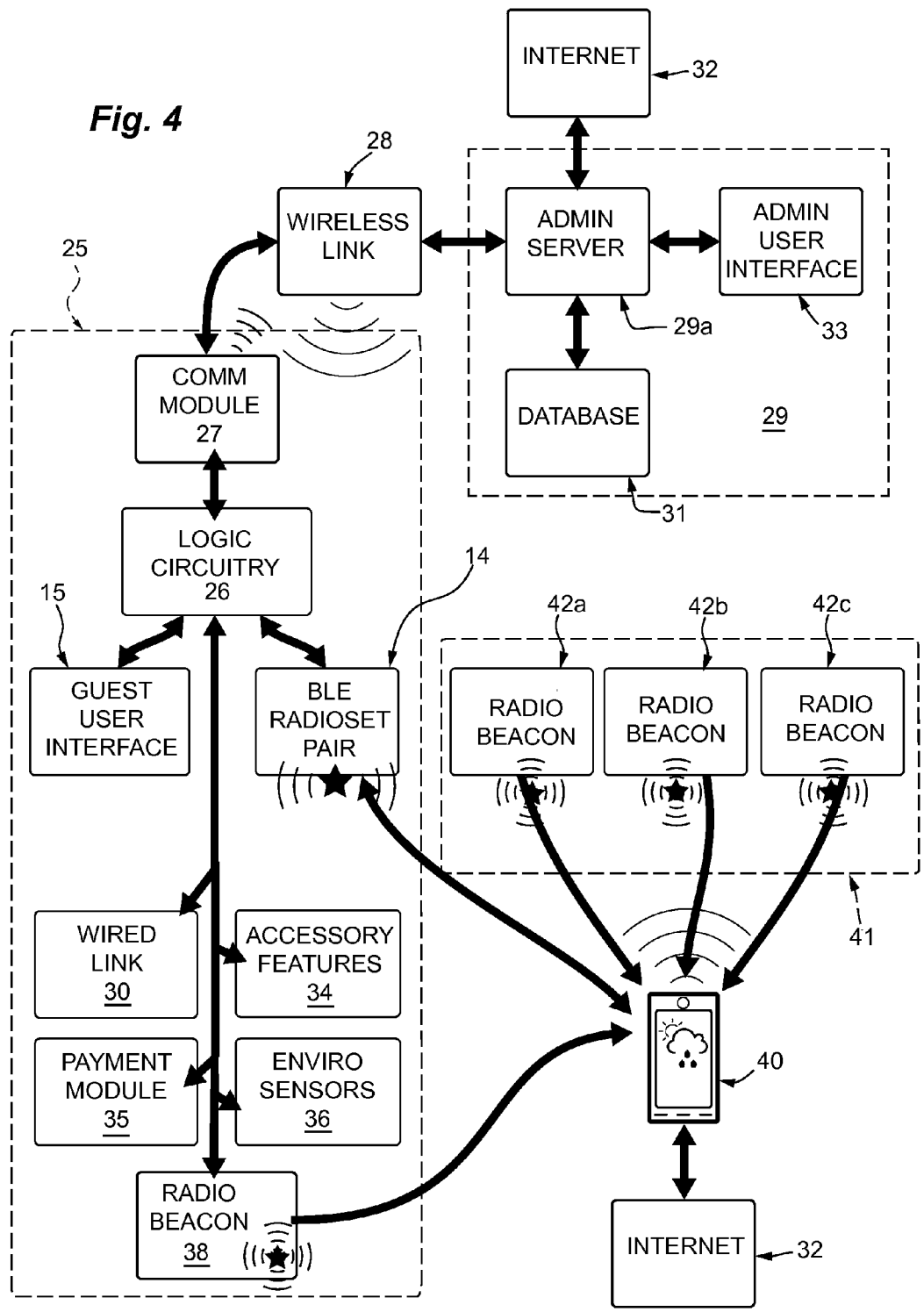

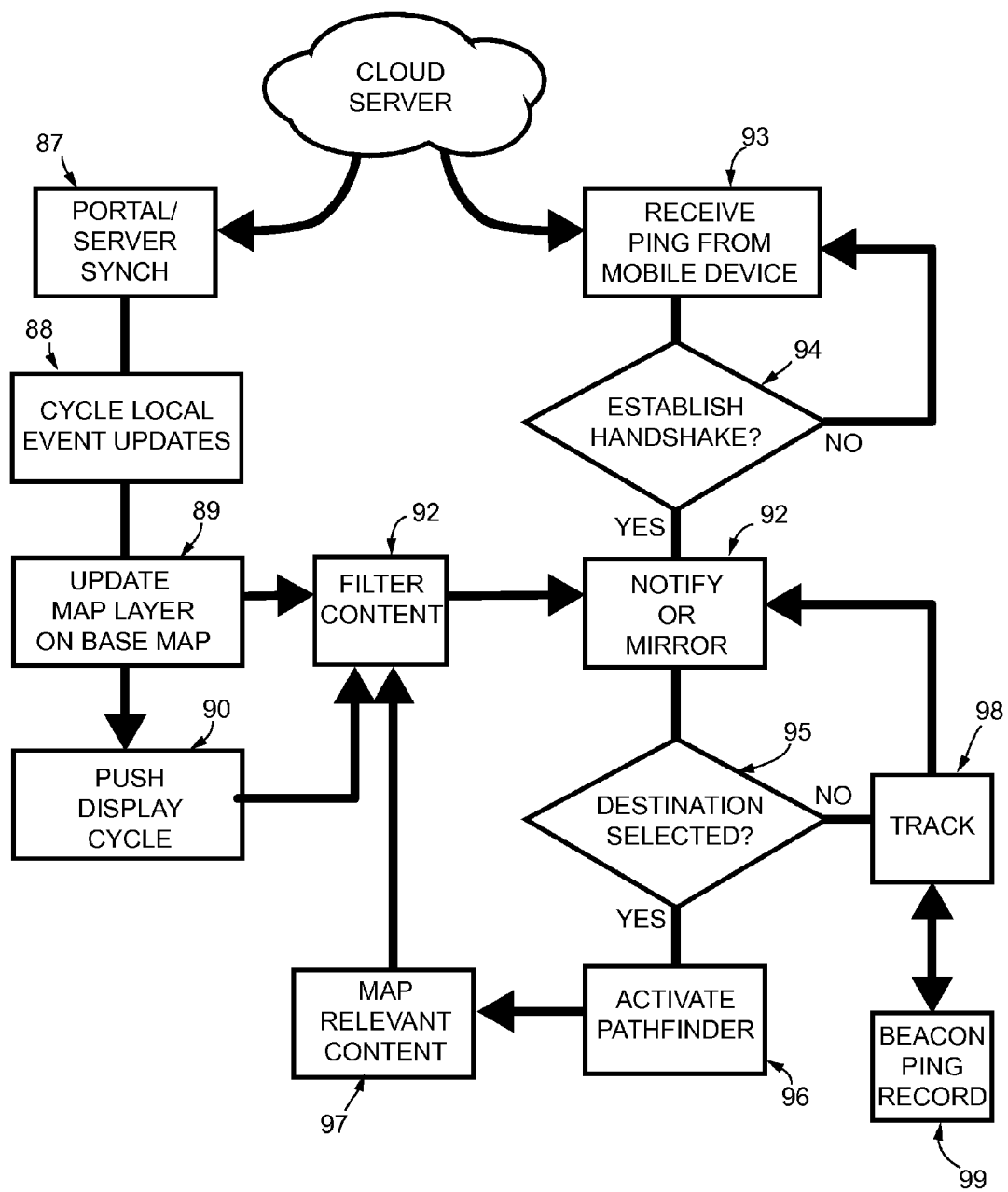

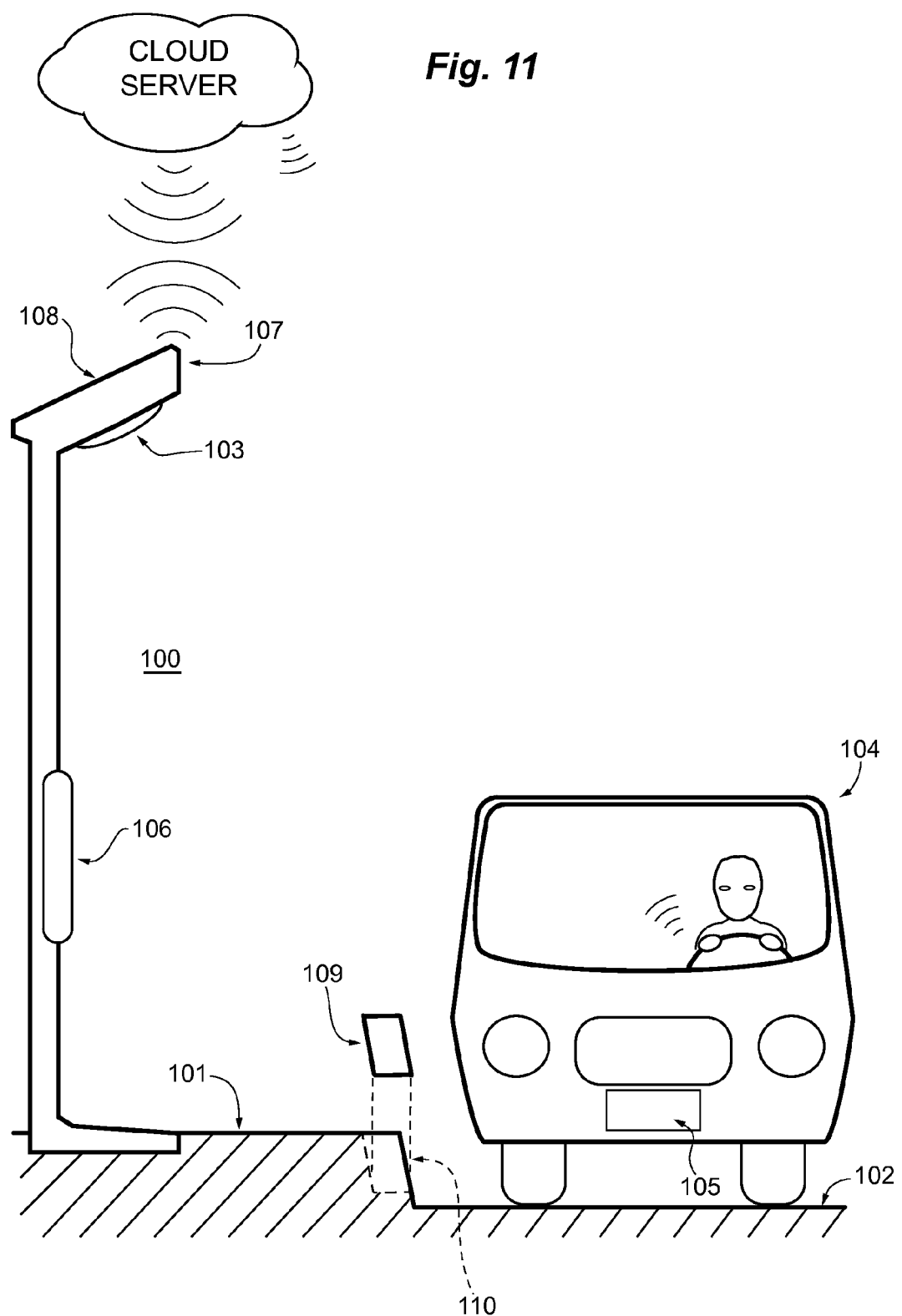

Fig. 15A
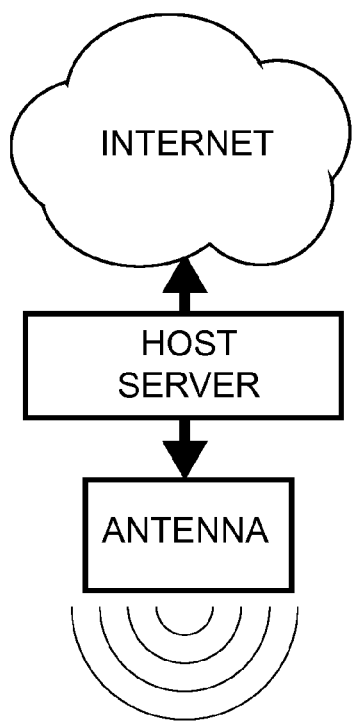
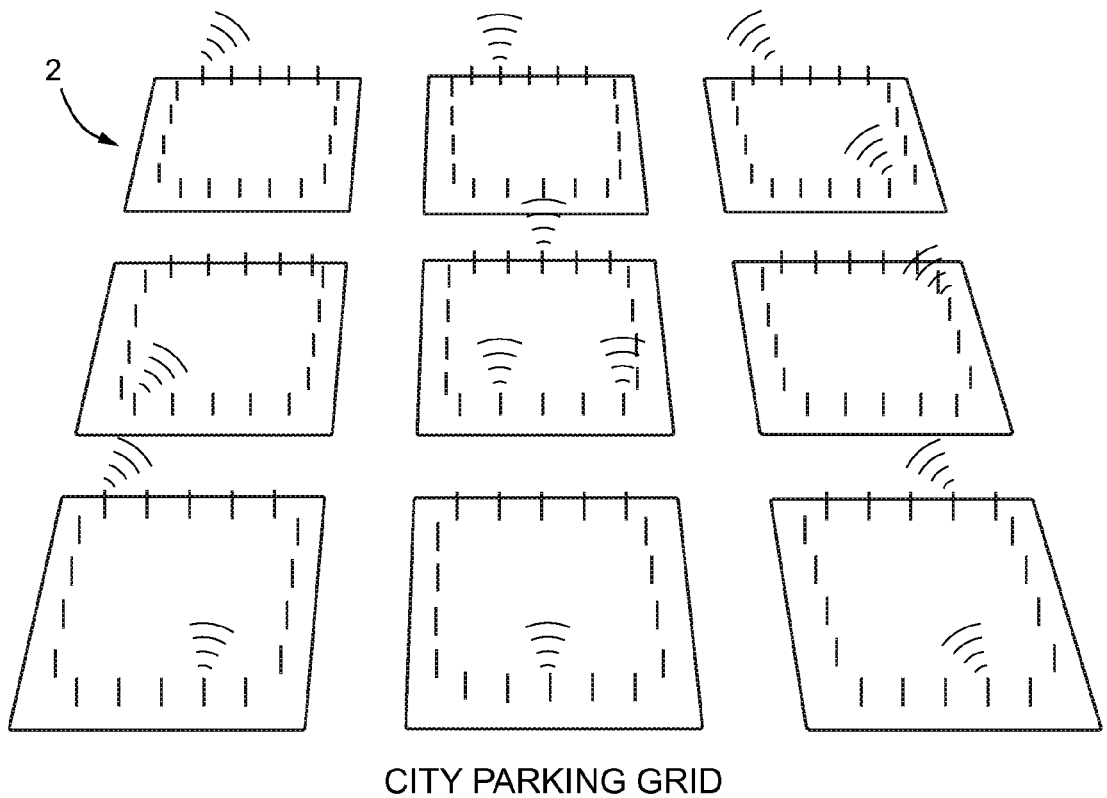
CITY PARKING GRID

WIRELESSLY INTEGRATED CLOSED LOOP

INTELLIGENT URBAN COMMUNICATIONS PORTAL AND METHODS

CROSS-REFERENCE TO RELATED APPLICATIONS

This application is related to and claims priority to U.S. Provisional Patent Application No. 61/821,410 filed 9 May 2013, and U.S. Provisional Patent Application No. 61/821700 filed 09 May 2013, which are herein incorporated in full by reference for all purposes.

GOVERNMENT SUPPORT

Not applicable.

FIELD OF THE INVENTION

This invention is related to digital systems having one or more urban portal devices, each portal detecting activity of a mobile device in a local area, wherein the portal(s) cooperate with remote radio beacons to map the local area and to provide map overlays having locally relevant information, which is then made available on sidewalk displays or on viewscreens of the mobile device. The system generally includes a cloud server with administrative database and functions to contact, engage, and escort guests in the local urban grid through an application loaded on the guest's mobile device.

BACKGROUND

Urban environments, when scaled to the people who live work and visit there, can be very secure and satisfying as places that offer endless opportunities for exploration and making connections. Many persons prefer to live and work in a city because of the wide range of resources that are offered. But first time visitors, commuters, and residents not familiar with a locale will miss or not appreciate much of the richness in an urban neighborhood, particularly given the bustle and hubbub of traffic and signage that is a sort of chaos or veil behind which the real city lives. Distributed access to digital information offers the opportunity to pierce that veil, and readily accessible local information that is sorted for relevance according to the needs of a guest offers a way to empower visitors, revitalize downtown economic development, foster small business, and improve the efficiency of cities in providing for people's needs.

Efforts have been made to focus on developing intelligent infrastructure. Potential applications have include parking control, dispatch of emergency services, detection of the sound of gunshots, and so forth. However substantial improvements are needed to avoid the expense of large scale capital investment in hardware, and the inherent capabilities already built into mobile devices have not been fully realized because pieces of a "closed loop" that would tie users into the smart grid are still missing.

For example, parking spaces are valuable resources, particularly in urban cores and in parking complexes such as airports, shopping centers, or sports arenas. Parking space use affects traffic, deliveries, pollution, gas mileage, and alternate transportation options. A parking space administrator desires to manage parking spaces for a broad constituency with multiple and sometimes conflicting needs. But currently, parking control is a very inefficient and chaotic process, as vehicles circle looking for available parking spaces and drivers negotiate a jungle of bewildering signs and regulations. FIG. 1 illustrates the disorder inherent in this process, which has developed by accretion and at times seems to lack any organizing principle whatsoever. This stressful situation certainly contributes to heart and lung diseases worldwide, and is in need of a remedy.

In its most malignant form, rows of traffic lights function asynchronously through the grid, so that when one is green, the next one is red, thereby limiting traffic movement to a slow drip of a few cars at a time. According to recent figures, the work involved in synchronizing traffic lights for a small urban core costs several hundred thousand dollars, and the synchronicity achieved decays rapidly. Efforts to coordinate the actions of individuals engaged in parking could lead to improvements in overall traffic flow, but has never been attempted, and is difficult to contemplate how it might work and what the outcome would be.

While efforts have been made, these limitations are illustrated for example in US Pat. Publ. Nos. 2012/0092190 and US2012/0127308 to Xerox, of which some of the concepts for "smart cities" have been implemented in Riverside, Calif.

Better optimization can also improve parking fee collection, which is a significant source of revenue for some venues. But without employing work crews to attend to the signage and enforce the regulations, limited or no capacity exists to make changes to parking space usage or pricing, and post special or temporary restrictions. In most cities and event centers, large bureaucracies exist to manage and control parking and change occurs at the pace of annual budget cycles. At this time, no ability exists to remotely coordinate parking needs with drivers, monitor usage, and revise posted parking regulations when needed, in real time.

Thus, there is a need in the art for an apparatus and system to monitor and access urban resources that overcomes the above disadvantages and offers resources to city administrators and to guest users to minimize inefficiencies and to optimize the urban experience. An optimal solution addresses needs of both vehicles and pedestrians.

SUMMARY

In a first representative embodiment, the invention is a system for assisting guest users in managing and enjoying city life. When travelling by foot, by vehicle, or by mass transit, the system captures the user's attention, engages the user's needs, and escorts the user through the urban jungle. The user is guided by a wireless urban communications portal and urban interface system, preferably in conjunction with a network of radio transmitters (termed here "beacons"), that converts any mobile device into a means for receiving context-sensitive, timely and relevant information about the local environment, including businesses, sights to see, news alerts, transit routes, connections and schedules, directions, special offers, and so forth. Advantageously, the system provides a guest user with locally relevant and timely digital content in support of going places in the urban space, reducing time searching, increasing the opportunities for serendipitous interactions with places or people of interest, minimizing energy needed to run errands, and adding to the fun of exploring, for example.

The system may also deliver local content directly to a guest through public display screens mounted on the urban portal devices, thereby offering services to guests who do not have a mobile device or are not using one. Thus the system can engage users of mobile devices even when the devices are off or are locked, and can also engage guests who do not have a mobile device.

However, in a preferred embodiment, the urban communications system includes a) one or more mobile devices, each device having a unique address or handle associated with a guest user; b) an urban communications portal, and a navigational software application compatible with the mobile device. The portal device features a prominent display screen, including touch-responsive graphical guest interface, and at least one short-range radio receiver adapted to be in digital communication with a plurality of mobile devices and beacons within a defined area around the portal. The portal also includes a processor with memory and program instructions, where the processor is programmed to detect mobile devices within range and to establishing a communications link with the mobile devices.

The processor is enabled to display local contents on the large display screen of the portal and also to mirror that information onto the small viewscreen of a mobile device in response to a guest's query. The query may be simply a touch of a finger on something interesting in the display stream, which is parsed as a search term for accessing available local content that is relevant, the query may be based on a user profile established by the guest such as through a social media provider, or a query may be based on keywords mined from the guest's recent search activity or messaging, perhaps supplemented with keywords entered by the guest, such that the portal, aided by an administrative cloud-based server, is able to supply local information based on keyword relevance, timeliness, and proximity.

The relevant content appears as one or more map overlays on a physical base map of the defined area and is dynamic content. Closed feedback loops form between the urban interface and the guest user as the search is iteratively refined and updated by the guest or as changes in local conditions are sensed by the system. Information focuses on local information relevant to the "now", and will include offers such as "fresh bread", "free coffee," "special price", 6 o'clock show, rain at 7 PM, and other information that can enrich the urban experience for those who receive it. "Where to go?" is a key piece of information that is received, and the system supplies detailed directions and landmarks, including an interactive stepwise feature that highlights the virtual pathway the guest should follow and screenshots of the sights along the way. Thus the system will engage and escort the guest through the defined area. By erecting a series of portals, guests may be seamlessly directed through larger areas of the urban grid.

In instances when the guest's mobile device is locked, the system will nonetheless detect the presence of the mobile device in the defined area, and can send a notification to the locked viewscreen. If the guest approaches a portal, the notification on the user's viewscreen can be mirrored in reverse onto the portal display so that it will not escape notice as the user passes by. When idle, the portal cyclically displays topics of general relevance, but when touched will engage the visitor by supplying intuitive search resources that allow the guest to zero in on their destination or explore options.

As multiple guests use the system, the system learns more about the defined area as experienced by people, learning preferred pathways from one place to another, obstacles to avoid, and sights along the way. Users for example may post photos that are indexed in the map overlayers and each trip through the area contributes to a "quorum map" of the locale.

Each trip generates a "trail of breadcrumbs" as the guest's mobile device detects dispersed radio beacons of the network (many positioned by merchants or the operator of the urban interface system), and the system can tabulate these breadcrumbs in learning more about what kinds of experiences are available in the space.

In another aspect, the invention includes several methods of using digital resources when accessing an urban space. Guests may maximize the experience by downloading a navigational application (also termed an "app") onto a compatible mobile device. Even though some guests who have the application may have their digital devices turned off, the system can sense their presence, and will broadcast information to them in the event that they access the mobile device. Surprisingly, the broadcast may include a trail of breadcrumbs mapping the user's walk. Other guests may not have the application, or even a mobile device, but may nonetheless access the portals to learn about ongoing events and conditions and to look up specific information.

In an alternate embodiment of inventive systems of the invention, parking monitoring and control is realized by a system of sidewalk portals positioned to monitor parking zones, each portal forming part of a sensor web under remote monitoring and control and also having display functions for communicating with drivers, and thereby having the capacity to modify the urban infrastructure according to patterns detected in traffic, according to queries from users, and according to programmed instructions or intelligence resident in the cloud. In this way, closed loops are formed and re-formed as data is exchanged and acknowledged. In an exemplary illustration, communications from a user in search of an open parking space are answered by the administrative server, and the server directs the user to a vacant parking space and adjusts inventory as parking availability tightens. Users complete the loop by making payment, either wirelessly or using card readers built into the parking urban portals. In a preferred embodiment, the parking portal signals to confirm the user is at the right location as directed by the cloud, and the electronic handshake between the user's portable web device and the cloud-based administration system is then configured to complete a payment transaction. The parking portal displays the paid status of a parked vehicle until the user leaves, then updates the administrative database that a parking space is vacant and posts the availability on the cloud. In more advanced embodiments, users can reserve spaces by paying in advance if they are within a defined proximity, and the parking portals will display an indication that the parking space is reserved. Enforcement actions can also be accomplished through the cloud, when a violation of use is detected, the parking portals can identify the offending vehicle or driver and issue a ticket or dispatch a tow truck. The system also has the capacity to contact the driver via a mobile device (associated by context with the vehicle at the time the vehicle was parked) and request instructions, either collecting additional payment or giving the user a limited time to move the vehicle.

In a first exemplary realization, each parking system is provided with multiple modules or functional subsystems, a detection module for monitoring whether individual parking spaces are vacant or occupied, a user interface/display module with reconfigurable signage and indicators for controlling acceptable use of each parking space individually, and for denying parking when necessary, a networking module for exchanging data, and a remote server with administrative module and administrative database to coordinate parking activity through instructions to the display modules and by notifying users of available parking spaces. The administrative module may also respond to communications from users, such as to expedite payments, or to suggest alternate routes to avoid congestion, and may be capable of receiving user location information from portable devices carried by the user or associated with a vehicle.

The parking portals, which is mounted in proximity to one or more parking zones under control of the network, generally includes a detection or sensor module, a display module, and a networking module for communicating with a remote server or cloud-based devices. However, supplemental sensors and accessories may be disposed in or around the parking space or adjacent roadway so as to provide needed data for monitoring vehicular activity and parking compliance. Parking portals may be mounted on a dedicated pole or tower, or mounted to existing urban infrastructure such as streetlamps and buildings. Unexpectedly, as parking spaces are integrated into an intelligent network, improvements in traffic flows, waiting times, delivery schedules, and parking revenues are realized. Enforcement requires fewer city staff. Towing services can be dispatched without having to "patrol" the parking spaces. Users also benefit, because management services will be motivated to optimize the use and convenience of the parking grid, and for example can update parking space availability on a map on the internet in real time, so that anyone looking for a parking space need only glance at a navigational application on a mobile device instead of circling endlessly looking for a parking space. Optionally, parking spaces also can be reserved on a proximity basis. Increased efficiency of vehicular traffic in urban cores has surprising effects, improving transit times, eliminating the problem of double-parking of delivery vehicles, reducing gasoline prices, reducing pollution, and encouraging use of mass transit during times when parking is expected to be exceptionally difficult.

In a first aspect, the invention is a system for monitoring and controlling parking throughout an addressable array of parking spaces, which comprises: a) a web of addressable sensor units disposed to monitor parking in each parking space of the array; b) a web of addressable display units disposed to control parking in each parking space of the array; and, c) a remote server enabled to coordinate data received from the sensor units and instructions to the display units, where each addressable display unit is operatively linked to a designated parking space of the array, and displays an indication or message that permits or prohibits parking at the designated parking space according to an instruction received from the server.

The addressable array of parking spaces is realized by providing a web of addressable sensor units and a web of addressable display units operatively linked to each designated parking space of the array. The system may further comprise a communications module enabled to exchange data and instructions between the remote server and the sensor unit web and display unit web according to their electronic addresses. In a preferred embodiment, the remote server is a cloud-based server and the communications module is enabled for wireless communications between the remote server and the addressable sensor web units and display/user interface units. The server is programmed to inventory vacant and occupied parking spaces in an administrative database and to display that inventory on a cloud-based user interface, a webpage, or an interface of a mobile application in response to a query. The display unit of the portals apparatus comprises a user interface configured to display indications or messages to a user of a vehicle, wherein the display indications or messages are specific for a designated parking space according to address and location data stored in the administrative database. The display unit may include an interactive user interface, for example a card reader, a keypad, an RFID reader, a speaker, or a microphone, while not limited thereto.

In yet another embodiment, the remote server is enabled to receive user communications relevant to the designated parking space and issue instructions to display messages on the display unit in response to the user communications. For example, the remote server may be is enabled to acquire a location of a user and direct the user to a vacant parking space.

Also claimed is a sensor unit, network or web that comprises a traffic sensor for use in integrating traffic control and parking control into a seamless single system.

Traffic and parking control may be performed by a computing machine such as a server configured such that sensor units and display units communicate wirelessly with the server. Signage may be automatically updated from the remote server. The method may further comprise a step for providing a location or directions to available parking to a remote user having an internet browser or a mobile device. In one advantageous application, the location or directions to an available parking space are selected according to the mobile user's location and proximity, as can be determined from a GPS signal emitted by the mobile user's device, by pinging the mobile user and detecting a response through a network of radio beacons or parking portals, or other location methods disclosed here.

In one method, the sensor unit is a camera having the capacity to collect and transmit digital images at a pixel density ranging from very coarse to fine resolution according to whether motion has been detected and according to programming instructions from the server. The method may comprise a step or steps for image analysis and compression, such as by breaking the parking space visual field into a finer grid when motion is detected.

In all these embodiments, cloud-linked nodes are used to sense flow of people and/or traffic and integrate other sensory and contextual data, and make that information available to guest users through an urban portal communications device or through mobile device viewscreens, working in concert with the urban portals and the urban interface system, such that the information is first filtered for relevance according to, for example, the personal profile, needs, past searches, and the ongoing journey of the guest, with emphasis that location, proximity and timeliness are essential elements in identifying "relevant local content".

The foregoing and other elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps and combinations thereof that characterize aspects the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which:

FIGS. 3A and 3B are schematic diagrams of an urban communications portal device for cloud-based contacting, engaging, and escorting guest users. FIG. 3C is a cross-sectional view through a portal.

FIG. 4 is an electronic/networks block diagram view of an urban communications portal with duplex radio network.

FIG. 10 is a more detailed flow chart showing steps for capturing a mobile device signal with user handle, engaging the user, and providing escort services.

FIG. 11 is a schematic diagram illustrating an urban portal apparatus for detection, monitoring, and control of parking.

FIG. 15A is a schematic diagram of a first part of a network system, the first part comprising a communication link between the administrative host server and a plurality of parking monitoring and control units, each having an independent electronic address corresponding to a physical location, shown here as an urban block grid for illustration.

Figure 1:
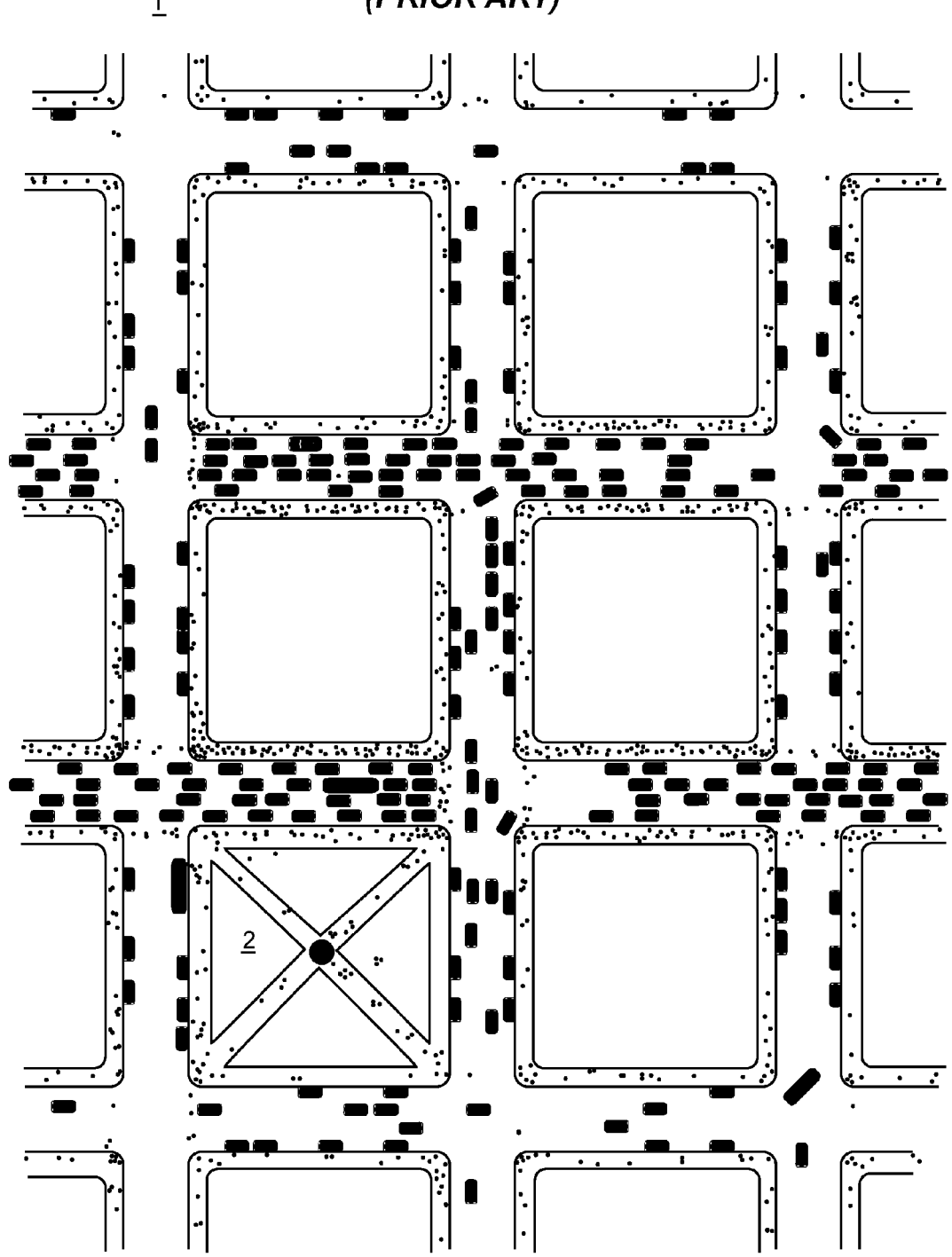
FIG. 1 is a bird's eye view of an urban center during rush hour, and depicts the current disorderly state of the art.

The drawing figures are not necessarily to scale. Certain features or components herein may be shown in somewhat schematic form and some details of conventional elements may not be shown in the interest of clarity and conciseness. The drawing figures are hereby made part of the specification, written description and teachings disclosed herein.

NOTATION AND NOMENCLATURE

The invention is related to a system, methods, and devices for empowering guest users with "here and now" information about their urban environment. Definitions are introduced for describing the invention. Certain meanings are defined here as intended by the inventors, i.e., they are intrinsic meanings. Other words and phrases used here take their meaning as consistent with usage as would be apparent to one skilled in the relevant arts. All terms and expressions throughout the disclosure that are used to refer to particular features, steps or components of the invention and inventive systems and methods are employed as terms of description and not of limitation. They are not intended to exclude equivalents of the steps or features that are shown or described. The following definitions supplement those as would be apparent from the Background and other sections of this specification.

A "base map" refers to a map of a defined physical area bounded by the limits of radio contact with a portal system. The map includes street names, traffic directions, sidewalks, storefronts, public areas, sites of historical or cultural interest, public buildings, public facilities, restaurants, coffee shops, bus stops, train stations, metro entrances, rivers, lakes, and so forth. The map also includes locations of radio beacons that can be used to key the location of a guest's mobile device onto the physical map. The map is generally generated on the fly as a vectored map so as to better fit mobile device screens and be expandable and to accommodate updates for road construction, sidewalk closures, and detours, for example.

A "map overlayer" refers to a virtual representation of local content by a layering process of associating information with physical reference points on the base map. One or more overlayers may be used to separate different kinds of local content.

A "user handle" or "guest handle" refers to an internet address given to a device that is associated with a guest user. Typically the handles are associated with mobile devices such as cellphones, computer tablets, smart watches, headsets, and the like, and may include iPhones, iPads, Google Glasses, smart cars, and related devices without limitation, all of which are termed in general, "mobile devices".

A "pathfinder subroutine" is a software engine that connects a starting point of a journey and a destination by a pathway, and populates that pathway with recommended turns and distances and also descriptions of landmarks, photos, sites along the way, points of interest, and cautions. The pathfinder includes a heuristic software block that compiles sets of journeys and looks for a "quorum route" that seems to optimize the guest experience. Each journey is quantified by tabulating "breadcrumbs" along the way. Breadcrumbs refer to proximate encounters with radio beacons. The encounters may be tabulated along with the handle of the guest's mobile device, the time and place, and are stored in device memory or uploaded to an administrative server. In this way the guest's journey is tracked without the privacy concerns of a GPS monitor; user-associated tracking ends when the user exits the system.

"To engage" refers to any action taken by a user to activate search-and-tell functions of the portal system. This could include a touch to a portal user interface, a touch or an entry on an application screen on a mobile device, a gesture, a turn, or a response to a notification.

"To escort" refers to any relationship accepted by a guest in which the portal system monitors a journey and provides periodic notifications and course corrections if needed. Generally the escort begins when the guest defines or accepts a destination and ends when the guest arrives at the destination. Along the way, the user's mobile device may act as a radio transponder, detecting signals from radio beacons and relaying them to the interface system so that progress can be tracked. Preferred radio signals for location fixes are Bluetooth Low Energy (BLE) radio signals, such as are used by many Bluetooth devices. If the user takes an alternate route, the map overlayers are updated and any new relevant information is presented to the escorted user.

"To mirror" is a function whereby the display contents of one device are transferred to a viewscreen of another device. In one instance, the user may capture the display from a portal onto a mobile device; in another instance the portal device may push its display contents onto the user's portable viewscreen; in other examples, the user's viewscreen may be locked so that a user has not viewed a notification, and the notification may be mirrored to a portal display screen within visual proximity of the user.

"Face forward mapping" refers to a process for installing and programming urban communications portals so that any map projected onto the display of the device is oriented to be viewed by a guest user in the same orientation as any map contents would be viewed in the physical world.

Urban communications portal—a device that operates with an urban interface system for conveying information and local content to guest users, either by direct viewing of a display screen, or by a mirroring process on which the contents of the portal display are reproduced on the guest's mobile devices. The portal is operated cooperatively with cloud resources such as an administrative engine and databases, including internet search access, and contains hardware for detecting and contacting guest's mobile devices. The portal may have other specialized sensors, such as traffic flow sensors, environmental sensors, and parking occupancy sensors, and may be capable of operating a camera, summoning emergency assistance, displaying news feeds, receiving voice instructions, placing telephone calls, receiving payments, giving directions, and other features that improve the guest's urban journey. Urban communications portals when assisting pedestrians may be termed "sidewalk portals" and when assisting motorists may be termed "parking portals" but are essentially and equivalent or closely related device that may be operated with a common urban interface system.

Guests may be provided with route information appropriate to a mode of travel. "Pathways" are generally followed by foot, and may include sidewalks. "Roadways" are generally followed by vehicular transport. Routing may involve combinations of foot and vehicular, public and private transportation, including driving directions to available parking, for example.

"Computer" means a virtual or physical computing machine that accepts information in digital or similar form and manipulates it for a specific result based on a sequence of instructions. Computing machine is used a broad sense, and may include logic circuitry having at a processor, programmable memory or firmware, random access memory, and generally one or more ports to I/O devices such as a graphical user interface, a pointer, a keypad, a sensor, imaging circuitry, a radio or wired communications link, and so forth. One or more microprocessors may be integrated into the display, sensor and communications modules of an apparatus of the invention, and may communicate with other microprocessors or with a network via wireless or wired connections known to those skilled in the art. Microprocessors are generally supported by static and dynamic memory, a timing clock or clocks, and digital input and outputs as well as one or more communications protocols. Hardware units dedicated for larger computing tasks are termed "software engines" so as to underline the importance of programmable instructions in effecting the functional operation of computing machines and networks.

A "server" is a software program, or a computing machine on which that software program runs, and provides a service or services to a client software program running on the same computer or on other computers distributed over a network. A client software program typically provides a user interface and performs some or all of the processing on data or files received from the server, but the server typically maintains the data and files and processes the data requests. This "client-server model" divides processing between clients and servers, and refers to an architecture of the system that can be co-localized on a single computing machine or can be distributed throughout a network or cloud. Server farms may be used where a heavy volume of data is exchanged with clients.

A "cloud" refers to a computer network having operations performed on a remote server (i.e., a "cloud server") with access to one or more remotely accessible databases; as contrasted to computational tasks and data storage conducted in a local streetside or portable user device. Cloud computing may be wireless or wired and may be hosted on global internet resources without limitation.

Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

It should be noted that the terms "may," "can," and "might" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation. The term "a" or "an" as used in the claims does not exclude a plurality.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the term "includes" means "comprises" (e.g. a device that includes or comprises A and B contains A and B but optionally may contain C or additional components other than A and B).

General connection terms including, but not limited to "connected," "attached," and "affixed" are not meant to be limiting and structures so "associated" may have other ways of being associated. Connections may be physical, electrical, or digital, for example.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or limitation.

"Conventional"—refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense that is as "including, but not limited to."

The appended claims are not to be interpreted as including means-plus-function limitations, unless such a limitation is explicitly recited in a given claim using the phrase "means for."

A "method" as disclosed herein refers one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

FIG. 1 is a bird's eye view of an urban center during rush hour, and depicts the current disorderly state of the art. Shown is an urban grid (1) with vehicular and pedestrian traffic. Also shown is a town square (2) or piazza faced on four sides by shops and criss-crossed by sidewalks. Studies have shown that most people learn particular routes to get from work to home, but seldom have the opportunity or tools to explore surrounding spaces. Even the identities of the shops and restaurants in an immediate nine block area around their workplace may be unfamiliar. Cars and people are controlled by traffic and walk lights so that significant inefficiencies and frustration results. Bus routes are a mystery to most commuters. Parking is typically governed by a mismash of small and often poorly placed signage; there are difficult searches to find parking, leading to unwanted parking tickets, and a heightened sense of aggravation that is sometimes taken out on others nearby. The overall environment is one where lack of timely local information leads to lost opportunities, inefficiencies of time and resources, and a general unwillingness to explore. Potential shoppers are discouraged by the difficulties in getting around, for example, and in many urban cores, the life of the city is dying out, leading to efforts to effect "urban redevelopment" and revitalization—without an understanding of the fundamental problem, the overwhelming complexity of analog information in an urban cityscape.

Figure 2:
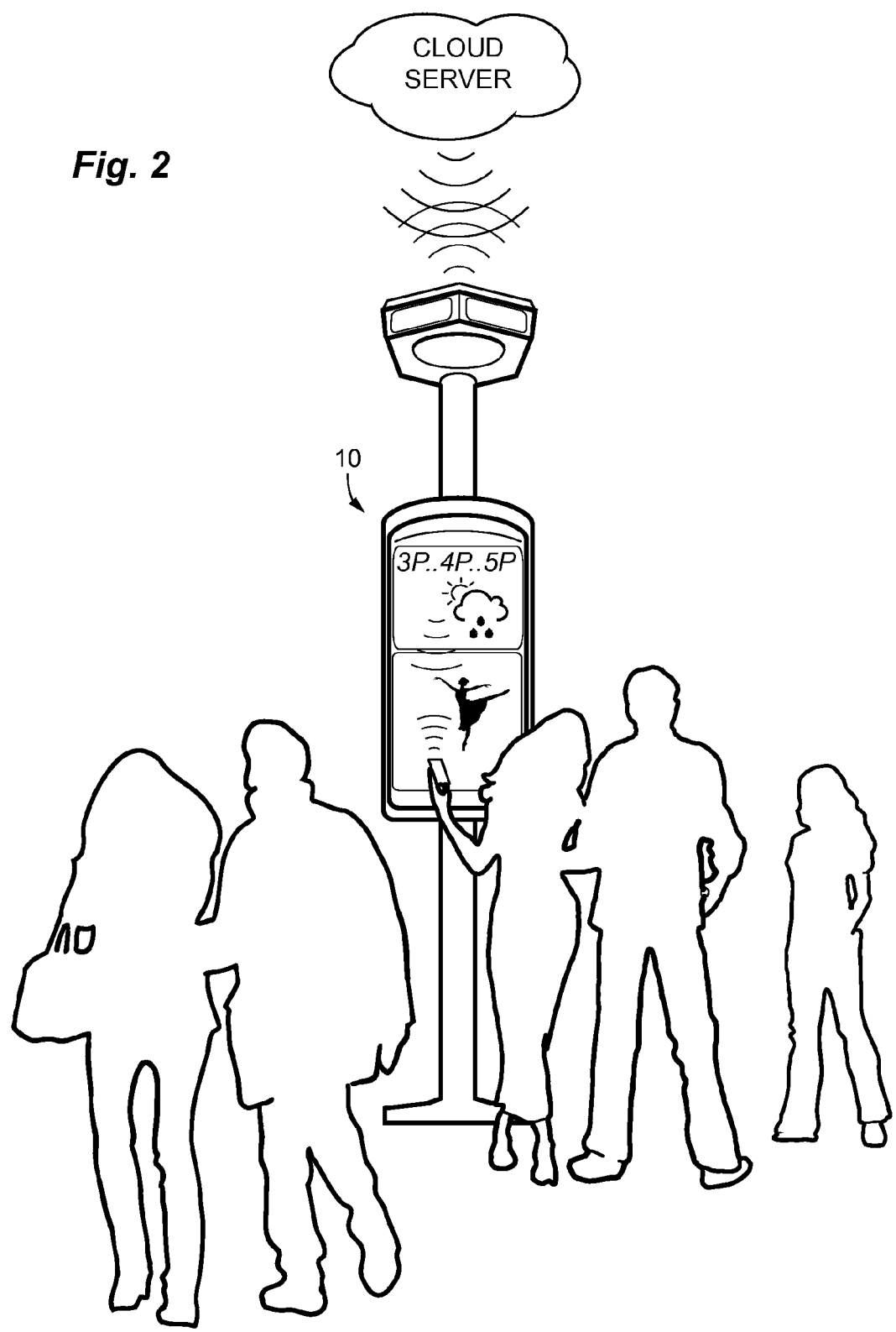
FIG. 2 is a first view of an urban communications portal of the invention with actively engaged mobile device of a guest user.

FIG. 2 is a first view of an urban communications portal of the invention with actively engaged mobile device of a "guest user". Information is digital. Filters are used to present information by relevance based on location, proximity, timeliness, and personal factors pertaining to the guest's needs and interests.

In a preferred embodiment, digital data in a designated local area flows between the urban communications portal 10, a cloud-based administrative server, and local mobile devices. Feedback on the guest's reaction is collected by the urban portal, thus forming a closed loop. The ad hoc network formed is a peer-to-peer, disintermediated network and addresses mobile devices by their user handle ID. Users having compatible wireless mobile devices are alerted to local content that is relevant by location or proximity, time, and keyword(s) parsed from other queries by the user. Data that is accessible and timely in the datastream of the user's mobile device may also be used to define search criteria for identifying relevant local information. Search results are dynamically aggregated in one or more map overlayers by an administrative database and the entries are displayed on a first display screen of an urban portal of the invention. The content may be "mirrored" to a mobile device display. Merchant offers or other local content are associated with addressable locations on the map overlayer; and the map overlayer is superimposed on a base map of the local physical infrastructure of the urban grid. Also included is an "escort service" that will direct guests step-by-step to their choice of destinations from their current location, generally by a combination of proximity wayfinding based on signals from non-satellite, short range radio "beacons" disposed along the way, and quorum mapping, where preferred pathways are defined by previous user consensus mapping. The radio beacons are generally passive transmitters having a local address and map location. Also displayed on the sidewalk portal is information of general relevance such as time, weather, and news. This feed may be provided on a second display screen and is updated cyclically as the day progresses or as events develop.

FIGS. 3A and 3B are schematic diagrams of an urban communications portal 10 for cloud-based contacting, engaging, and escorting guest users. The portal is one component of an urban communications system and operates with guest mobile devices and beacons as will be described further below. Features of the portal are shown in side and front views. The portal includes a user interface with touch-sensitive display screens 15. The portal is generally pole mounted 11 and includes a short range radio 12 for communication for communication with mobile devices in a defined proximity, and a radio or wired connection for wireless communication with the internet. Shown here is an optional pole mounted antenna assembly 13. Also included is a low energy radio beacon 38 that transmits location, but does not receive and has an effective beacon radius of about 100 feet.

The display screen is generally shielded from rain and sun by a canopy 16. The display screen generally includes a first touch-sensitive screen 17 for non-commercial data entries such as time, weather, news, and public notices. A second screen 18 is provided for sponsored messages. The data feed cycles so as to catch the eye of interested passers-by. Also provided is an emergency summons button that may activate emergency lights 23 and call police and a camera 20. The camera may also be provided with a speaker and a microphone. Feature 21 is a schematic representation of a payment module, such as for collecting parking fees or for making VOIP calls from the device. A solar power panel 22 may be provided, and also a streetlight 24, if desired.

FIG. 3C is a cross-section (as noted in FIG. 3A) showing contralaterally disposed BLE radio sets (14a, 14b) in the housing of a portal device. Also shown is the lower display panel 18 in the middle of the device body.

FIG. 4 is an electronics/network block diagram view of an urban communications portal system. The system includes the urban portal device 25, at least one mobile device 40, a network 41 of passive radio beacons (42a, 42b, 42c), and a cloud-based administrative complex 29, which as shown here includes an administrative server 29a, internet resources 32, a dedicated database 31, and an administrative user interface 33 joined to the urban portal device by a wireless link 28. Users with the required passwords may upload new local content, for example such that commercial users may place ads on display screen 18, and city agencies and partners may place content on display screen 17. The operator of the urban portal generally retains oversight and may supply the bulk of the content for both channels through subscription agreements. Passwords and other user information are generally stored in the dedicated database in the administrative complex, which may also house records of journeys, user profiles, quorum maps, locations of radio beacons, details of commercial content offerings, and so forth, but effort is made to use current data over stored data, where updated information is reliably obtained from internet sources such as dedicated news or weather streaming content.

In FIG. 4, the Internet 32 is represented at the top and the bottom of the figure, indicating that there is a digital connection through the cloud between the administrative server 29a and the user's mobile device 40. A variety of communications protocols may be integrated into the apparatus, including but not limited to: Ethernet (or IEEE 802.3), UART, USB, SAP, SAS™, SuperSAS™, ATP, Bluetooth™, Bluetooth Low Energy (BLE), TCP/IP, Token Ring, cable, satellite, or via any appropriate communications protocol or combination of communications protocols. Further, in some embodiments, various communications protocols which may facilitate communication between an apparatus and various component devices and/or peripheral devices (e.g., printers, bill acceptors, etc.). These include the Best of Breed (BOB) standard, which may facilitate communication between a device and various servers that assist in providing accounting, tracking, and financial transaction functionality, and/or the System-to-System (S2S) standard, which may facilitate communication between the apparatus servers and 3d party servers (e.g., a hotel server comprising one or more databases that store information about booking and reservations). 3G and 4G communications protocols include BLE transceiver protocols that are of relevance to some aspects of the invention. Transmissions and records may be encrypted to ensure privacy and prevent fraud in any of a variety of ways known in the art.

Each portal device 25 may be adapted to communicate via a cloud link or other wireless link with server 29a or by an optional wired link 30. The mobile devices 40 need not be stationary to be networked, mobile devices having capacity for networking are frequently linked via a cloud-based Internet or in a LAN operated network at 2.5 GHz or 5 GHz over short distances, and some or all of the local content may be remotely supplied to the mobile devices via a wireless network. Any number and type of mobile devices may be in communication in a computerized network. Advantageously, a radio beacon 38 may be built into the body of the portal so as to be recognized by mobile devices within proximity.

The portal also generally includes at least one radioset 14 for sending and receiving Bluetooth Low Energy (BLE) signals, and more preferably includes a pair of the radiosets with appropriate antennae. The function of these radiosets will be described in more detail below.

Figure 9A:
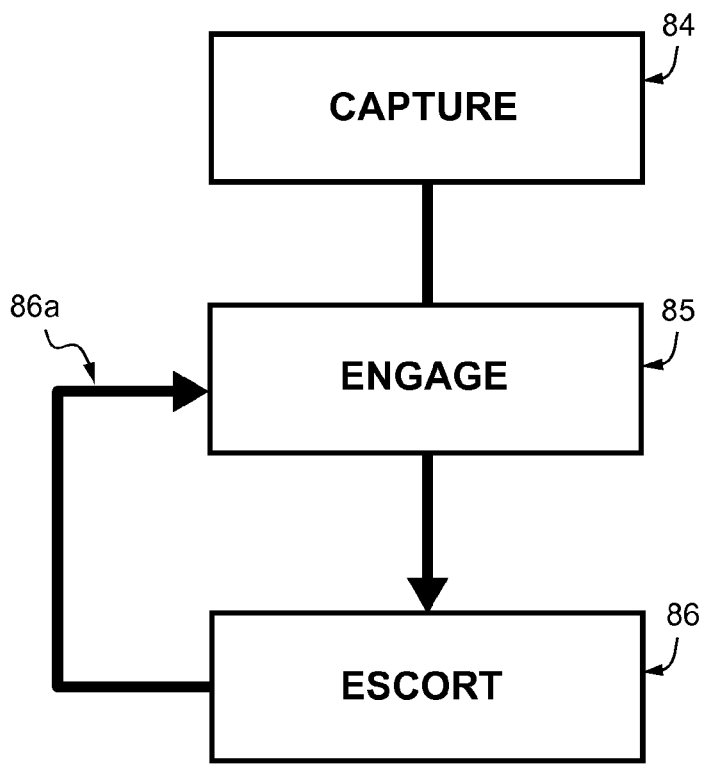
FIG. 9A is a flow chart showing steps for capture, engagement, and escort of a guest mobile device user in the local designated area as assisted by the urban portal.
Figure 9B:
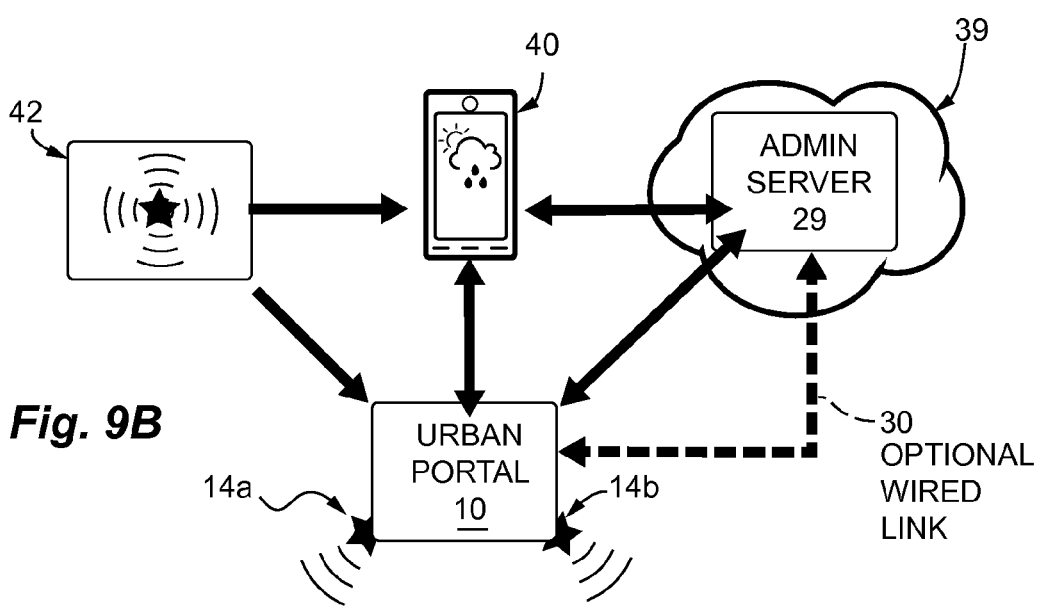
FIG. 9B is a schematic of a network showing an urban portal as a cloud-linked node in a network.

The structure of a preferred network is described in more detail in FIG. 9B. Shown is a mobile device 40 having a wireless bidirectional link to the cloud 39 and to an urban portal 10. The administrative server may link to the urban portal and mobile device through the cloud, or optionally, transmissions may be routed to the urban portal via a cable 30, for example. In this view, the administrative server as represented figuratively as being "in the cloud" because physical location is no longer essential in understanding the operation of cloud-linked network nodes and servers. Both the mobile device and the urban portal may receive short-range unidirectional transmissions from a plurality of beacons of network 41 that populate the map of the urban area and are used to create digital pushpins in the virtual map overlayers—tying virtual content to physical location. Thus at the level of cloud-linked nodes in a defined local area, having a physical location becomes a principal driver for providing local content, and links cloud-based functions to the user's immediacies of the "here and now".

Also shown in this view are two radiosets (14a, 14b) that function in identifying mobile devices entering the service area. Two are used, each having a different signal characteristic, so that mobile devices enabled to capture a timestamp from each of the radioset broadcasts can perform a triangulation and establish relative position. Similarly, radioset receivers may capture signals from mobile devices and processor capacity in the portal or in the cloud may be used to triangulate the mobile device. This positional information can be stored in the form of "breadcrumbs" on the administrative server. Generally the two radiosets (each of which may include send and receive functions) are separated by the width of the portal housing, and the linear dimension is configured so as to approach the wavelength, a half wavelength, or a quarter wavelength of the frequency. By so doing, triangulation based on timestamps of the arriving signal wavefront can be used to create accurate local positioning of radio transmissions in the defined local area. Radio beacons may also be triangulated by the portal devices in this way.

The urban portal is operated by a processor and related logic circuitry 26 according to programmed instructions that may be resident in the device or may be accessed via a comm module 27 from the cloud (32, wireless link 28) or from an alternate digital connection 30. Memory and other features required to support a guest user interface 15 are described in more detail in FIG. 5.

Each board contains a microprocessor with associated memory, programmable instructions, and I/O ports, here indicated as "local logic circuitry" (26, with processor) to indicate a functional unit capable of executing instructions and of collecting and directing data communications under the overall control of the host administrative server 29a or with a substantial degree of autonomy. Generally the processor includes I/O ports for receiving user requests entered on the user interface 15, and for displaying soft control surfaces if desired as is known for the operation of a touch sensitive screen. Two processors may be used, for example one for each of two displays.

Any communications module may be wired or wireless as known to those skilled in the art. The communications module may receive instructions and content from the administrative server, and may instruct the display module 15 according to detailed and complete instructions sent from the server. The display may also be pre-programmed with instructions embedded in the display module, or a combination of local and remote programming.

Wireless transceiver linkages useful in establishing networks broadly encompass cellular signals, WiFi, Bluetooth, Bluetooth Low Energy (BLE), Zigbee, and radio in general, including digital radio and analog radio. Cellular protocols include GSM, CDMA, 3D, 4G, LTE, or WiMax, for example. In some instances, peer-to-peer or star networks are created. Mesh networks having no centralized node may also be used. Mesh networks may be homogeneous and heterogeneous, for example employing gaming machines of the invention along with other kinds of nodes. Wireless networks, including ad hoc networks in general, are known to those skilled in the art and may be used in communication between devices and modules of the network. Frequency ranges are generally in the megahertz to gigahertz range, although lower frequencies may be used for longer distances. Each device of a network is typically assigned an address or identifier for communications, although the address may be static or dynamic. Encryption is optional, but is frequently used for communicating financial transactions and/or personal information. For wired network transmissions, serial transmission is generally contemplated, such as by UART-equipped devices, by Ethernet, or by fiberoptic communications protocols. A wired link 30 will resist crashes of a wireless network or overload of cellphone service but is more expensive for the system operator to install and maintain.

Accessory features 34 include advanced user interface features such as a keypad, which may be a soft or a hard keypad, a barcode reader operable with 2D codes such as displayed to a camera accessory, a microphone and speaker, any devices for recording biometrics. Environmental sensors 36 include a thermometer, a device for measuring humidity or air quality, noise level indicators, pollen count detectors, crowd sensors, traffic flow sensors, and a photometer for measuring insolation, while not limited thereto. Environmental sensors are useful in informing the network so that appropriate advice can be passed to guests and relevancy of selected local content can be customized for sensor readings, for example steering cars away from heavy traffic by use of a microphone that measures street noise, suggesting certain guests remember their antihistamine, warning about air quality along certain routes, sensing earthquakes and advising on civil emergency response plans, inviting users to join crowds or to avoid them (depending on their preferences), and so forth.

While power may be obtained from solar panels that are pole mounted, emergency power is also generally provided, such as by rechargeable batteries that operate for several hours without external supply.

In one embodiment, the urban portal may include more than one modularized subassemblies such that modules communicate with each other through radio linkages. Advantageously, individual modules can be replaced or updated without the need to do rewiring and troubleshooting may be performed on line before service is dispatched. For example, a higher powered transmitter may be mounted on the top of a pole, and may communicate with a display device mounted near sidewalk level using a wireless link.

One skilled in the art will recognize that other microprocessor configurations may be used to accomplish the objectives of the invention. While we have enabled particular configurations for illustration in this disclosure, other methods having an equivalent outcome are also conceived.

Other communication, user interface, and sensor circuit options will also be apparent, such as wired connections to an administrative center or cloud-based administrative resources.

The system also includes radio beacons that increase the fine mapping detail of the urban space. These are generally low cost, low power transmitters that are dispersed in the defined area such as by merchants wishing to create a "stake in the ground" to which their local content can be tied. The beacons are like pushpins in a virtual map, and appear on the map overlayer. When a guest mobile device is brought into proximity to a beacon, the system may trigger a notification in which the relevant local content linked to that location is presented to the user's device. Thus beacons (42a, 42b and 42c) are representative and may include larger numbers of beacons forming a high density proximity map that assists the system in accurately locating a user's current position when queried. Generally the mobile device will include a navigational application and one function of the application is to detect beacons and record their identifier (which is a proxy for their location in a physical grid), the time of most proximate contact, and tabulate a series of these encounters as the guest wanders through the urban space. The table then serves as a set of "breadcrumbs" which can be plotted to deduce the guest's path and current location and to search the internet or current databases in order to assess whether any new local information is appropriate to the user's activity. If relevant information is found, the system will push that information onto the user's device 40. Shown here is a notification that rain is expected to begin in the mid-afternoon.

Merchants may also be notified of the guest's pathway and current position so that they can reach out with offers of relevance, for example a sale on umbrellas, a free cup of coffee, or fresh bagels with lunch. The merchant offers are generally transmitted to the user's mobile device and may be updated as the location of the device changes. By extension, the merchant may be notified when the guest "arrives", so that the merchant may greet the user at the door with a sample of the user's favorite coffee, for example. Sugar and milk may be provided according to the user's profile.

Figure 5:
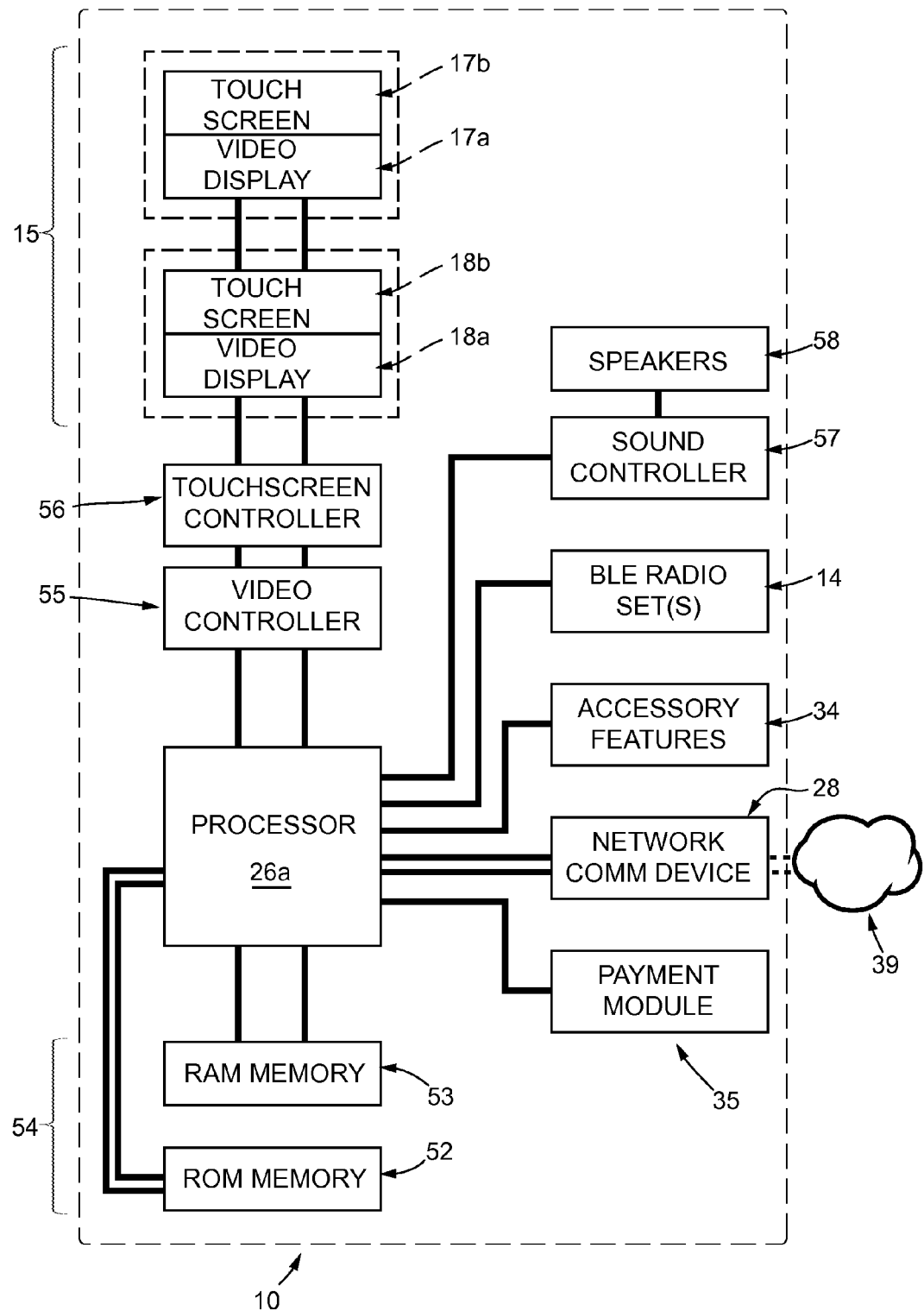
FIG. 5 is an electronics/network block diagram view of an urban communications portal with logic circuitry, paired displays, and radio connection(s).

FIG. 5 is a schematic view of an urban communications portal (10) to be provided in a public space, such that the portal includes features (including at least some programming instructions) for enabling presentation of local content as described here. The components shown may encompass but are not limited by the components and programming useful in enabling the desired functional features and may omit conventionally known components.

The portal includes a central processing unit (26a, generically termed a "processor"), which is connected to a memory utility 54. Shown here are read-only memory elements (52, ROM) and random access memory elements (53, RAM) such as are known to facilitate operation of a program by a processor. ROM elements may contain programming instructions in generally non-volatile storage form, and RAM elements typically store volatile data temporarily, data that is reset such as for a new user, or in the course of iterating a program loop. RAM is used for storing display scheduling and content feed, matrix data associated with physical and virtual map layers provided in response to a request made to the administrative server, and for recording user touch instructions, for example. RAM typically has memory locations associated with display status, hardware status, and soft button status on the user interface, for example.

In the depicted embodiment, the portal includes ROM memory for storing software (program instructions) for engaging and escorting guests. Program instructions may be stored on a hard disk (not shown), but are more typically stored in ROM (52). Advantageously, the ROM memory may be an erasable programmable read only memory (EPROM), and yet more advantageously, the program instructions may be updated periodically from an external linkage under control of the portal operator.

In some portal machines, an application specific integrated circuit (ASIC) may be used, limiting the requirement for software. These integrated circuit memory storage components are well known in the art so are not discussed further. The advantage to providing the rules for interactions and map logic via a stored program on hard disk or a network communication device from a cloud-based connection is that map features and associated local content on map overlayers may quickly and easily be updated from a host server without having to physically modify the onboard chipset. In contrast, the ASIC approach offers speed of execution, reduced processor size, reduced bandwidth requirements, improved manufacturability and simplified troubleshooting capability; firmware finds application for dedicated machines having relatively consistent operating features, for example.

Peripheral devices associated with the processor may include a video controller (55) and one or more video displays (17a, 18a). In some embodiments, the video controller is embedded in the processor, but is a functional component identifiable as providing control of the contents of the video display, which may be an LED image, an LCD image, or a rasterized image of a CRT, for example. For portals having an integrated touch screen capability, the video display may be intimately associated with a touch screen (17b, 18b) as represented here by combining the structures as a tactilographical display panel and user interface (15). The touch screen and video components may share data, and operate in digital communication with closely associated controllers (55, 56). It is not uncommon that video controllers contain added RAM memory and may be programmed to execute video routines essentially as a co-processor when actuated by the processor.

Also shown as a peripheral device is a Bluetooth Low Energy radioset 14 which may be used to monitor compatible radio traffic in the defined local area, and will be tracked by compatible mobile devices as the mobile devices move through the area.

The processor may also be connected to other peripheral devices 34 such as a user console having one or more accessory input devices (such as a motion sensor), accessory displays, and speakers (58) for audio interactions. The speakers may be driven by an audio controller (57). A microphone, not shown, is also conceived for voice interactions. Also linked to the processor is an optional payment module (35) as known in the art, which may be a coin, token, or card acceptor configured to allow a player to make purchases, buy bus tokens, initiate VOIP calls, and so forth.

Network communications device (28) may be a network card for connecting the portal to a central host server, such as over a cloud-based connection (39). Cloud resources may be used for accounting, bookkeeping, and/or security purposes, or for downloading new content or software upgrades and/or for controlling the display and search interactions with guest users if desired. The schematic enables cloud-based flash BIOS and remote reprogramming capability so as to refresh the system on a near-real time basis if needed. When software remains on central host server in the cloud, interactions with guests may be conducted over a local area network (LAN) operatively linked to the cloud, or over a remote network operatively linked to an internet-type domain generally resident on a server. Advantageously, by retaining some code on a remote server rather, proprietary aspects of the portal operation can be held as trade secrets.

User requests may be transmitted via a network connection to a central host server and the relevant local content is downloaded to resident memory to be used by the processor to effect a display of local content entries which the user can view on the portal display screen. A network connection may also be used to monitor portal performance, journeys in progress, merchant offer response, and for remote troubleshooting, for example. Networking also is useful for storing user profiles, merchant information, security details, and for collecting de-identified data on user preferences and history in support of marketing efforts, for example.

Figure 6:
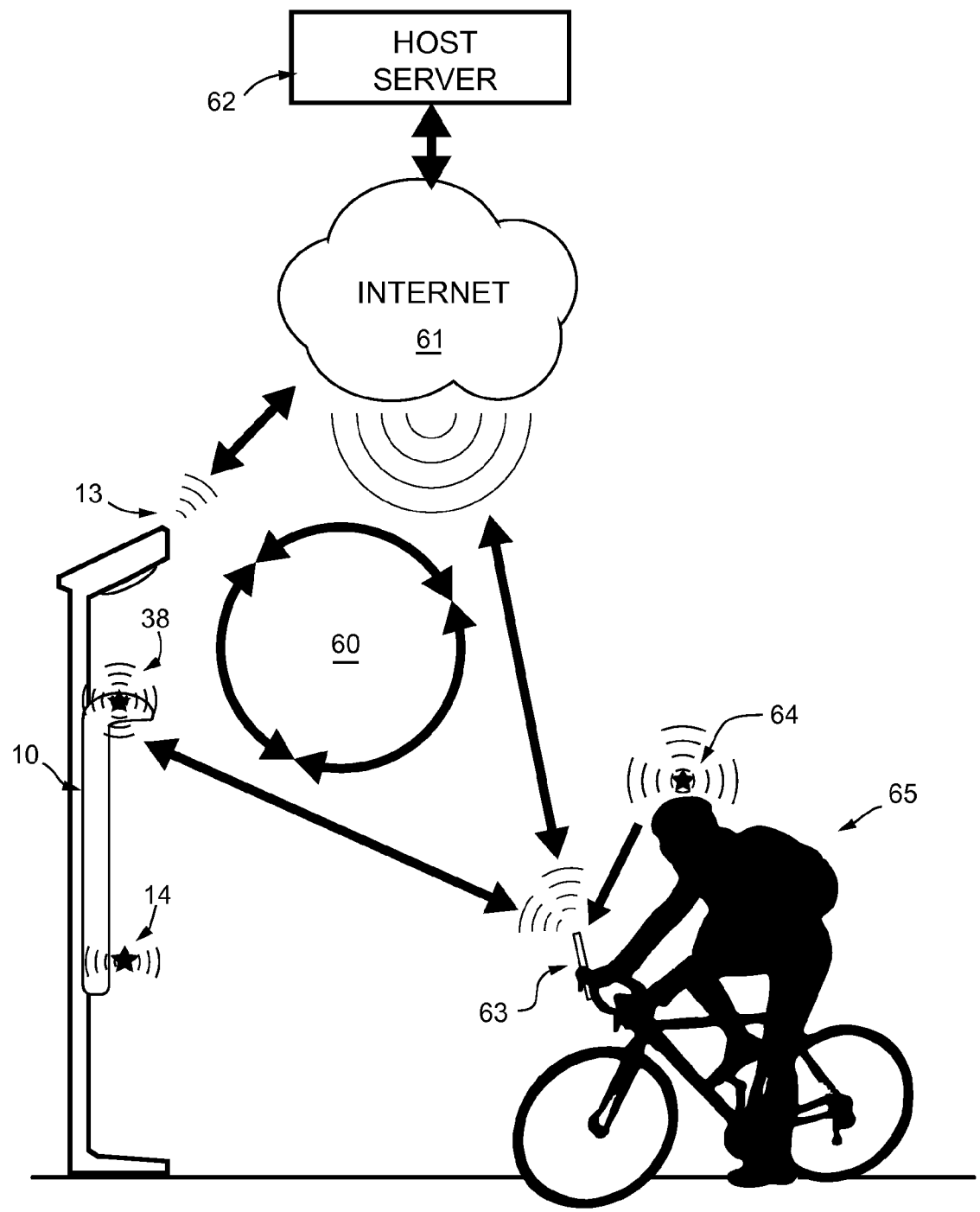
FIG. 6 is a view of a "closed loop" established between an engaged mobile guest device and an administrative database via the urban communications portal.

FIG. 6 is a view of a "closed loop" established between an engaged mobile guest device and an administrative database via the urban communications portal 10. As referenced in FIG. 9B, the system includes multiple pathways for exchanging radio signals and digital information. Passive beacons, which function as send-only radio transmitters, are used to establish location and proximity. In the example of FIG. 6, one beacon 38 is installed in the urban portal housing and another beacon 64 is installed in a bicycle-rider's helmet. The position of the bicycle rider 65 is assessed by his mobile device 63, which shows that he is stopped in front of the portal display. This information, including location and time, may be transmitted from the mobile device to an internet-based server 62, and may be retransmitted from the server through the internet 61 to a transceiver 13 of the portal, along with any instructions about how to capture and engage the guest bicyclist with suitable relevant content. The portal may then directly engage the mobile device in response to an action of the guest, such as by approaching the display, or by touching on one of the content entries on display. This achieves a closed loop 60, where the guest provides feedback in the form of likes or dislikes of the content as shown, and the feedback is then used to refine the keywords or keyword strings used by the search engine to find the most captivating and engaging content. Ultimately, the goal is to enter a relationship with the guest, wherein the guest determines a destination based on content offerings made on the machine, the content is mirrored onto the guest's mobile device, and the system then escorts the guest to the destination by providing directions and by annotating the journey with added information about places passed along the way. The portal device includes at least one BLE radioset, generally at least two, so that it may monitor the bicyclist's position or may engage the mobile device 63 directly, such as with a local offer or notification.

Figure 7:
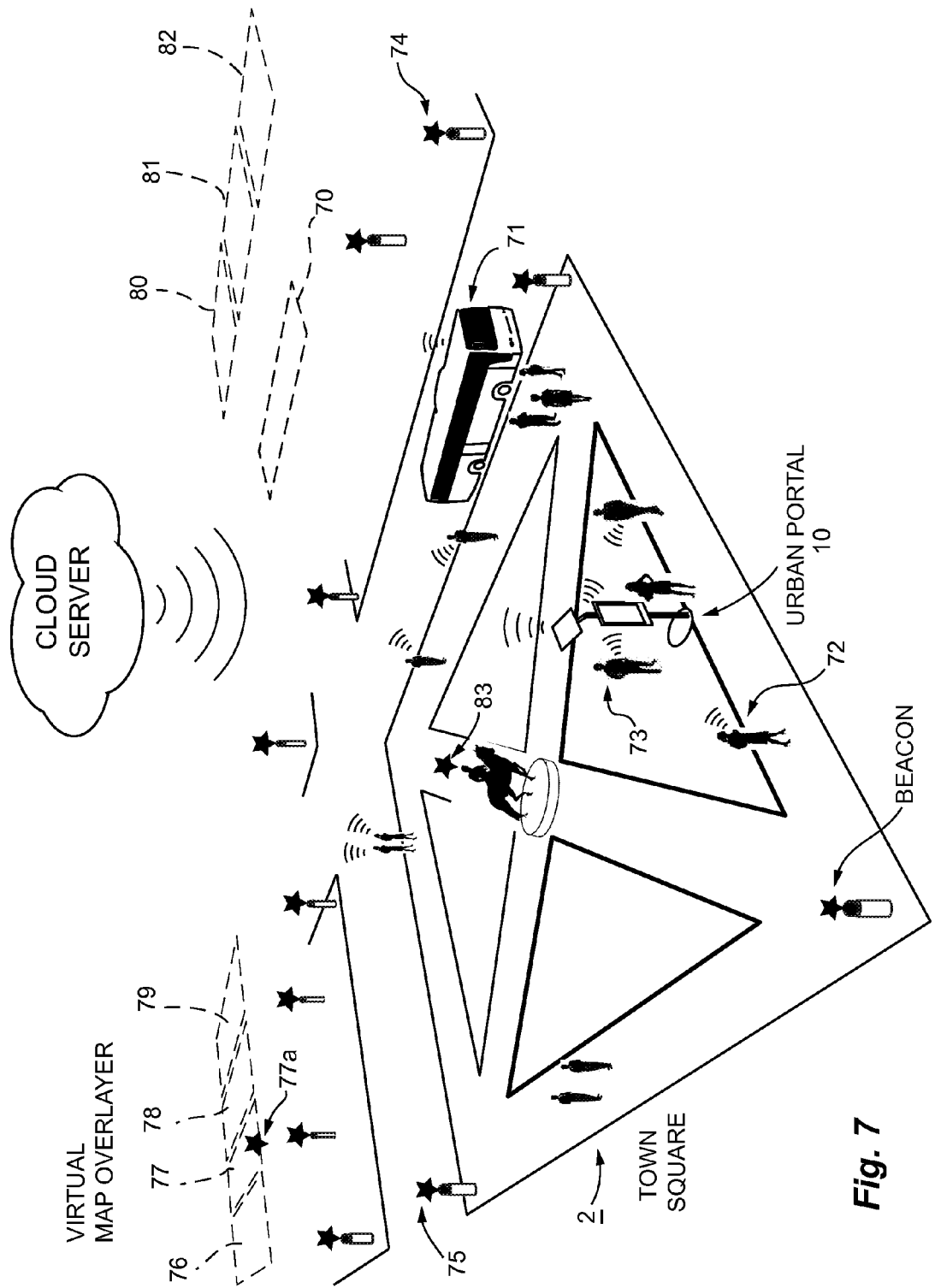
FIG. 7 is a schematic view of a physical base map of a defined local area around an urban communications portal, also showing beacons and mobile devices in the local area.

FIG. 7 is an expanded view of the operation of a single portal (10) in the context of a defined map area. Portals may be networked to cover larger areas of an urban grid, but for purposes of explanation, a view of a single square block (2) forming a town square and the surrounding storefronts is shown. As represented schematically, the space is defined as a physical space having streets and sidewalks, and as a virtual space (dashed lines) representing map overlayers drawn from a server database. For example a bus stop is represented in virtual space by a dashed box 70 and a bus 71 is in fact at the bus stop in the "real world" as depicted here. A guest may query the portal 10 for information about which buses stop there, where they go, and when they come.

Users (for example having mobile devices 72, 73) are identified by short-range radio transmissions that can be detected by a short-range radio transponder in the portal. Because many mobile devices are fitted with "Bluetooth Low Energy" radios (BLE), the transmissions not only announce the presence of the user's device (such as the UUID code), they also permit promiscuous interactions so that the device and the portal may engage in a handshake when the device is operated with a compatible application and may facilitate cloud-mediated communications where the user is offered information at the portal and the cloud server is responding to the specific user's presence in proximity to the portal. Mirroring, for example, may be done through the cloud or directly "peer-to-peer" to the mobile device from the portal. The handshake allows the guest to experience broader interactions with services provided by the portal, as will be described in more detail below. Also part of the network are beacons such as 74, 75 (each "star" indicates a beacon), which are disposed in the defined area and are used as proximity mapping tools. Each beacon emits an identifier that is linked to its known physical location. The signals are detected by the mobile devices as they encounter the beacon transmissions and the navigational application may store the location and time of contact information in a table in the cloud so that, for example in a response to a request for directions or for an escort, the system's administrative server may access the contact table and reconstruct the guest's position, path and direction of motion, as well as distances and possible routes to a requested destination. These datapairs, location and time, are termed "breadcrumbs" and allow the system to track guests and to suggest local content entries based on proximity. Each beacon may also be tied on a virtual map overlayer to a webpage where information having direct contextual linkage and proximity to the beacon is available. Thus for example merchants may use beacons to pinpoint their store entrance in virtual space, and may link that location to a range of data regarding their services, any specials, anything happening in the "now", and any offers tailored to catch the attention of a guest headed their way.

Thus for example, the town square may be bounded by a news stand 76, a bakery 77, a coffee shop 78, a tailor 79, a bookstore 80, a fashion shop 81, and a restaurant 82. Bakery 77 is provided with an individual beacon (77a) at its door. At the center of the square is an equestrian monument, also marked by a beacon 83. The locations of the beacons are known to an administrative server database resident in the cloud.

Figure 8A:
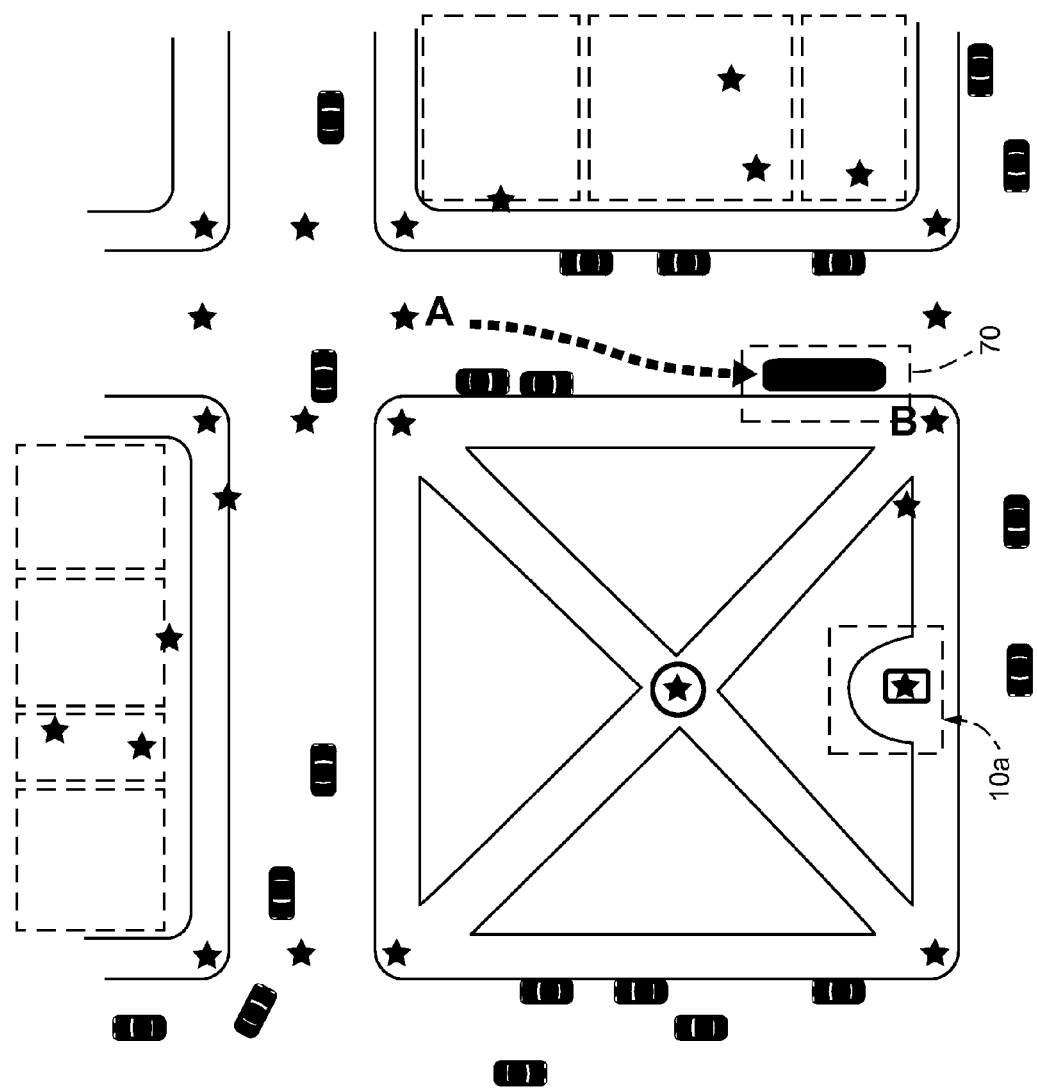
FIGS. 8A, 8B and 8C depict an exemplary guest's journey in a local urban space as escorted by the urban portal.
Figure 8B:
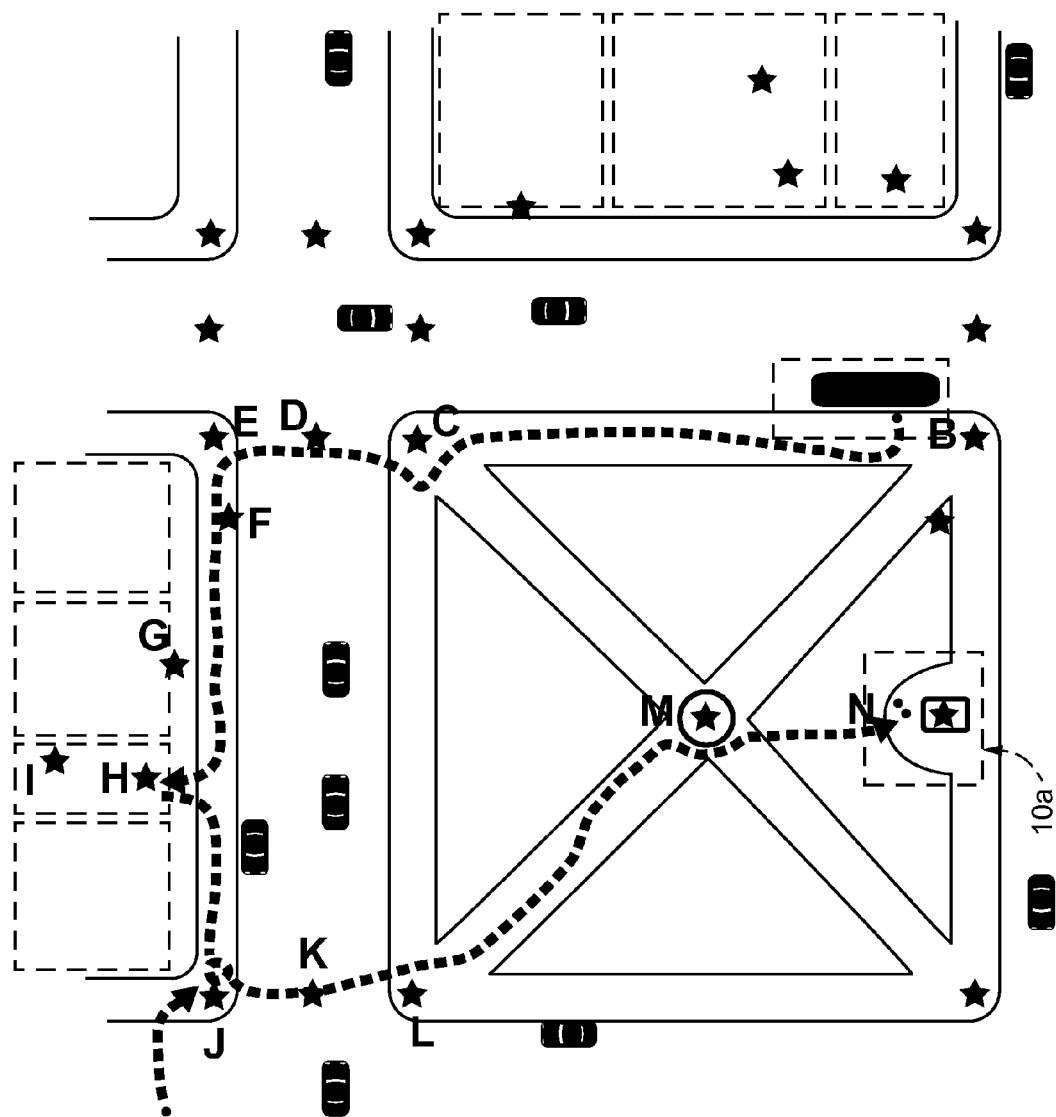
Figure 8C:
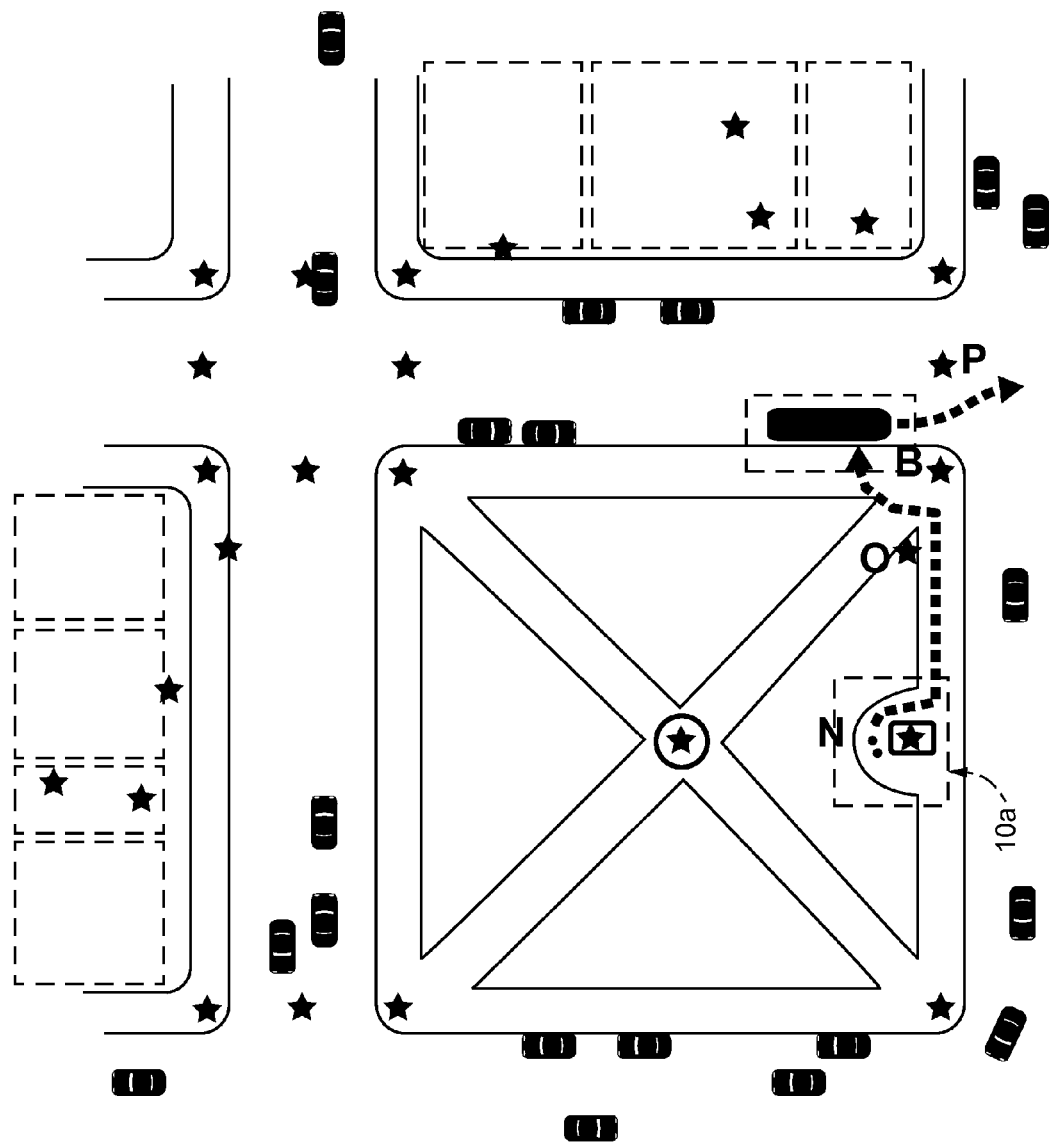

In FIGS. 8A, 8B and 8C, this virtual map is used to follow an exemplary guest's journey in a local urban space as escorted by navigational application and urban comm port system. In an initial view (FIG. 8A), a bus pulls into the virtual bus stop 70. A guest Jack, having a mobile device with the application active, is tracked passing beacon A and stopping near beacon B, where Jack gets off the bus. In a second view (FIG. 8B) Jack is headed for the bakery 77, where he knows that fresh rolls have just been put out, and the navigational assistant on his iPhone, for example, points him down the sidewalk to the right, in the direction of beacon C. The application verifies that Jack passes in proximity to beacon C and in crossing the street, also triggers contact with beacons D and E, where Jack is signaled to turn left. Jack passes beacons F and G and enters the bakery at beacon H. He is greeted by the merchant on line, who offers him a special on bagels at beacon I, which he ignores. Instead he purchases a half-dozen rolls and continues down the street. He is planning to meet Jill and is navigational assistant advises him that she is approaching. They meet in proximity to beacon J and return toward the bus stop, passing beacons K, L and M, where a notification is sent reminding them that the statue is dedicated to a General of the War of 1812. They stop at the urban portal (with beacon N, area tagged by dashed rectangle 10a in virtual space) to check which bus to take and when the next bus is coming. By entering their new destination, the portal displays a schedule of buses on the correct route. In a final view (FIG. 8C), they walk up the sidewalk to the bus stop (beacons O and B) and immediately catch a bus. As the bus pulls out, the navigational application notes a proximity contact with beacon P and checks that they are headed in the right direction. Each beacon defines a proximity radius that may overlap other beacons. Triangulation methods using BLE signals may also be used to supplement proximity mapping. These maps are refined by the quorum mapping techniques disclosed here.

Thus Jack's mobile device recorded a trail of breadcrumbs A' through P' linked to beacons A through P. As the guests enter a next area on their journey, additional breadcrumbs may be added. Any photographs that they took in the park can be uploaded to their personal webpages and may be used to enrich the information available to others who are planning a similar trip.

Parenthetically, some beacons are mounted in the pavement within crosswalks to help blind persons who use their iPhones (or other compatible mobile devices) to navigate the city. Because beacons are very small, consume little power, are sealed, and can be inserted into tough housings, they are suitable for mounting almost anywhere in the urban environment, and can be monitored so that periodically they are replaced with a beacon having fresh batteries. For temporary use, beacons may be mounted in traffic cones, for example.

The methods by which urban portals of the invention may be used may be broken down by (i) whether the user also has a mobile device, (ii) whether the mobile device is locked or not, and (iii) whether the user has installed a compatible navigational application on the mobile device. Mobile devices may include cell phones, tablet computers, smart wristwatches, smart cars, and so forth. Typically the mobile device will include a memory chip suitable for storing breadcrumbs, where breadcrumbs are records of proximity to compatible radio beacons, radio beacons including simplex send devices and transceivers such as bluetooth-compatible devices.

For a mobile device having installed thereon an application designed to interface with the urban portal interface, a first instance of the inventive methods includes a method for using one or more urban communications portal and one or more radio beacons in radio proximity thereto in cooperation with a compatible mobile device. The navigational application of the device is operative therewith for navigating a designated area of an urban grid: which comprises a) establishing a handshake between a mobile device and the urban communications portal when the mobile device is in short-range radio proximity to the urban communications portal or to one or more of the radio beacons, wherein the urban communications portal is monitoring radio signals from the one or more radio beacons; b) copying any handle information from the compatible mobile device and any breadcrumbs in memory; d) parsing the handle and the breadcrumbs as keywords, searching cloud-based sources for relevant local content, and pushing a notification onto an open application screen of the mobile device; e) receiving a query from a touch screen of the mobile device in response to the notification, parsing the query as one or more keywords, searching the keywords for related local content entries, and displaying the related local content entries; f) expanding any related local content search results and identifying a destination in the designated area associated with at least one the related local content search result; g) mapping the destination on a physical map of the designated area and displaying the map on the display screen; and, h) if available, displaying an offer or an invitation associated with the local content. The assisted method may also include a step for escorting a guest having the compatible mobile device along a pathway to the destination while monitoring progress on the urban grid. Also included are steps for notifying the mobile device of other local content accessible along the pathway, and pushing an updated notification to the mobile device when new information is relevant.

Notifications may be updated when the mobile device has a proximate encounter with a radio beacon. In a preferred method, an administrative server in operational digital communication with the urban communications portal is configured to store the user handle of the mobile device and to record proximity contacts between the mobile device and the one more radio beacons, thereby tabulating a trail of breadcrumbs defining a guest journey in the defined area. Alternatively, the breadcrumbs may be stored by the application on the mobile device, and can be played back on a map of the city as needed. By uploading the trails to the administrative server, sets of guest journeys may be collated for a "quorum map" of "pathways" (or roadways) through the designated area, where the quorum map is used to guide future guests and is linked to content discovered by any of the guests polled in making the collated map. Surprisingly, the notifications may also be transmitted to urban portals along the path, and any notification the guest had not opened (such as because the device display is off) may be mirrored onto a display screen of the urban communication portal in visual proximity to the path of the guest. Thus in FIG. 7, the guest user 72 may see the needed bus transfer and routing information not on her mobile device but instead on a larger display screen as she passes in front of the portal 10 on the way to the bus 71.

In other instances of the inventive methods, the user lacks the navigational application. The system may be adapted to perform a method for using an urban communication portal to receive timely local information relevant to a designated area of an urban grid in proximity to the urban communication portal without use of a navigational application. The method comprises: a) cyclically displaying and periodically updating local content entries on a display screen of the urban communication portal, the display screen comprising a touch-sensitive display screen; b) receiving via the touch screen a tactile query from a user directed at one entry of the local content; c) parsing the tactile query as one or more keywords, searching the keywords for related local content, and displaying the related local content entries; d) expanding any related local content search results and identifying a destination in the designated area associated with at least one the related local content search result; e) mapping the destination on a physical map of the designated area and displaying the map on the display screen; and, f) if available, displaying an offer or an invitation associated with the local content. Additional steps include receiving via a touch screen a secondary query directed at an entry from the related local content search result, performing a new search with refined keywords, and displaying any supplemental search result in a segment of the display screen, and receiving offers related by proximity and timeliness, and by the user's interests, where the offers include invitations by a commercial or a governmental entity and invitations by the operator of the urban communication portal, including offers to accept a download of navigational software that will enhance the urban portal experience. The navigation software is enabled for escorting a guest having the compatible mobile device along a pathway to the destination while monitoring progress on the urban grid and notifying the mobile device of other local content accessible along the pathway.

In another embodiment, when the mobile device has the application installed, but the viewscreen is locked, the method may comprise: a) cyclically displaying and periodically updating local content entries on a display screen of the urban communication portal, the display screen comprising a touch-sensitive display screen; b) receiving a ping from a compatible mobile device entering the designated area; c) copying any handle information from the compatible mobile device and any breadcrumbs in memory, wherein breadcrumbs are records of proximity to beacons; d) parsing the handle and the breadcrumbs as keywords, searching cloud-based sources for relevant local content, and pushing a notification onto a lock screen of the locked mobile device; e) tracking the mobile device and pushing an updated notification to the locked mobile device when new information is relevant; and, f) mirroring the updated notification onto a display screen of the urban communication portal when the mobile device is brought into proximity to the display screen of the portal. Additional steps may include a) opening an interactive screen onto the navigational application when the mobile device is unlocked, receiving via the touch screen a tactile query from a user directed at the notification, parsing the tactile query as one or more keywords, and searching the keywords for related local content before displaying the related local content entries; and b) then expanding any related local content search results and identifying a destination in the designated area associated with at least one the related local content search result, wherein the destination is accompanied by a depiction of a pathway to reach the destination from a current location of the mobile device. The software is enabled for escorting a guest having said compatible mobile device and an open navigational application along said pathway to said destination while monitoring progress on said urban grid and notifying said mobile device of other local content accessible along said pathway. During the escort, the guest may receive one or more notifications of relevant content.

These methods are summarized in FIG. 9A, which is a flow chart showing steps for capture 84, engagement 85, and escort 86 of a guest mobile device user in the local designated area as assisted by the urban comm portal and a compatible application installed on the mobile device. Users not having the application are offered inducements to install it. Users having the application receive more relevant content and are shown information about places along the way that they otherwise would not have explored. Thus an escorted user is engaged whenever relevant content is discovered along a pathway; the process is an iterative process (86a, loop) in which the user's interests are parsed as keywords used in a directed search to discover more closely related content that relates to the immediate surroundings of the guest or places along the way ahead.

FIG. 10 is a more detailed flow chart showing steps for capturing a mobile device signal with a user handle, engaging the user through their mobile device, and providing escort services. Shown on the left is the regular cycle of display and scheduled updates (87, 88, 89) that drives content on the portal device display (90). In response to user-specific information, assuming the needed software application is installed on the user's mobile device, the most relevant content is filtered (91) and notifications (92) are sent to the user. To receive this content, the mobile device must first be captured, a process of detecting a short-range radio signal such as a bluetooth signal, and pairing to establish a handshake between the host server and the mobile device (93, 94). The portal also may mirror the most relevant information to the user's viewscreen. A notification may include a timely invitation to an event or a destination, i.e, a local event that is happening in the present tense. If the user accepts the destination (95), the software will actuate a pathfinder subroutine (96) that guides the user to the destination and may be accompanied by special merchant offers and by local content mapped on a virtual pathway (97) to the destination. Otherwise the system will track (98) breadcrumbs tabulated in the user's device or on line, and adjust search parameters dynamically to optimize the local content and offers displayed to the user. Tracking involves detecting and tabulating (99) pings from beacons disposed in the urban environment, where each beacon is associated in the administrative database with a location and with local content specific to that location, including links to more detailed information. This process is accompanied by notifications of offers that are tailored to interest the user, based on a user profile, the user's recent search and messaging activity, or based on entries on the touch screen interface directed at particular content. Each touch can yield nested content so that the user can increase the relevance through a series of search iterations.

Mobile users lacking the application will be prompted to get the application, and may receive push notifications on the lock screen of special events and offers, as analogous to those notifications received by non-responsive users. But when a user engages by expressing an interest in the content, the portal display and/or the user's mobile viewscreen will be updated to offer expanded local information derived from web sources, including links to particular sites of highest relevance, such as a local destination of interest to the user. This could include a notice about bagels fresh out of the oven, a free cup of coffee, or the opening time of the local art museum, for example. Friends may receive the same notices with content indicating possible rendezvous sites with the user if the user's calendar indicates a meeting. In this way, filtered content is offered that is most relevant to the user's profile, history, or recent activity such as by actuating a touch screen in response to a display of local content. This facilitates the user's capacity to explore the local environment and is ideally suited to sidewalk environments in urban areas where content is sometimes chaotic and easily overlooked.

FIG. 11 is a view of a urban communications portal adapted to monitor and enforce parking laws. The drawing is a conceptual overview of a unit apparatus 100, termed here a "parking portal" or "parking sentinel", and shows the apparatus in an upright position adjacent on a sidewalk 101 to a parking space 102. As will be described below, the unit apparatus comprises three functional modules that may be formed into one or more integrated subassemblies or connected as separate units. These modules include a detection module, a display/user interface module, and a networking module for data exchange with a remote administrative server and database or cloud computing facility. Shown are a pole-mounted sensor with protective cover 103, used here for detection of parking space occupancy and identification of a vehicle 104 by license plate 105, for example, a display module 106 having an interactive user interface, and a communications module 107 employing a radio for communications to and from the remote server. A solar panel 108 is mounted on the top of the unit and supplies some or all of the power consumed by the unit. Also shown is an optional supplemental sensor 109, such as a magnetic proximity sensor, which is fitted into the curb at space 110 and may be fitted with accessory displays, for example a red curb light and audio device for use when parking is forbidden.

Figure 12:
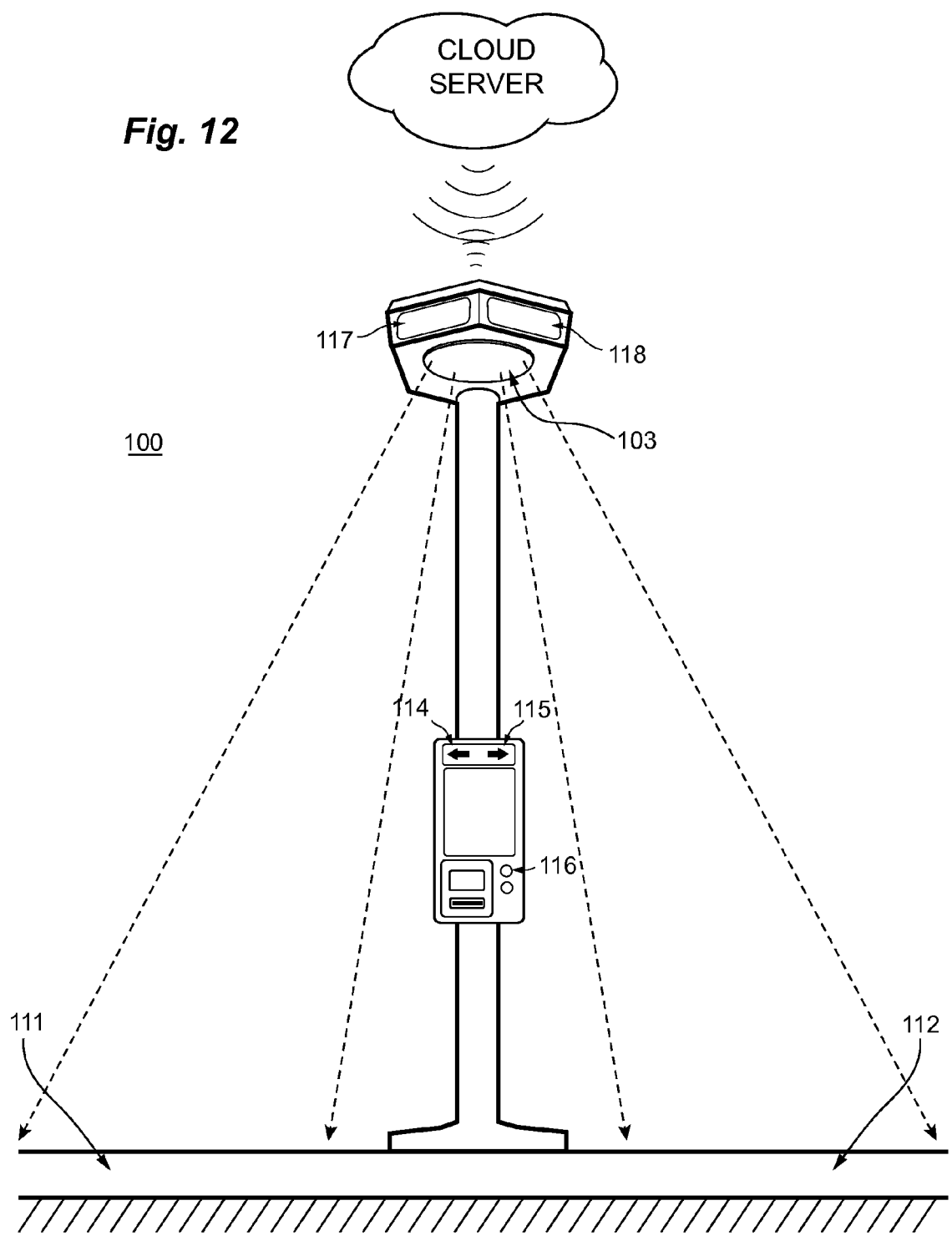
FIG. 12 is a view of an apparatus for monitoring and controlling two parallel parking spaces and for communicating with an administrative network.

FIG. 12 is a schematic view of a parking portal apparatus for monitoring and controlling two parallel parking spaces and for communicating with an administrative server resident in the cloud. The virtual arrows (dashed lines) emanating from the camera dome 103 correspond to areas on the street that designate a parking spot to the left (111) of the center pole and a parking spot to the right (112). Indicator arrows (114, 115) on the user interface flash when the user selects a parking space to pay for, and a switch 116 is provided to select the proper space for which payment is to be credited. Lighting panels 117, 118 at the top of the tower provide readily visible signals for alerting approaching drivers, and can signal that a parking space is available, occupied, reserved, or out of service. These panels may also flash to indicate an emergency situation. Also illustrated schematically is the capacity of the unit to communicate bidirectionally and wirelessly with a remote cloud server, as will be described in the following figures in more detail. In a preferred embodiment the driver is able to use a mobile device such as a cellphone or wireless tablet to communicate with the administrative server for making payment. The administrative server will then instruct the sidewalk parking portal 106 to display status and to provide a receipt. The user's mobile device may collect the receipt for example by taking a picture of a 2D barcode displayed on the interactive user interface. Users may also interact directly with the portal, selecting parking time and setting up a callback if the parking time is exceeded. Users may enter a subscriber number to facilitate these transactions. The portal display is also used to provide information about parking violations and regulations and to permit users to settle parking fines on the spot if they choose.

The front view shows exemplary details of the user interface, which includes elevated signaling indicators that can be seen by oncoming vehicles and a touchpanel with virtual keyboard and text display if desired. The display panel may be suitable for displaying maps and advertisements of local businesses, or coming events, and will be programmed to display any pertinent regulations before the user is asked for payment. Also included in this model is card reader for accepting credit cards or smart cards, and selector switches for selecting type of payment and parking time.

Also shown are directional arrows (114, 115) that are used so that the user can select the spot corresponding to the vehicle for which payment is being made, and the user may select the parking space to the left or the right accordingly. The indicator will flash to ensure that the user is not mistaken.

The signaling and user interface functions are elevated on a pole to provide better accessibility and visibility for users. The pole may also function as an antenna for longer range transmissions. A plexiglas dome protects the sensor(s) and may also provide a source of illumination for use after dark. In some instances, IR cameras are provided, or a supplemental motion detector may be used to turn on the lighting.

In addition to a camera, other sensors may be used to detect vehicles. In these embodiments, sensor feeds are transmitted to a host server and commands to modify the curbside display or user interface are transmitted back to the parking site in a closed loop control system.

Vehicles 104 are sensed by strain-gauges, by shifts in magnetic field, photometrically, by shifts in electric field, by radio tracking, or by other sensing means. The sensors may be distributed in the pavement and communications are mounted in a unit at the curb. Other sensor elements are also useful. Magnetic and photovoltaic sensors are able to detect proximate vehicles and arrays of sensors can detect motion. Infrared, vibrational, strain-gauge, and ultrasonic sensors may also be used.

In one embodiment, an RFID chip mounted on the vehicle license plate 105 and the process of recognizing the RFID chip is automatic when the vehicle comes to rest in a parking space. The RFID reader is in display/user interface unit 106. In another example, the RFID chip carried by the driver for payment of parking fees is used to automatically bill a prepaid account for time parked. Information about available parking spaces is transmitted to a remote administrative server and retransmitted to a webpage where a current map of available parking spaces is made available to users.

As will be described below, in a first design, a modular parking portal apparatus 120 may comprise three functional modules that may be formed into one or more integrated subassemblies or connected as separate units. These modules include a detection module (121, shown here with a camera imaging system sensor), a display/user interface module 122, and a remote administrative server and database at a cloud-based computing facility 123, linked to the portal by a wireless comm link 124.

Figure 13:
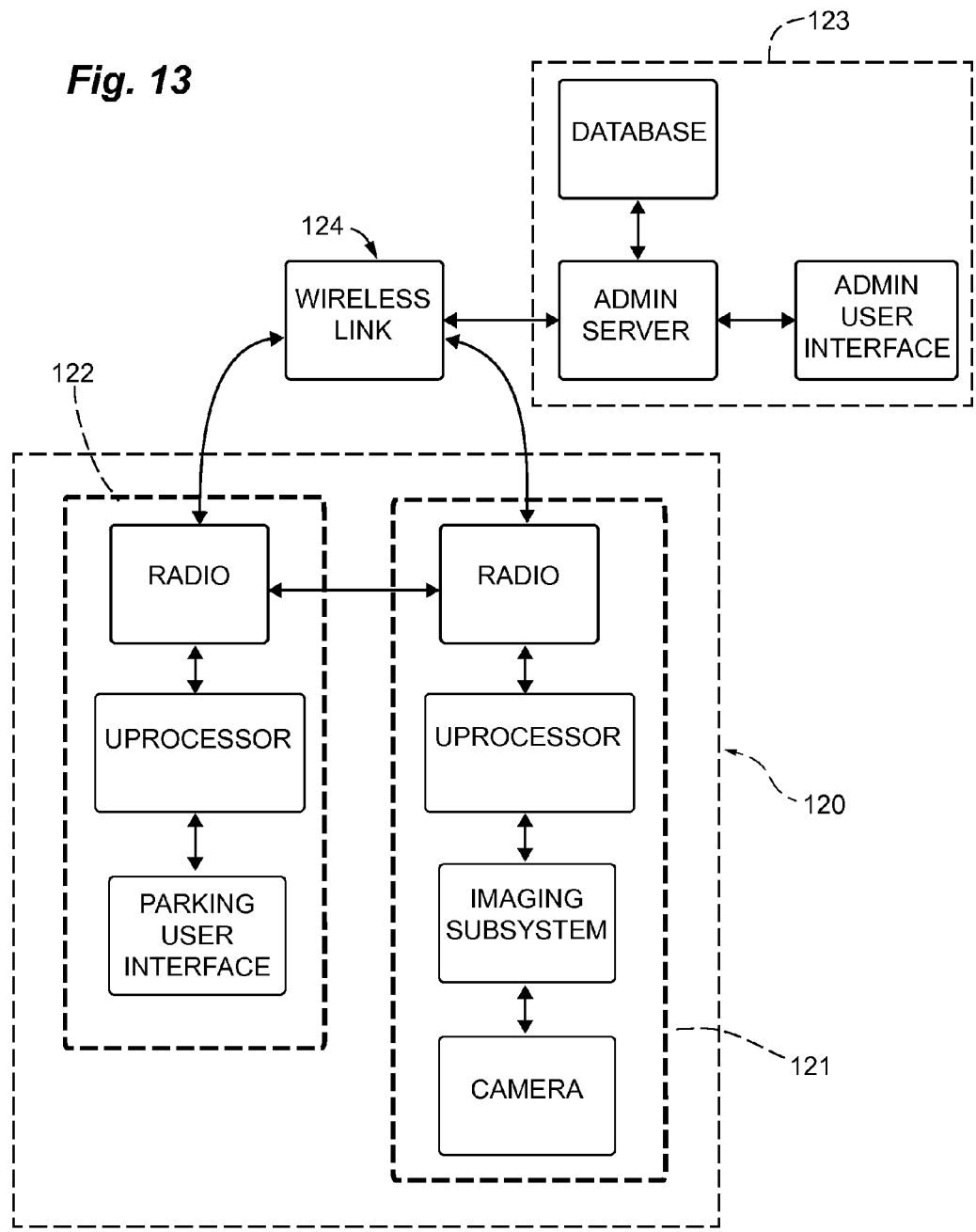
FIG. 13 is a first block diagram of circuitry for sensing and analyzing parking activity in a parking space and for displaying indications to update the status and allowed use of the parking space. Also shown is a representation of a wireless link to a remote server, administrative database and user interface.

FIG. 13 is a first block diagram of circuitry for sensing and analyzing parking activity in a parking space and for displaying indications to update the status and allowed use of the parking space. In this embodiment, a parking user interface 122 is mounted in the user interface/display module at street level and a detector is mounted in the detector module 121. The detector is generally pole mounted and is elevated. The separate modules share information and instructions by use of radio transceivers mounted on each circuit board and also share power but are otherwise independent and physically separate for convenience in manufacture and maintenance.

A variety of sensors may be used to detect parking space occupancy status. Sensors may include motion sensors, acoustic sensors, radar, vibration sensors, photodiodes mounted at the curb, strain-gages mounted in the parking space, RFID transceivers capable of recognizing a unique RFID chip associated with each vehicle, electric field sensors, and so forth. Passive infrared sensors, acoustic range-finding sensors, magnetic field sensors may also be used. Vehicles emitting a radio transponder signal may also be tracked by radios mounted in the urban portals and their parking actions determined by examining triangulation data and breadcrumbs. A camera may be used in conjunction with these sensors if desired and supplies added information not readily detected by other sensors. Advantageously, by using two sensors, synergy is achieved, such as for differentiating cars from bicycles.

Where a camera is used, CCD cameras are preferred. The camera is included in the detector module and is operated under control of a local microprocessor. The detector module will include a frame buffer and may optionally include added image or video signal processing subcircuitry. Signal processing is directed at detecting motion in the parking space and compressing image information for transmission to a remote administrative module which includes a server and a database, with optional cloud computing capacity. Desirably, the camera is also capable of taking a higher resolution still image and transmitting that through the communications module to the administrative server. The server is shown here with its own administrative user interface for programming and monitoring apparatus functions.

Generally the processor has a certain level of autonomous operation in initiating electronic subroutines such as image pre-processing and compression and executing display messaging. Programmable instructions may be stored as firmware or in EEPROM chips on the circuit boards, or detailed instructions may be executed as received from the communications port.

In operation, baseline images of the empty parking space are taken periodically; changes in pixel content of the image are then compared to the baseline and when a pattern consistent with motion is detected, higher resolution images can be captured. Pixel changes also allow the camera to detect the direction and speed of motion so that two kinds of events are recognized: a) vehicle entering parking space; b) vehicle leaving parking space.

Thus four conditions are recognized, including i) parking space vacant, and ii) parking space occupied. This data is used to configure the instructions to the display module and user interface, which will display indicators or instructions as appropriate. The display module may include high and low resolution display elements. In a simple system, a series of LEDs having colored lenses may be used to indicate basic messages, red meaning no parking allowed, green meaning parking permitted, yellow meaning caution, such as when a parking fee is about to expire, and blue meaning enforcement action is being initiated, such as by taking a high resolution photo of the vehicle so as to identify its owner.

Figure 14:
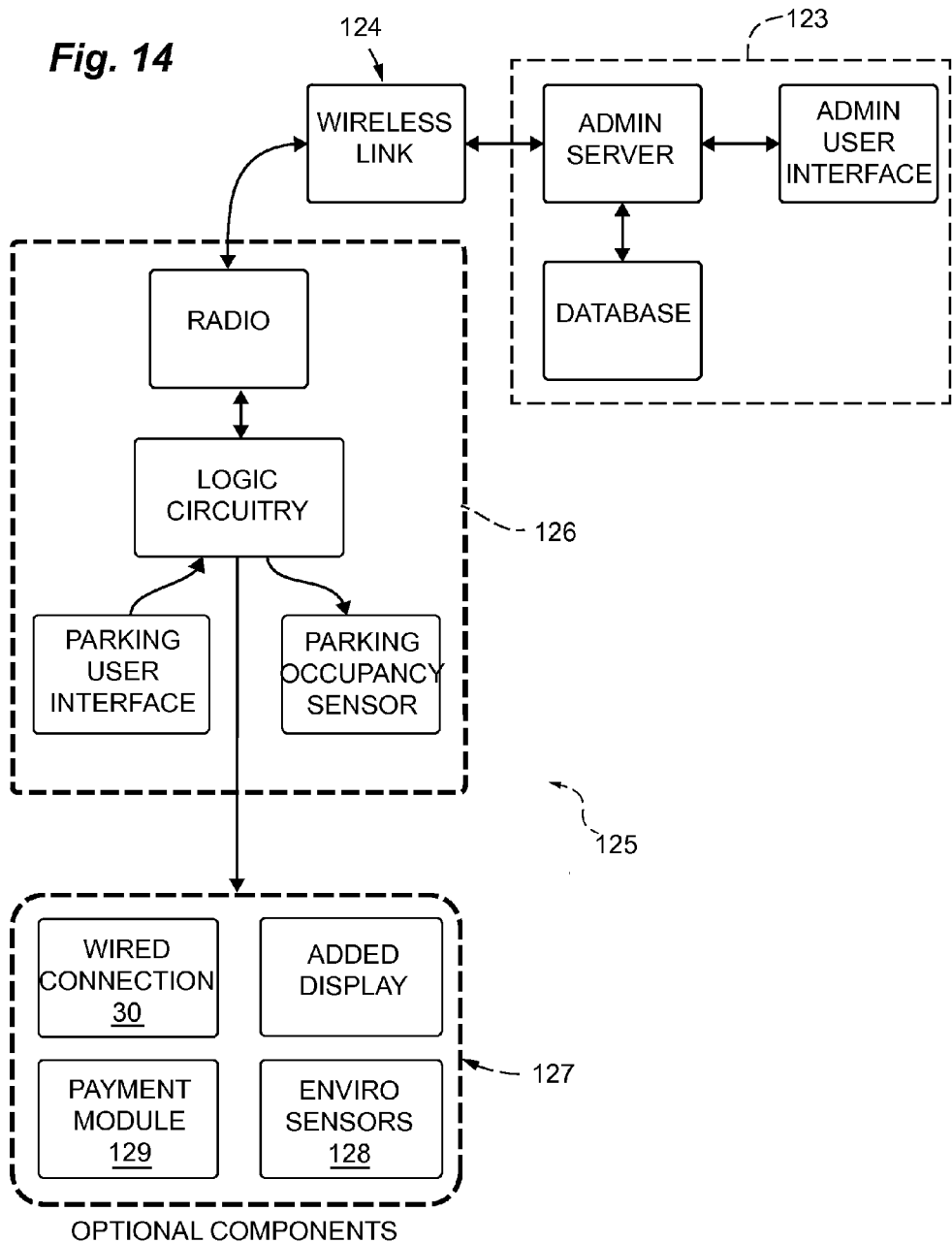
FIG. 14 is a second block diagram of circuitry for sensing and analyzing parking activity in a parking space and for displaying indications to update the status and allowed use of the parking space. Also shown is a representation of a wireless link to a remote server, administrative database and user interface and optional components with added functionalities.

FIG. 14 is a second block diagram 125 of circuitry for sensing and analyzing parking activity in a parking space and for displaying indications to update the status and allowed use of the parking space. Also shown again is a representation of a wireless link 124 to a remote server, and cloud-based administrative database with administrative user interface 123, and optional components 127 with added functionalities. In this embodiment, a single radio (module 126) serves both the parking occupancy sensor (the detector) and the parking user interface (the display). The tower also may serve as an antenna for the radio functions where a wired connection 30 is not available. Dual-use antennas are used to allow operation at different radio frequencies, one for extended range and another for shorter range, for example.

In another option, environmental sensors 128 may be included to detect changes in external conditions that could interfere with optical detection, such as heavy rain or snow, or other interference. Additional displays may be incorporated in the display module or mounted independently, for example a colored light at the pinnacle of the portal tower for better visibility. Interestingly, the sensor array for parking may be substituted or be supplemented with the environmental sensor arrays used for the urban pedestrian portals described earlier. The platform supporting the two systems allows a significant level of interchangeability in manufacture and installation of intelligent urban communications portal systems.

As shown in FIG. 14, a payment module 129 is mounted in association with the parking user interface if desired. The module may include a card reader for taking credit card payments and a keypad for entering basic data such as time to be paid in advance, for or a telephone number for the server to use when sending a warning to a parking user that the time is almost up. The telephone number may also be used to signal that enforcement action is imminent. This data is typically stored in the administrative database until needed.

One skilled in the art will recognize that other microprocessor configurations may be used to accomplish the objectives of the invention. While we have enabled particular configurations for illustration in this disclosure (c.f. FIGS. 5 and 9B), other methods having an equivalent operability are also conceived. Other communication, user interface, and sensor circuit options will also be apparent, such as wired connections to the administrative center, and other forms of detection employing electromagnetic, optical or physical detection means.

The particulars of the networking system will now be described in more detail. FIG. 15A is a schematic diagram of a first part of a networking system, the first part comprising a communication link between a local administrative host server and a plurality of parking monitoring and control units in an urban grid 2. The parking portals and associated sensors form an array over several city blocks, each having an independent electronic address corresponding to a physical location. Also part of this network are guest devices, such as cellphones, laptops, beacons, and dedicated mobile devices. While shown here as an urban block grid for illustration, the same system may be used at shopping malls, airports, and other areas in need of parking management.

Although represented figuratively, parking portals are arrayed on the sidewalks of each city block and are directed to monitor parking spaces in a parking lane adjacent to the curb. We have found that each parking portal can control multiple parking spaces, and fields of detection can be overlapped with neighboring parking sensors so as to provide a level of redundancy for better detection. Radio communication between the host server and the antenna farm is addressed so that each signal (shown here as emanating waves) from a parking unit can be associated with a designated parking space by an electronic address. In an initial setup, all parking spaces are shown as vacant, and accepted future use of each parking space is first determined by a query to a remote database. This information is sent to a signaling module of the parking portal so that alerts, indications or messages are displayed on a user interface display and drivers are notified of the accepted use, any rules that apply, and parking rates. When a driver parks in a space, the monitor detects that motion, and the parking portal alerts the host server so that the database can be updated. The host server issues commands to change the signage at the designated parking space to reflect that it is now occupied, and can engage the user through the user interface to accept payment.

The host server can also display the parking space array on a webpage accessible to portable internet browsing devices, highlighting vacant spots, so that drivers are aided in finding an available parking space. Alternatively, mobile devices can be equipped with an application or an API that can query the host server database and display the results of a search for a vacant parking space in the form of a map or list.

The host server, using signage displayed on the parking portal, has the capacity to prohibit parking entirely, to restrict parking to certain types of parking such as commercial delivery, or to certain kinds of vehicles, such as those having handicapped RFID tags. Restricted parking may also be applied by special permit for monthly or pre-paid users, and certain parking spots may be reserved for regular customers if a business makes a suitable arrangement with the city. Special events can also be scheduled and parking availability can be adjusted to accommodate events such as parades and demonstrations. In each case, fees may be collected directly from the users at time of service, or with pre-paid plans, or through sponsors. Advantageously, the user interface can also display messages from the sponsors, business listings, maps of local sights, and general interest messages, all at a fee, so the system becomes a revenue source for the administrative entity in several ways if desired.

The system is also capable of detecting exceptions, such as when parking occurs against the rules or without payment. Enforcement action can take the form of a warning, a ticket electronically mailed to the violator, or dispatch of a towing service, without the need for a large staff of "meter maids" to circle the streets in small carts and try to catch violators.

In one embodiment, the user interface may include a keypad for entering a telephone number, or the telephone number can be acquired when the user makes payment information. The telephone number may also be used to signal that meter time is expiring and enforcement action is imminent. This data is typically stored in the administrative database until needed. In one application of the network, a user who is lost can dial up the host server help function and be provided with directions back to his parked vehicle. Sensors may also be used to detect vehicle break-ins and notify authorities in the area. The sensor web may be disposed in an urban grid as shown in FIG. 15A, or in shopping mall and sports arena parking lots, for example.

In an improved version, fewer portals are required. Individual portals may control multiple parking spaces by modifying the portal to include rangefinding radio pairs as described with reference to FIGS. 3, 4, 5, 9B and 21. By tracking motions of individual cars in more detail, such as pauses and reverse motion, parking occupancy can be inferred over distances of a city block.

Thus the invention involves a sensor web generally as shown in FIG. 15A, but the web also has the capacity to modify the urban infrastructure, shopping mall, airport parking structure, or sports arena, and related venues, by updating addressable signage and displays so that parking usage can be optimized, taking into account user's needs, the overall traffic burden on particular streets at particular times of day, commercial delivery schedules, special events, and so forth. With time, the system will evolve to improve parking and traffic flows according to patterns detected by cloud-resident intelligence.

Figure 15B:
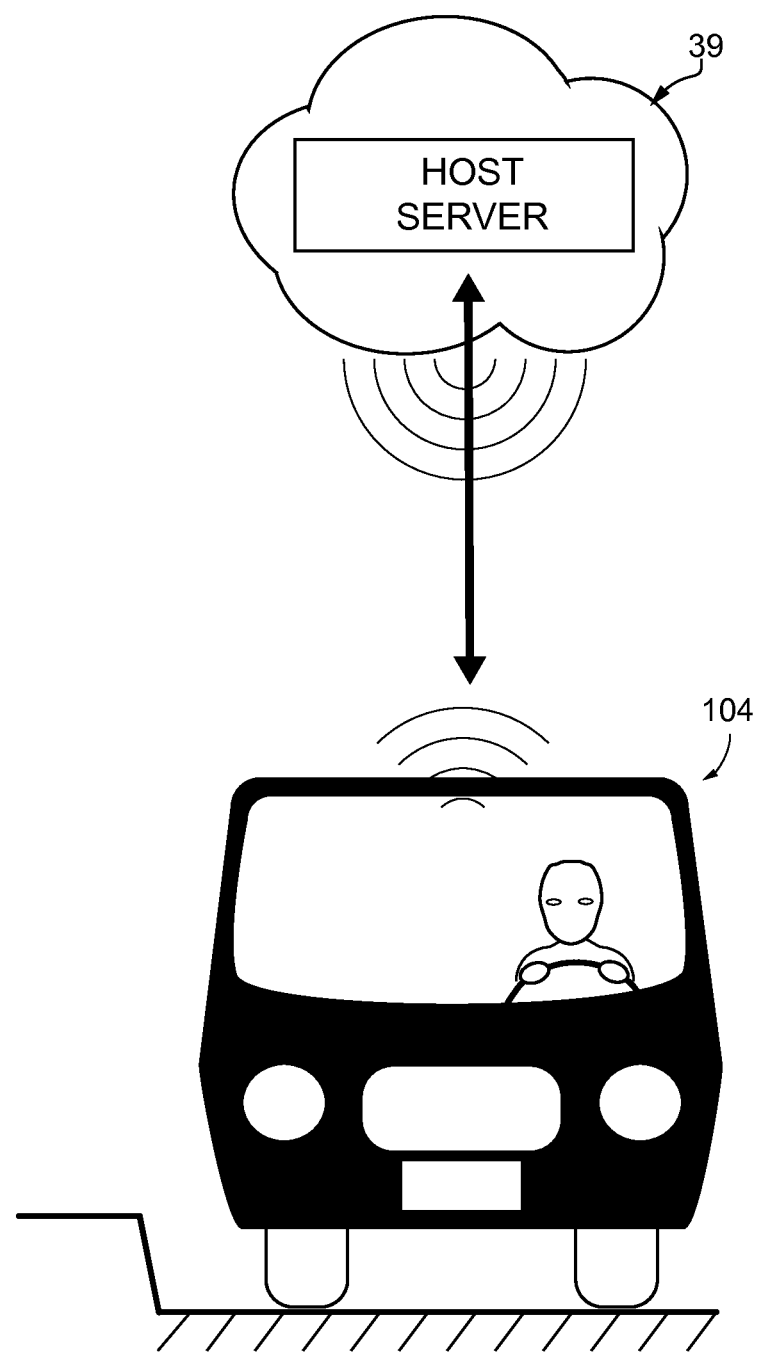
FIG. 15B is a schematic diagram of a second part of a network system, the second part comprising a communication link between an administrative host server and a vehicle or user. The first and second parts of the networking system are configured to act cooperatively in functioning to monitor and manage parking usage and communication with users.

In more complex embodiments, the system is also capable of accepting inputs from users, as will be described below. FIG. 15B is a schematic diagram of a second part of a network system, the second part comprising an administrative host server in the cloud 39 with a bidirectional wireless link to a vehicle 104 or user, such as to a device mounted in the vehicle or a mobile device that accompanies the guest user. The portals and sensors are configured to act cooperatively with the cloud-based or local host servers in functioning to monitor and manage parking usage and communication in an urban grid. In this way, a closed loop (60, FIG. 15C) is formed. Communications from a user in search of a parking space are answered by the administrative server, directing the user to a vacant spot, which illuminates or signals to confirm the user is at the right location. The handshake can then be extended to complete a payment transaction almost as quickly as the user can park the vehicle.

Figure 15C:
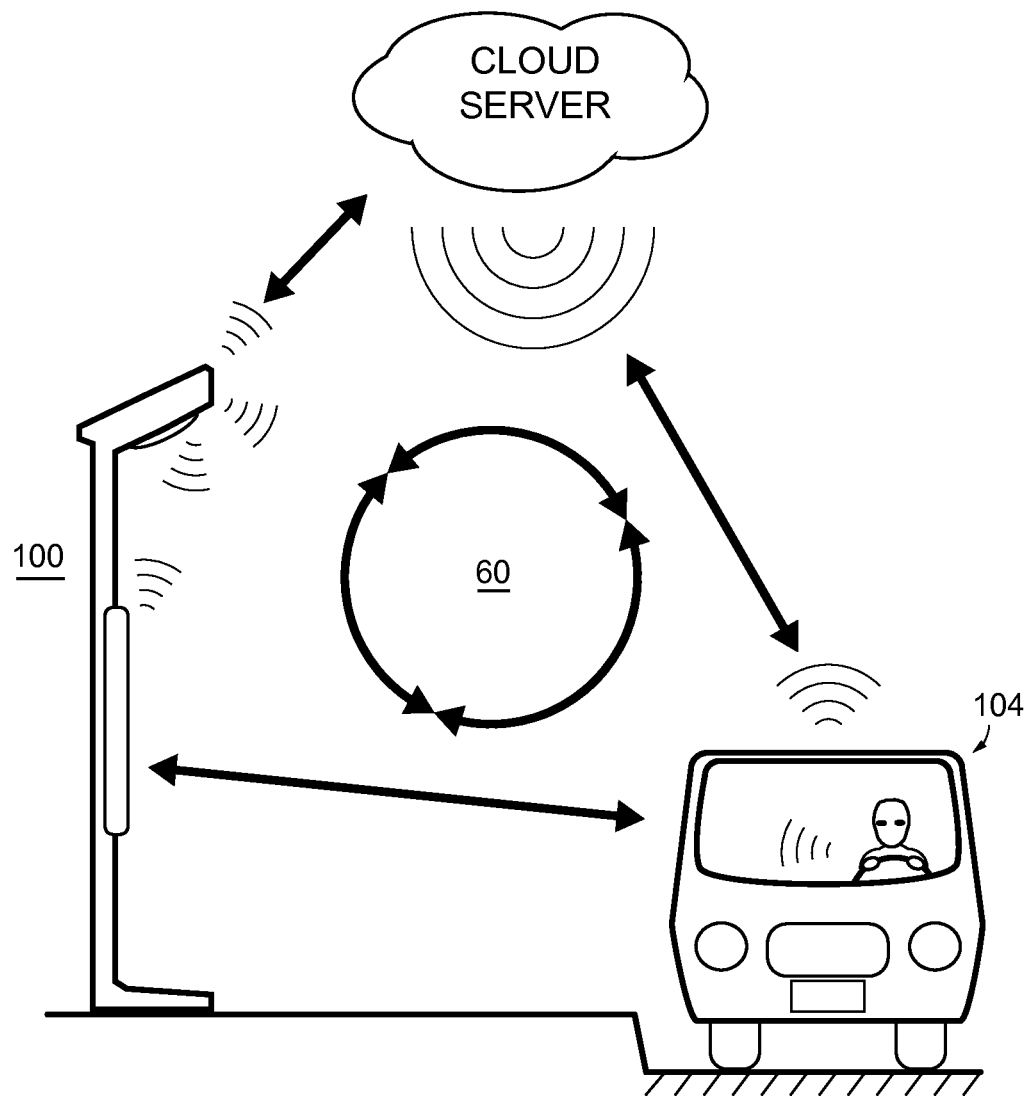
FIG. 15C represents an alternative view of an ad hoc "closed loop" data flow involving cloud-based motorist interactions with a remote server through an urban communications portal.

FIG. 15C illustrates a complex network or "data web" that forms when communication is directed between the user in a vehicle 104, a cloud server, and a parking portal 100, which is a cloud-linked node in the network. In this system, the user not only has full transparency to see a map of the system (as if from a satellite view, showing all vacant and occupied parking spaces and perhaps also traffic flows), but can also query the system to ask for directions to a parking space, locations of local businesses, and a full service menu of local information that ties to parking. Parking portals assist in escorting the guest to the parking space. Thus feedback flows are bidirectional—from guest to host and from host to guest. The user experiences the system as an intelligent device because it responds to the context as well as his queries and selections. While such systems would seem immediately desirable, the parking revenues are the key feature that pays for the accessory functions that drivers make use of, but the whole community benefits. Merchants may also advertise on the parking portals, increasing the revenues stream. Community benefits and other advantages of the invention are described in more detail in the following figure, which shows how parking usage can be modified to accommodate multiple uses over a daily cycle.

FIGS. 16A, 16B, 16C, 16D, 16E, and 16F are schematic depictions a street 130 in an urban grid, the street having a sidewalk 131 on each side and corners at each end. Also represented are parking portals of the invention, shown mounted two per block (132, 133, 134, 135). Arrows represent the corners of visual fields being monitored from each parking apparatus so that four portals monitor the usable parking area between intersections. The FIGS. 16A through 16F form a time-lapse sequence such as might cycle during a typically workday so that use of the apparatus to monitor and more efficiently control parking is graphically illustrated. The portals also include signage that indicates parking regulations, which may change with conditions or time of day.

Figure 16A:
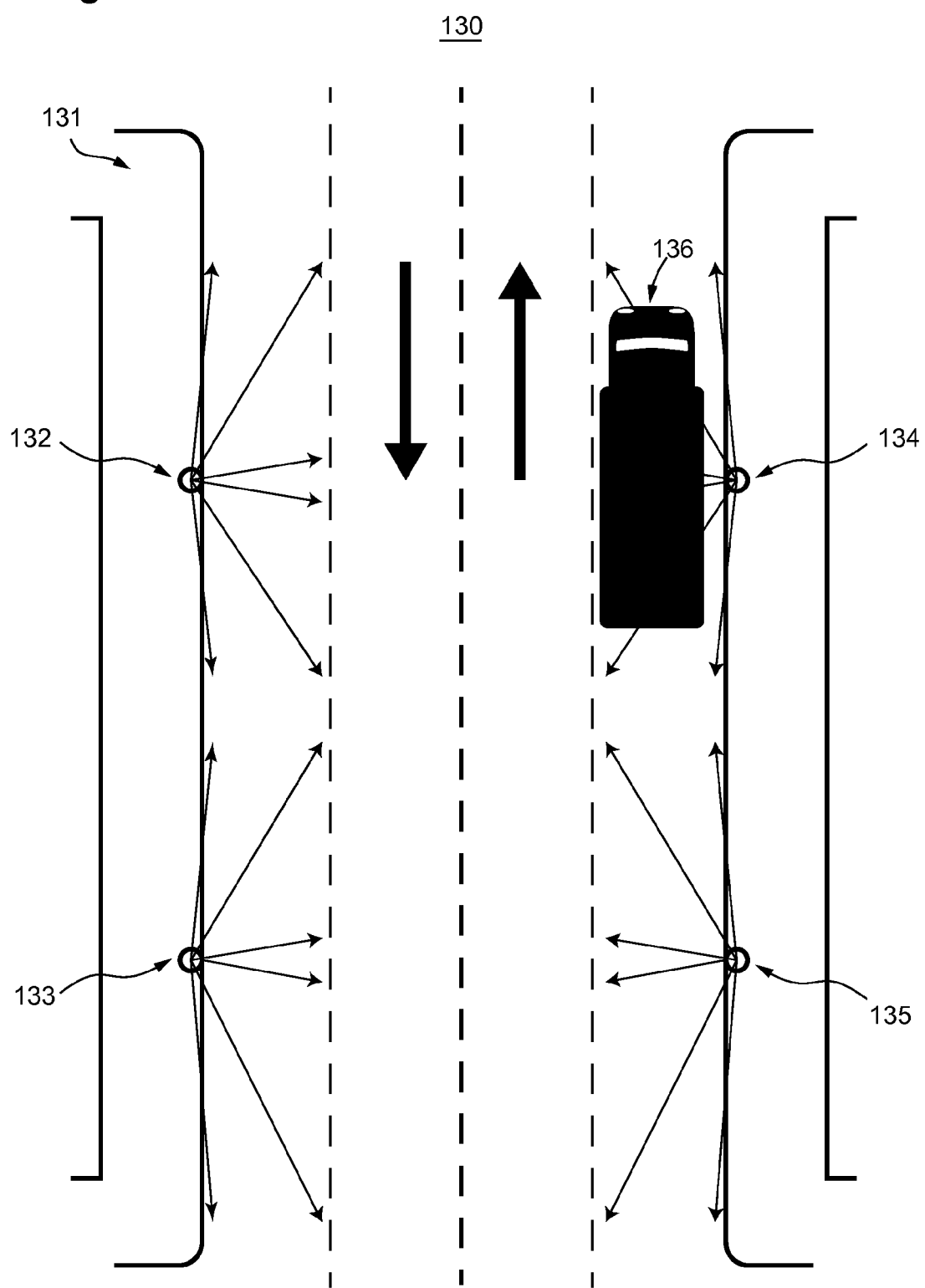
FIGS. 16A, 16B, 16C, 16D, 16E, and 16F are schematic depictions of parallel parking spaces on a street in an urban grid. Also represented is a sidewalk on each side of the street, and parking portals of the invention are shown mounted on the sidewalk. Arrows represent the corners of visual fields being monitored from each parking apparatus so that four portals can monitor eight "virtual" parking spaces. The FIGS. 16A through 16F form a time-lapse sequence such as might cycle during a typically workday so that use of the apparatus to monitor and more efficiently control parking is graphically illustrated.

In FIG. 16A a pair of parking spaces monitored by portal 134 is reserved for a morning delivery truck 136 between the hours of 5 AM and 6 AM. No other parking use is permitted according to signage that was electronically posted by the administrative server. Violators are automatically ticketed. A local business pays a small fee for this service.

Figure 16B:
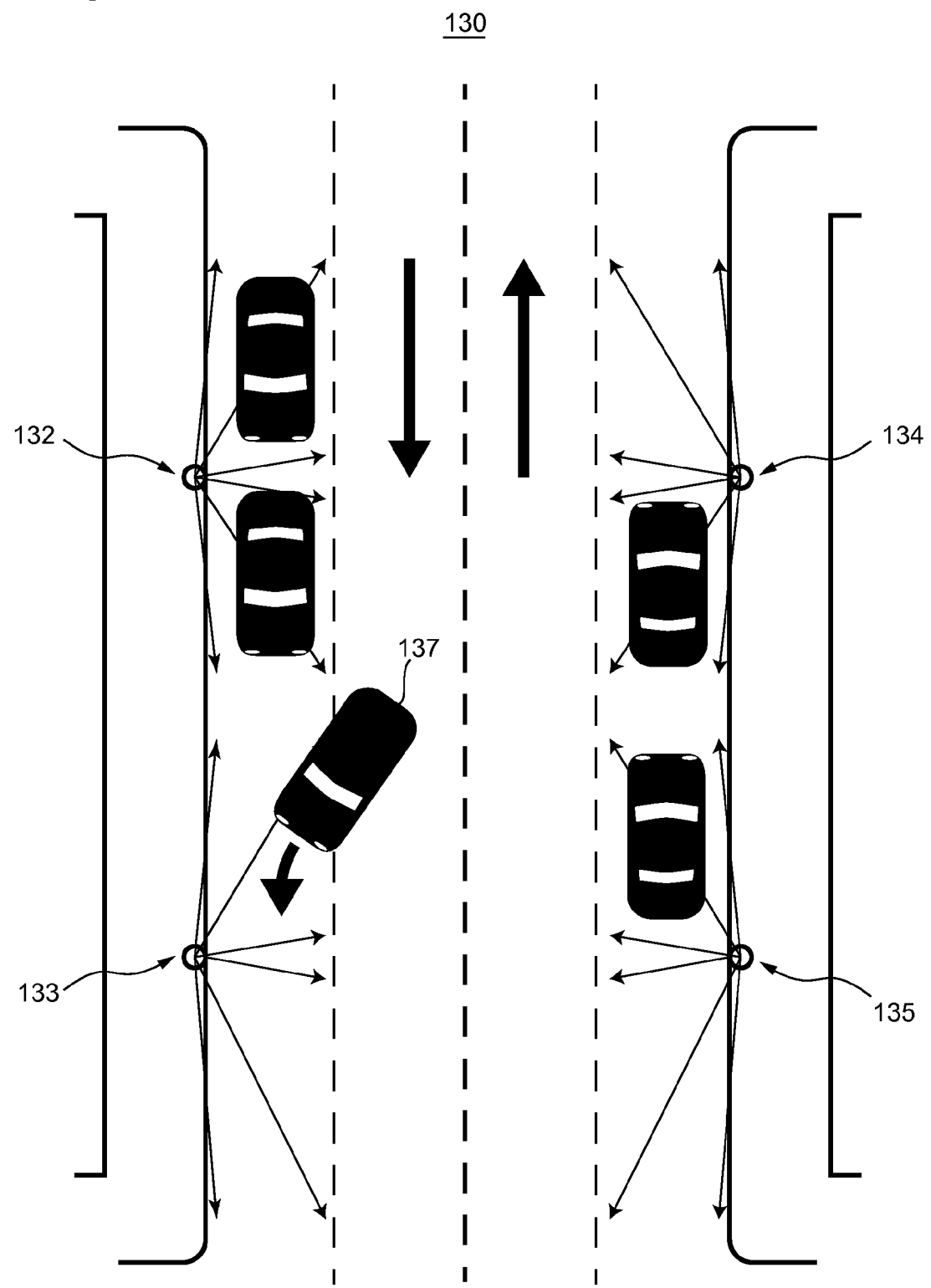

In FIG. 16B, several customers have parked in time for opening of shops at 8:30 AM. One car 137 is pulling into a spot monitored by portal 133. Portal 133 detects an ENTERING IN state. Other portals have reported parking spaces OCCUPIED and the administrative database is updated accordingly.

Figure 16C:
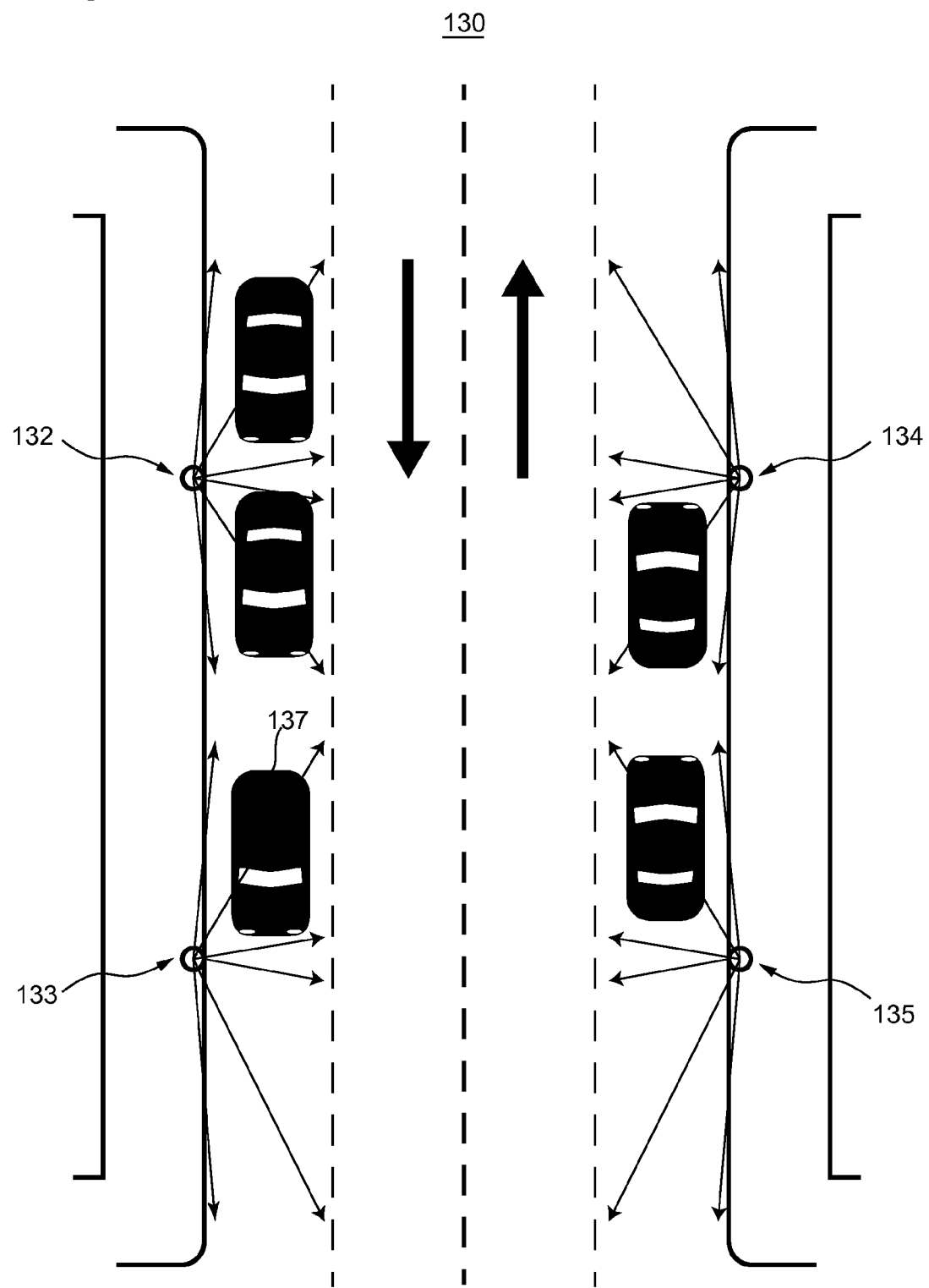

In FIG. 16C, vehicle 137 has occupied a parking space. The proximate portal 133 records this activity, indicating in the database that the parking spot is OCCUPIED, and receives an instruction to update the signage so that a message is displayed advising the user to pay the required fee and providing instructions.

Figure 16D:
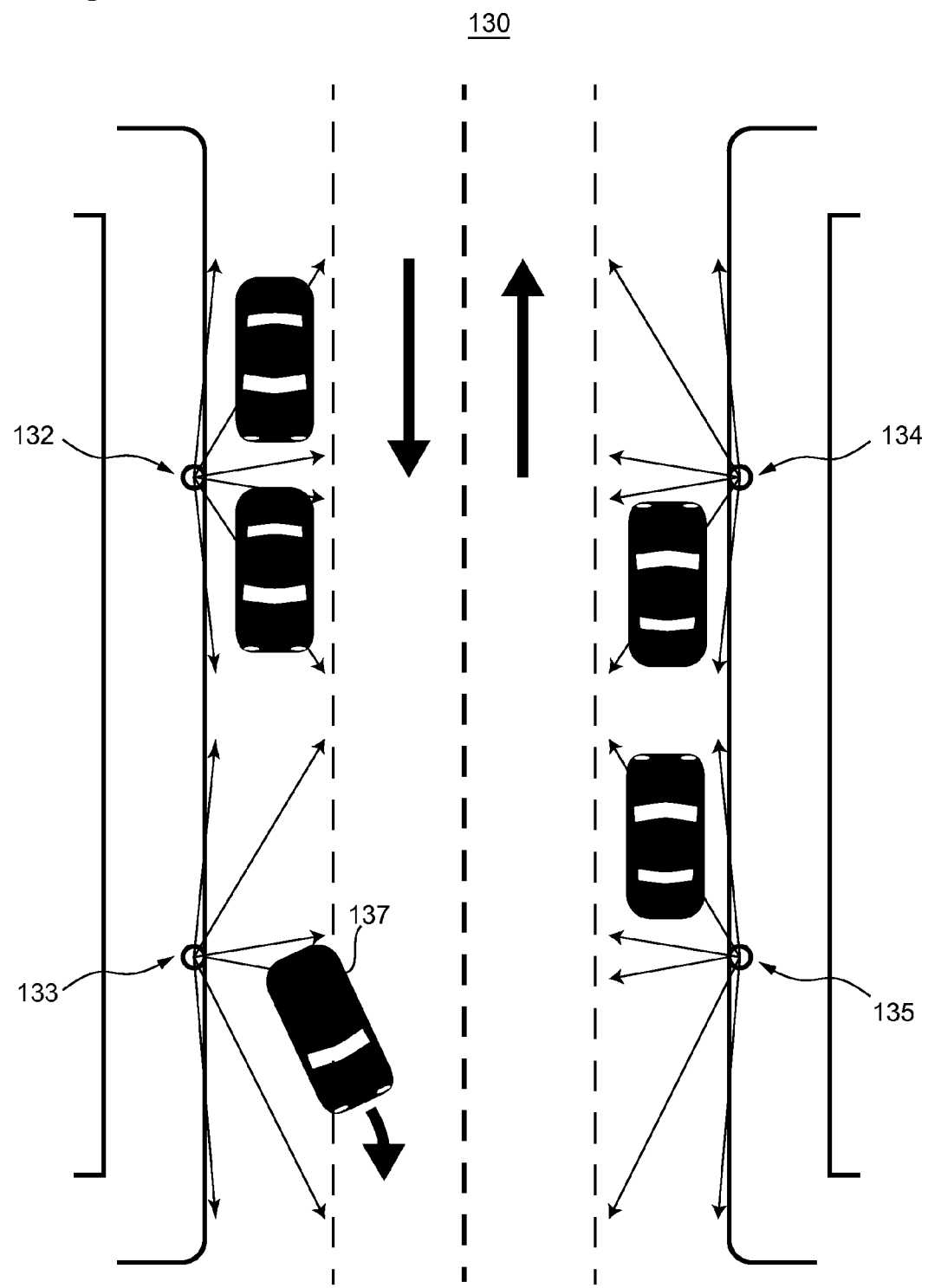
Figure 16E:
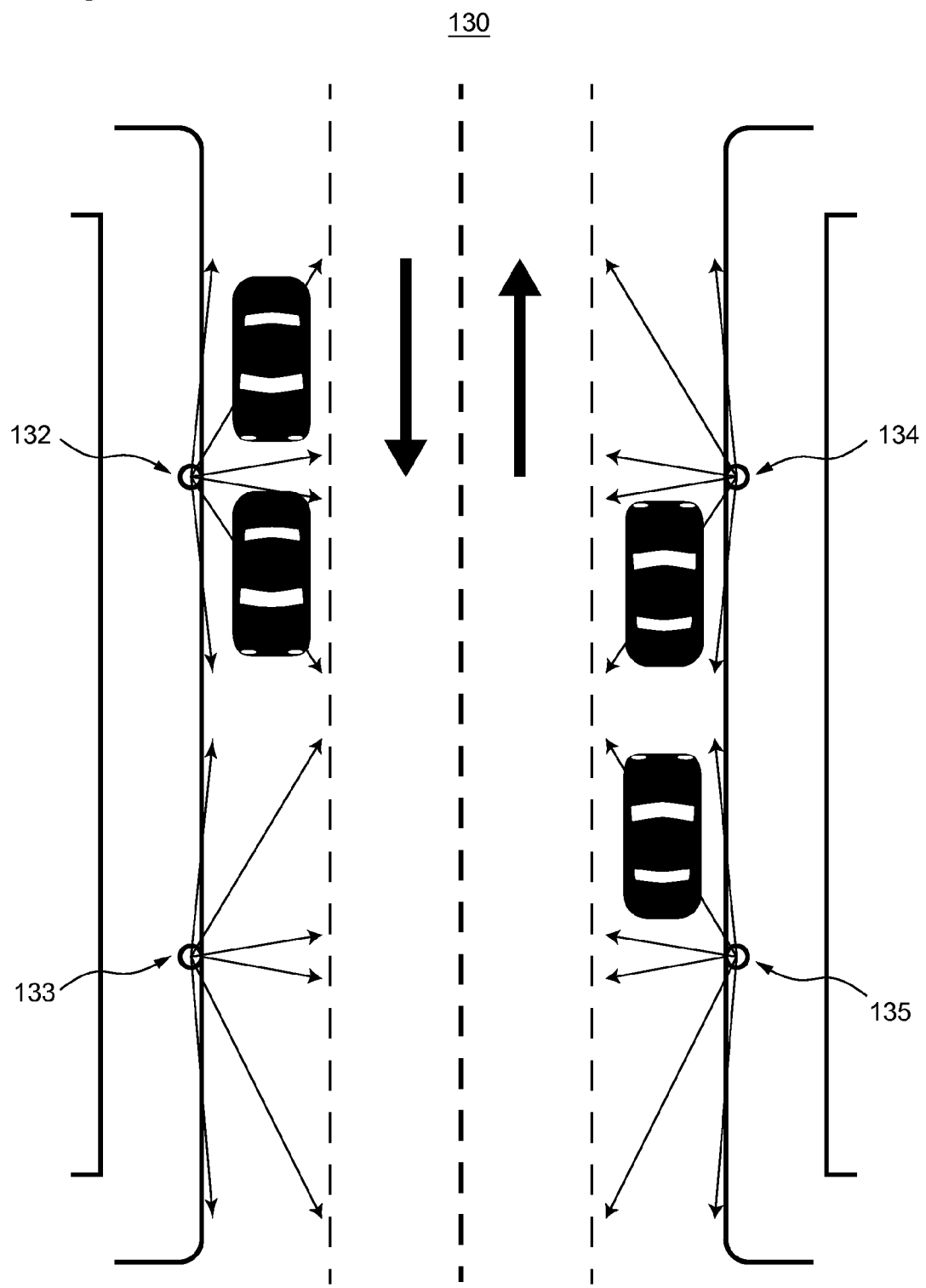

In FIG. 16D, not long later, vehicle 137 exits the parking space, and portal 133 detects a EXITING OUT condition followed by a parking spot VACANT/AVAILABLE condition. The database is updated and the parking spot is again listed as available. The embedded notification system changes the user interface display to indicate that the parking space is available. The street view is shown in FIG. 16E. Parking at any of the eight parking spots is permitted until 4 PM, for example. At 4 PM the displays are automatically updated and a sensor verification is run to make sure all parking spaces have been vacated. This kind of intelligent grid may be improved by adding adaptive control software for synchronizing traffic lights, but the systems of the invention offer a sensor web and distributed display capacity to the interconnected problems of parking and traffic control, an advance in the art.

Figure 16F:
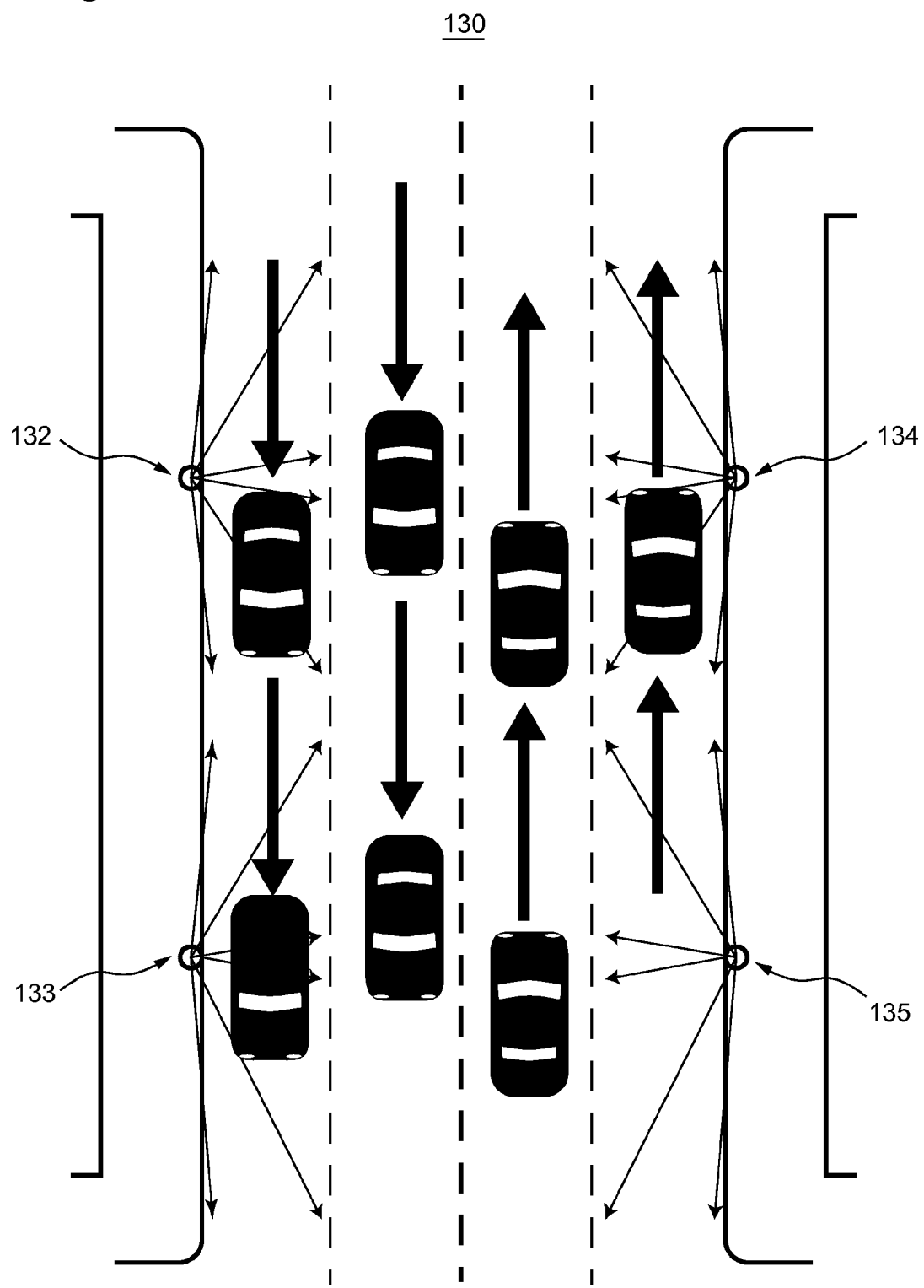

As shown in FIG. 16F, by 4 PM the parking signage has been reconfigured to permit traffic in all four lanes and prohibiting any stopping. The roadway is now a 4-lane street having two lanes of traffic in each direction. This signage is maintained until after rush hour, and evening traffic rules begin at 6:40 PM. During the rush hour period, portals 132, 133, 134 and 135 all display a prominent NO PARKING indication.

Figure 16G:
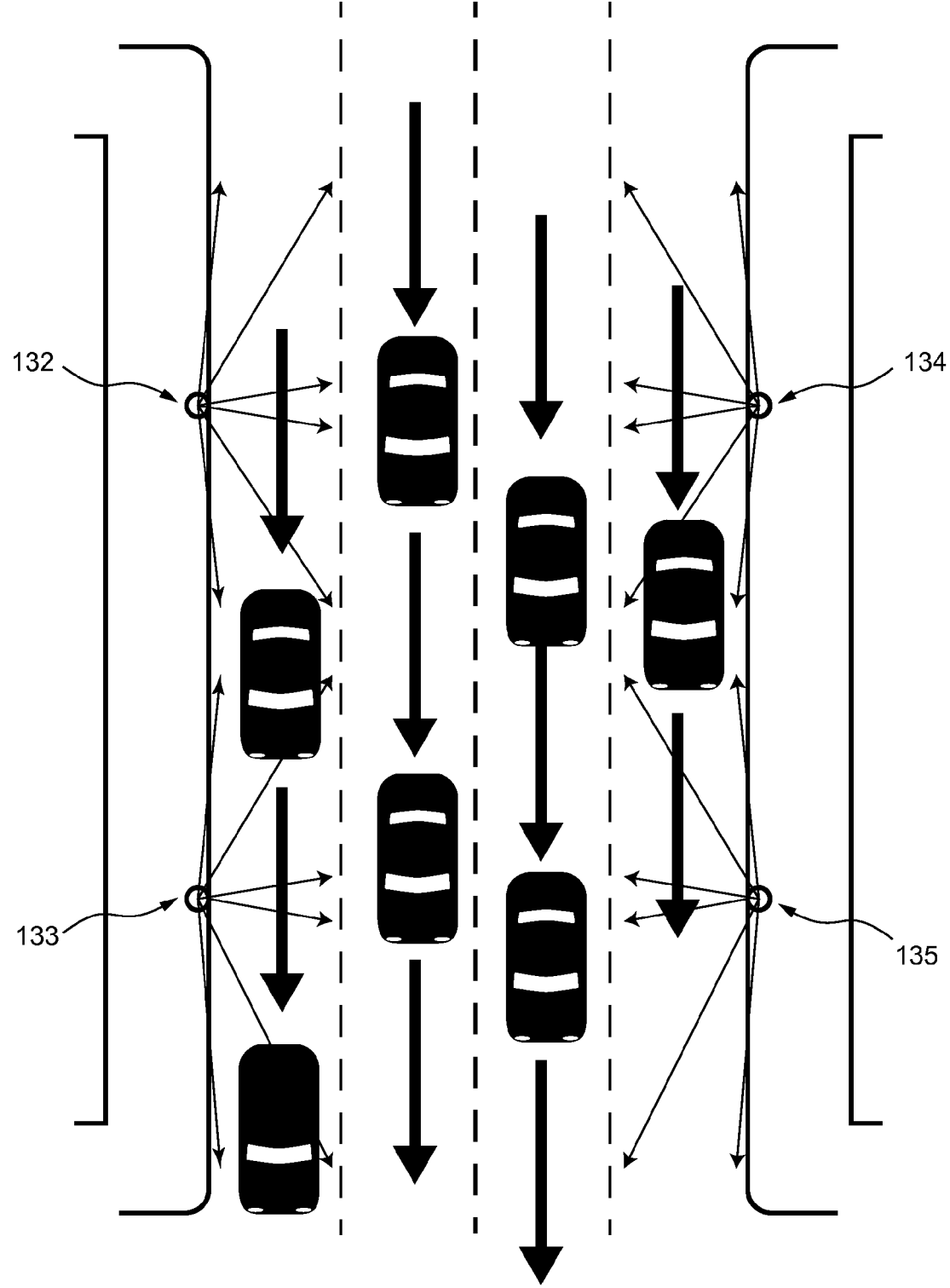
FIG. 16G shows a view such as in an emergency evacuation of a city, when all lanes are changed to one-way out of the urban core.

FIG. 16G shows a view such as in an emergency evacuation of a city, when all lanes are one-way out of the urban core.

Figure 17:
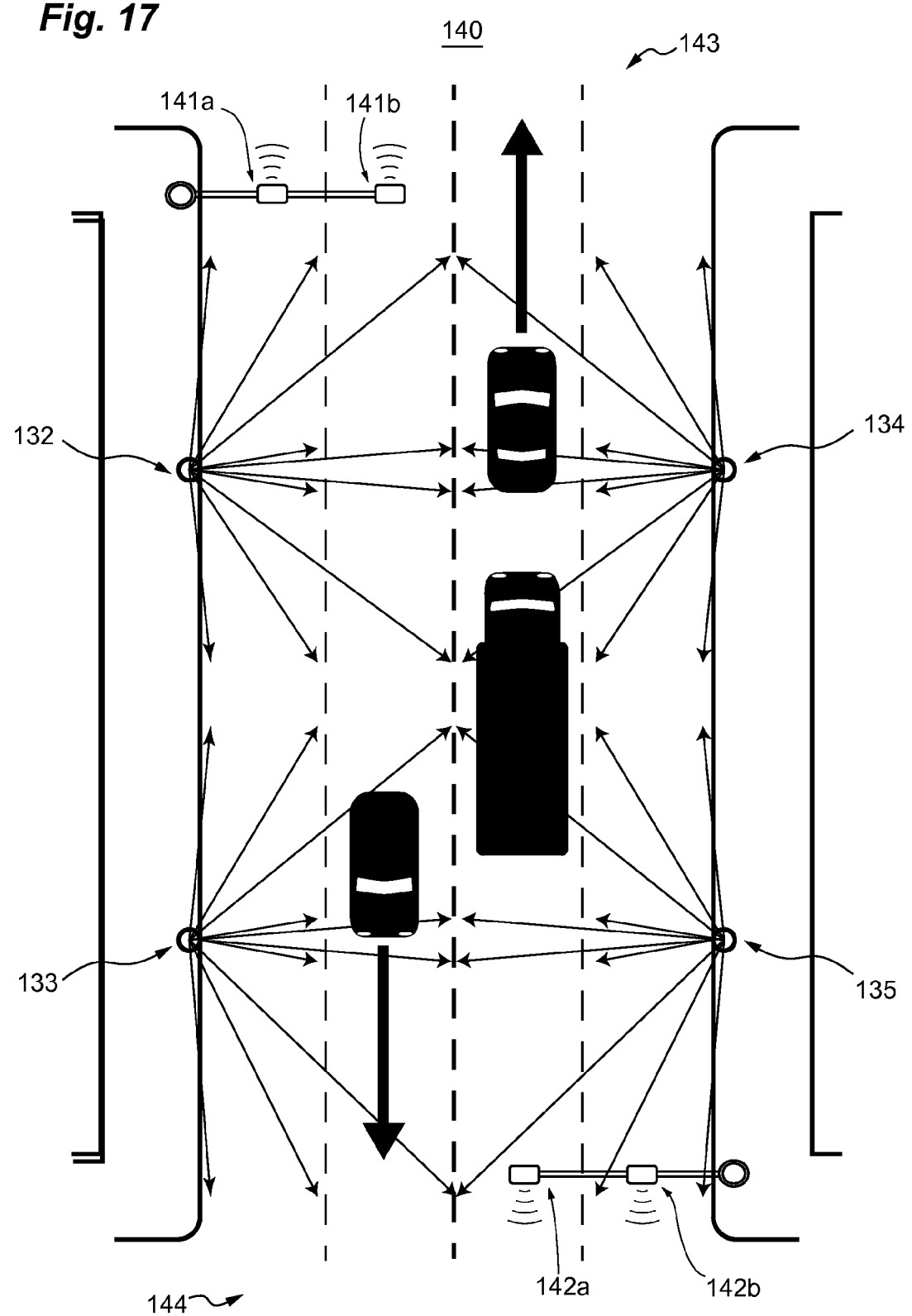
FIG. 17 is a schematic view of an urban boulevard with parking portals mounted on the sidewalks parallel to the roadway. Sensor distance has been extended to monitor traffic across both center lanes. Signals are analyzed to estimate congestion and delays, and traffic lights are adaptively synchronized using an algorithm based on portal traffic sensor input from primary boulevards and side streets. In this view, traffic lights are posted across two lanes in each direction.

FIG. 17 is a schematic view of an urban boulevard 140 with parking portals (132, 133, 134, 135) mounted on the sidewalks parallel to the roadway. Sensor distance has been extended to monitor traffic across both center lanes. In this view, traffic lights (141a/141b and 142a/142b) are posted across two lanes in each direction and are directed at the adjoining intersections 143 and 144. Signals from the parking portals are analyzed for patterns to estimate congestion and delays, and traffic lights at the intersections 143 and 144 are adaptively synchronized using an algorithm based on portal traffic sensor input from primary boulevards and the adjoining side streets. If a stopped vehicle is detected, assistance is dispatched.

Thus the parking portals may function in networks as traffic sensor systems. As demonstrated in FIG. 17, a camera pixel plane has a potential to see motion in the lane outside the curbside parking zone so that two or more portal units, acting together, can get a cooperative sense of speed of traffic flow and how much backup there is at traffic lights and intersections. The information from the sensor web may be used to control traffic flow over large areas of an urban core. Advantageously, unlike other systems for synchronizing traffic lights, the parking portals also generate revenue to pay for their installation and operation. The sensor web provides patterns of motion that can be used to control traffic signals and maximize vehicular throughput, avoiding overload of particular intersections by relieving bottlenecks. By offering digested sensor patterns to users, users may plan their routes to distribute traffic over less used arterials or to change their departure times to avoid peak crowding of roadways. Similar improvement can be obtained using parking portals having radio or motion sensors to monitor vehicular traffic.

Figure 18:
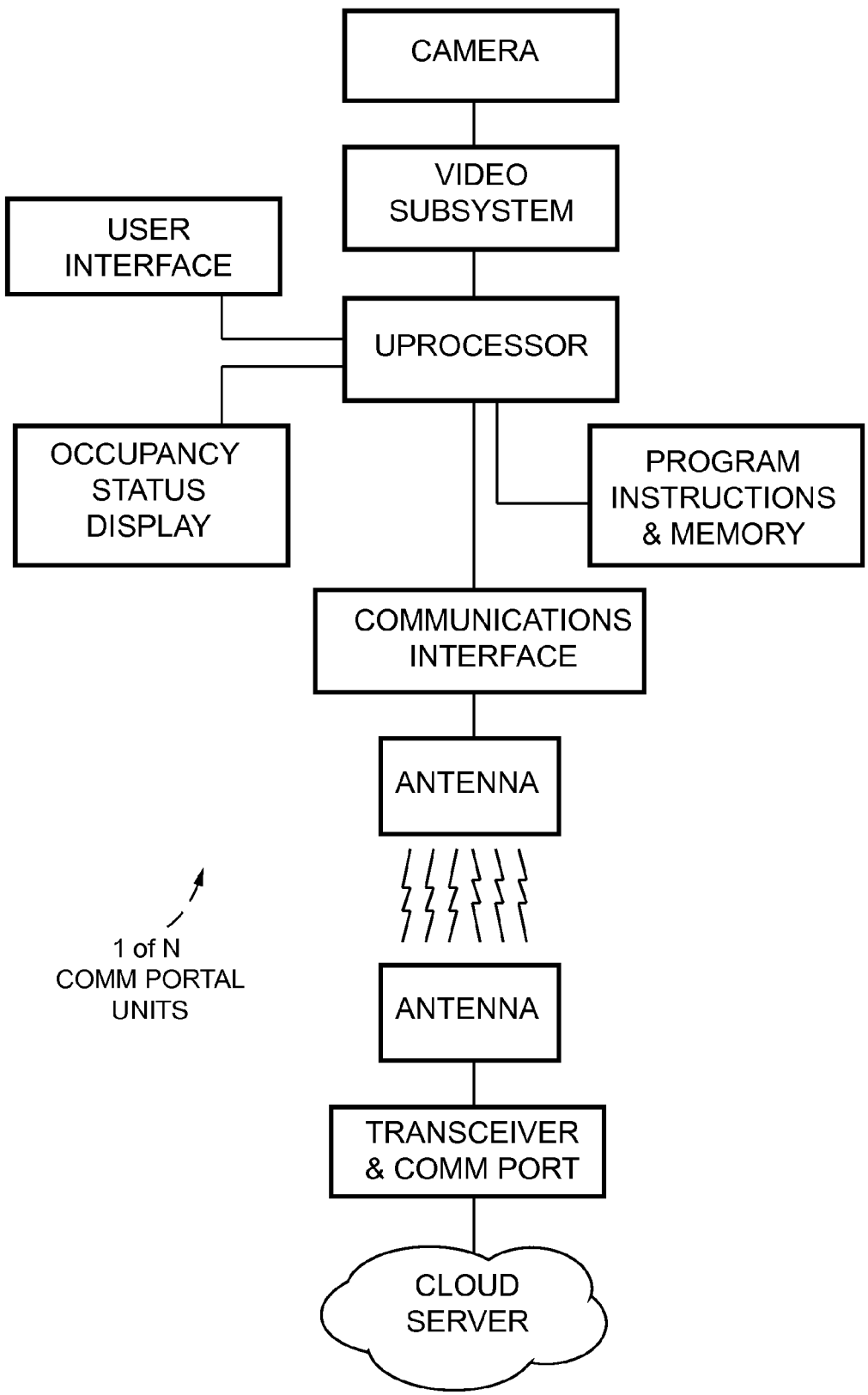
FIG. 18 is a block diagram of a parking apparatus with remote administrative components interconnected by radio to a cloud computing facility for distributed processing of data. A number of parking portals 1-N may be connected in a network to a host server or central hub, where N is an integer. The network therefor will include a sensor web of N sensors and a display/user interface web corresponding to the number of parking spaces under management. Alternatively, mesh networks may be formed.

FIG. 18 is a block diagram of a parking apparatus with remote administrative components interconnected by radio to a cloud computing facility (cloud server) for distributed processing of data. A number of parking portals 1-N may be connected in a network to a host server or central hub, where N is an integer. The network therefor will include a sensor web of N sensors and a display/user interface web corresponding to the number of parking spaces under management. Alternatively, mesh networks may be formed. Each parking portal includes a curbside user interface for handling payment transactions and fines and for displaying occupancy status and other helpful information such as regulations. Antennas for communicating to the cloud server are operated with WiFi radios transmitting and receiving in one of the UHF bands in the range of 800 MHz to 2.5 GHz, for example.

Figure 19A:
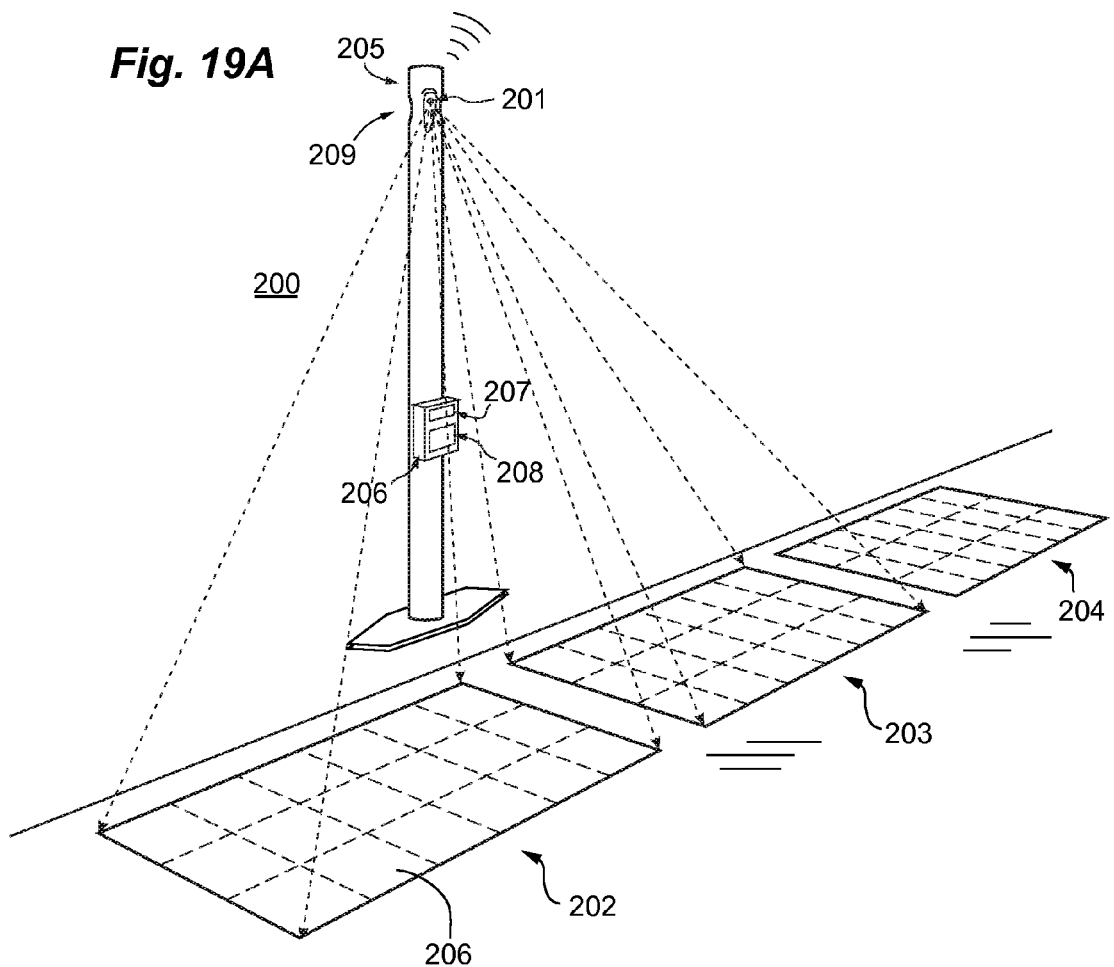
FIG. 19A is a perspective view of a second embodiment of a parking portal; a single portal unit with a camera and/or sensor is shown monitoring a pair of parking spaces.

FIG. 19A is a perspective view of a second embodiment of a parking portal. A single portal unit 200, provided here with a camera 201, is shown monitoring parking in a zone indicated by 202 and 203. Additional portal units may be installed to monitor additional zones such as space 204. Parallel parking is used in this example, although angle and lateral parking may also be used.

In this instance, only two parking spots are considered. Signage associated with the parking spaces is updated according to whether the parking spot is vacant or occupied. The parking signage or indications displayed are also dependent on allowable use factors, which include hours of the day, days of the week, special events, construction or maintenance, type of vehicle, and so forth. In this way, parking signage may be displayed with maximum flexibility according to demand and according to other factors so as to optimize usage, ensure collection of parking fees, and remotely initiate enforcement if there is a violation, such as by dispatching a tow truck electronically or taking a picture of the vehicle and issuing a ticket through the mail.

In a preferred embodiment, a CCD camera is used to discriminate between four states, i) a parking spot VACANT condition, ii) a parking spot OCCUPIED condition, iii) a vehicle ENTERING condition, and iv) a vehicle EXITING condition for each parking space. In more detail, the CCD camera can be described as having a physical image plane composed of an array of photosensors and a pixel image plane composed of an array of N by M pixels, each of which is an integer value. The physical image array and the pixel image array may have a one-to-one correspondence such that a point $[x_{im}, y_{im}]$ corresponds to a point on the pixel plane such that coordinates [x,y] are the corresponding coordinates of a point on the physical plane of the CCD chip. In use, rays of a visual image enter the camera optics and are projected onto the physical/pixel image plane such that the visual space in front of the camera lens is mapped as an array of pixels, and the array is stored electronically in a frame buffer or memory. A ray emitted from a subject, such as a reflection on a bumper of a vehicle, carries with it information which can be mapped onto the pixel plane; in short, the physical world is represented on the pixel plane. When a ray in the visual image changes in intensity or direction, there is a corresponding change in one or more numerical values in the frame buffer, and in this way, movement of a vehicle in front of the camera can be detected by an image analysis system that monitors numerical changes in the frame buffer array.

It is helpful to map a virtual grid onto the pixel image plane, breaking the overall visual field into a series of boxes so that any ray or rays of interest will fall into one box of the grid. When a ray changes its intensity or direction, the integer value of a corresponding pixel also changes, and this is reflected in a change in the numerical value of the box as a whole. A movement event can be inferred from that change. Thus each pixel in the pixel plane need not be remotely monitored, the detection of a movement event can be compressed into a change in a single numerical value in the buffer. When there is a change in a neighboring box, the image analysis system can infer a vector to the movement. With repeated measurements, direction and speed of motion can be inferred and the motion event is validated. Thus the camera is capable of obtaining three pieces of information: the presence of a moving object, the speed of the moving object, and the direction of motion. By varying the size of the grid on the image plane (i.e., the size of the "boxes"), complex visual information can be transmitted as a very small digital signal. This is useful when many events are being recorded simultaneously over a large network, because only signals from moving vehicles are of interest, and until motion is detected, it is desirable to suppress or ignore the visual information in the frame buffer of portal units having no new information.

When a motion event is detected, the virtual grid of the camera can be redrawn electronically to allow finer resolution so that direction and speed of motion can be more precisely measured, and if desired, a fully pixelated image can be captured and sent to a network or host server. This image could be used for example to determine a color and type of vehicle, or record a license plate or a VIN number. But it would be impractical to monitor parking spaces with a continuous stream of broadband megapixel images, so reducing the image complexity using an expandable virtual grid solves a significant technical problem. The system can represent a parking event with a binary signal—either there is motion detected by the camera that corresponds to a vehicle entering the parking space—or there is not. And the same occurs when the vehicle vacates the spot. Small bits of information are economically transmitted to and stored on a network administrative database in the form of tables. The intelligence to interpret the patterns of pixelation as motion and to infer changes in status of the parking space can be local (through programmable instructions supplied to a microprocessor associated with the camera and frame buffer) or remote (using a server on a network or using a cloud processing capability), but the system reduces a complex visual mosaic at any instant to a single truth table, having four binary values, where the truth table is termed here the availability status table.

| Parking Space ID: XXXYYY TIMESTAMP: YYYYMMMDDHHSSS | |
|---|---|
| Parking space vacant | T |
| Vehicle entering parking space | F |
| Parking space occupied | F |
| Vehicle exiting parking space | F |

Generally an image analysis system will start from a baseline image of a vacant parking space. Any change in a significant pixel value will trigger a motion analysis, and an analysis consistent with entry of a vehicle into the parking space would result in the change in the truth table as follows:

| Parking Space ID: XXXYYY TIMESTAMP: YYYYMMMDDHHSSS | |
|---|---|
| Parking space vacant | F |
| Vehicle entering parking space | T |
| Parking space occupied | T |
| Vehicle exiting parking space | F |

As shown in FIG. 19A, detection of motion can result in an activation of an image analysis subroutine. Dotted arrows represent corner rays of a visual field demarcating a designated parking space 202 and extending to camera lens 201. While initially, the entire parking space 202 is monitored so that the image is represented essentially as a single large "pixel" or "box", any change in that pixel or box value, such a reflection of a vehicle moving into the space, causes the camera image to be broken into smaller grid squares 206. If motion is confirmed in two or more of these smaller grid squares, a more detailed image of several kilobytes may be taken and transmitted to the host server. The less detailed grids provide direction of motion and speed, the larger image confirms that a vehicle has parked and the vehicle type and ID can be determined.

Figure 19B:
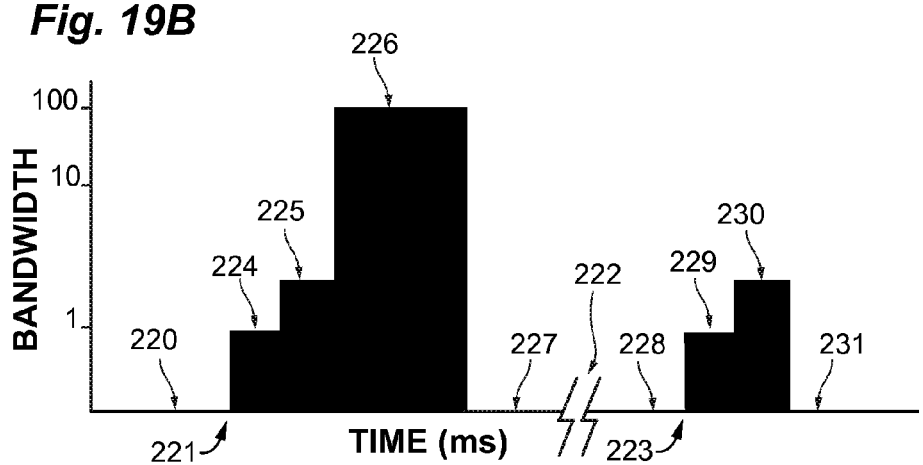
FIG. 19B is a plot of representing the bandwidth requirements during image transfer from a camera to a remote server during two consecutive detection events representing a vehicle entering the parking space, and subsequently vacating the space.

Taken together, FIGS. 19A and 19B also demonstrate pictographically how parking information is digitized in binary form in the parking monitoring and control method and transmitted by a communications module 205 for further processing. In FIG. 19B, a figurative view of data transmission bandwidth is shown. At initial baseline 220, imaging is suppressed and no motion is detected so the pixel value is a binary "0". Shown is a parking initiation event (221) in which a vehicle enters the parking space 202, and after an elapsed time (break, 222), exits (223). In the first event, an initial motion is detected by a change in the overall numerical value of the grid space 202. The initial transmission is a simple digital signal (224) and the processor responds by electronically dividing the parking space into a smaller virtual grid with cells 206. Changes in the pixel image plane for these individual cells carries information about direction and speed of motion that is transmitted at 225. For motion tracks meeting the criteria of a vehicle, a full image will be taken to verify that a vehicle has parked. A larger bandwidth for transmission of a full image is required 226, shown here with a logarithmic scale. The server will update the database to show that a vehicle occupies the parking space. In the interval 227/228 on timeline, the baseline bandwidth returns to quiescent, and a new resting pixel image plane is stored in the frame buffer. Periodically, this may be updated to account for shifts in the sun or weather conditions.

Then at 223, the vehicle moves out of the parking space. In this case the motion and direction is fairly simple to detect and no higher resolution image of the vehicle is needed. An initial signal and then speed and direction are transmitted at 229, 230 and the server updates the database to show that the parking space is vacant and available. The new baseline 231 returns the comm link to a quiescent state.

A user interface/display 207 (FIG. 19A) can include simple colored lenses and LED indicators, or more complex messaging displays including text. A useful LED display 208 will indicate which of the two spots monitored by the parking portal is active so that the user can pay for the correct parking spot. The user interface or interfaces will include input and output devices such as a touchscreen, smart card readers, a barcode reader, an RFID reader, switches or buttons, LED or LCD displays, a speaker, a microphone, a radio with embedded communications protocol, and a mobile phone link if desired. A credit card or smart card reader 209 may also be included. Also included if desired are a receipt printer, an input keypad, and even a help function with a microphone or full virtual keyboard and display screen. Thus displays can be visual or auditory. A red light on the user interface can indicate that the parking fee has not been paid, a green light that the parking fee has been paid, and so forth. Lighting segments 210 may also be included at the top of the pole so that parking availability is readily seen. Addressable colored lighting is an application of LED technology where a mix of colors is obtained by adjusting the output of primary colors such as described in U.S. Pat. Nos. 6,016,038, 6,528,954, and 6,788, 011, which are incorporated herein by reference. Sidewalk and street illumination may also be provided by the pole-mounted lighting segments or panels 210, and their operation may also be controlled by the host server.

As part of the display module, the user interface 207 associated with the portal is configured so that a user is provided with a display 208 that "points to" the spot corresponding to the location of the vehicle. A payment device 209 is provided to make a payment that will be credited to the corresponding individually addressable location in the database. Thus the system is capable of assigning the vehicles to their corresponding parking location through the user interface and accounting for payments using the same digital address. Alternate systems for crediting payment are possible where parking spots are not explicitly marked; for example a user carrying a mobile device can be tracked from a vehicle to the pay station and back to the vehicle so that the association between the payment and the vehicle may be made. Use of breadcrumbs for tracking was discussed above with reference to urban communication portals 10 of FIGS. 1-10 and that technology is also incorporated here by reference for parking portals 100 et seq.

The user interface or interfaces will optionally include input and output devices such as a touchscreen, microphone, speaker, a credit card scanner, smart card readers, a barcode reader, an RFID reader, switches or buttons, and LED display, and LCD display, a radioset with embedded communications protocol, and a mobile phone link or VOIP module if desired.

Displays can also be electronic signals, such as using electronic messaging to notify an incipient violator that the parking time is up, or prohibitive, such as if a user not having a handicapped placard attempts to park in a handicapped space, an auditory alarm or flashing light can be displayed before a ticket is issued.

Figure 20:
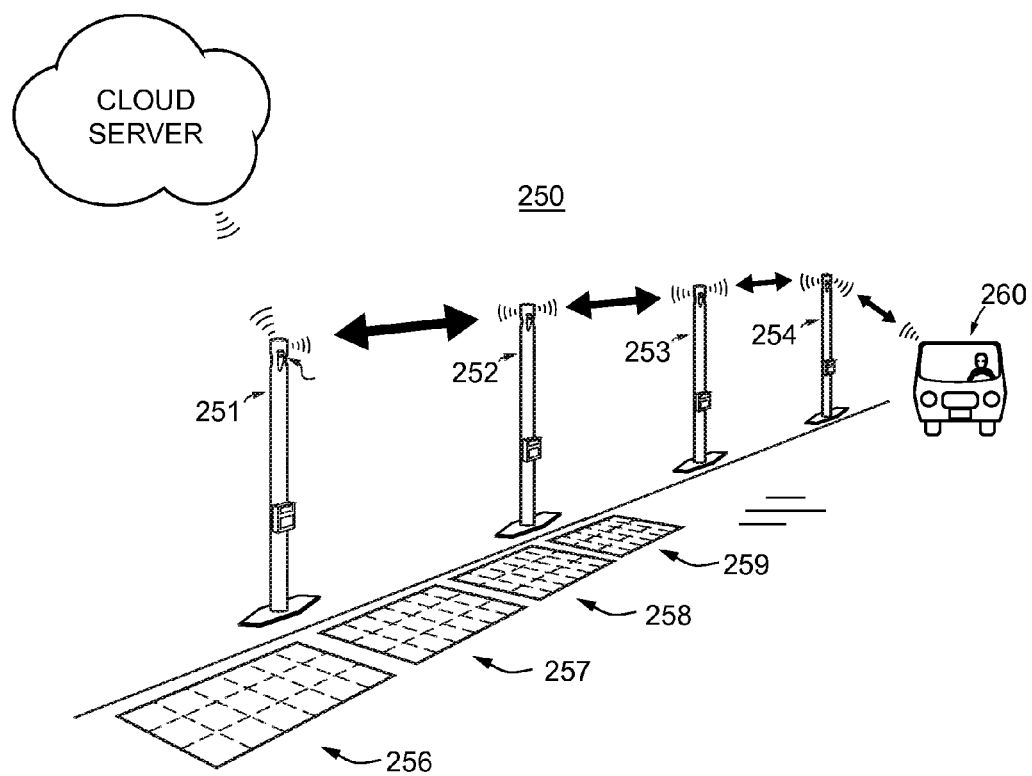
FIG. 20 depicts a network of portal units communicating as a mesh network and having one unit with communications protocol for communicating inputs from all the units to a cloud computing facility with host server.

FIG. 20 depicts a network of portal units communicating as a mesh network 250 and having one unit 251 with communications protocol for communicating inputs from all the mesh-linked units (252, 253, 254) to a cloud server 255 or central database. The mesh network may be homogeneous, having like transceiver units, or heterogeneous, having mixed transceiver units. In this instance, a vehicle 260 is in communication with the network. The portal units are positioned to monitor and control parking spaces 256, 257, 258 and 259. Other designated parking spaces may be added to the network as desired.

As operated, in a first step the driver accesses the remote server (such as with an API built into a mobile device) and queries the server about available parking spaces in his location. The mobile device may be enabled to transmit GPS coordinates, or the server can find the user by pinging the mobile device with transceivers in the parking portals. The remote server responds to the query by displaying directions to a suitable parking space on the mobile device. As the driver approaches the designated parking space, the parking portal may again ping the user to confirm the location and begin a payment process. The remote server may link directly to a browser interface open on the user's device or create a user interface through a communications link created by the parking portal network. The interface displays instructions for payment through a mobile payment service, so that payment is completed as the vehicle rolls to a stop in the parking space. Alternatively, the user may use a card reader provided on the portal display/user interface module at the curbside. When payment is completed, the portal displays an acknowledgement and sends data to the remote server that is used to update available parking inventory. A telephone number may also be exchanged with the server so that the server can contact the user when the parking meter time is about to expire. The server also provides parking space location information that the user can share with friends or associates through social media.

The server will monitor the parking space occupancy and will stop charges when the vehicle vacates the space, eliminating the worry about paying for more time than needed. When the parking space is vacated, the sensors will detect the vehicle as it leaves, and will update the administrative database to show that the parking space is again available for the next vehicle in need of parking.

In a variant on this process, a driver in proximity to a vacant parking spot may reserve the spot after selecting it on a display, and proceed directly to the spot to park by following directions downloaded from the remote server and displayed or vocalized on his portable device, such as a smart phone.

In other variants, radio units may supplement or replace cameras. A parking zone may be defined without individual parking stalls, instead forming a strip along the sidewalk where parking is permitted. Radio units may detect parked cars by changes in electronic fields in the parking area, and as inferred from motions of mobile devices such as cellphones where the motion pattern indicates a vehicle entering a parking space. These improvements are enabled by fine quality mapping of radio signals enabled by the parking portals of the invention.

As is known in the art, radios for modern mobile communications devices may be varied according to jurisdictions, but are generally UHF radios. For historical reasons, radio frequencies used for UHF networks differ in the Americas, Europe, Africa and Asia. For example 450 MHz is used extensively in Russia. In the United States, of the UHF spectrum, for a first approximation, cellphone signals are permitted in bands at 1.7 GHz, 2.1 GHz 1.9 GHz 0.85 GHz. The following frequency bands: 800, 1500, 1700, 1900, 2100, 2400, 2500 and 5000 MHz, are allotted for WiFi (WLAN per IEEE 802.11 protocols). Common WiFi frequencies include two bands: 2.4-2.483 GHz and 5.15-5.85 GHz. Each band may be broken into multiple channels, each of about 1-2 MHz. Bluetooth low energy radios (BLE) operate at 2.4 to 2.48 GHz and have a maximum signal strength of about 10 mW and hence can function for extended periods on battery power. The bands and corresponding antenna systems are selected to prevent crosstalk. Suitable antennas may be designed that are dual purpose, i.e., a single antenna operating to receive and transmit for example in the BLE band and one or more cellphone bands. Dual band antennas for both 2.4 GHz and 5 GHz are also available.

Advantageously, the higher range of frequencies in modern WLAN and BLE devices are associated with wavelengths small enough to do much more detailed mapping than conventionally available technologies. Within local areas, low energy transmissions may reach 100 m or more. A half-wavelength at 2.4 GHz is 2.5 inch (6.25 cm), and a half-wavelength at 5 GHz is 1.2 inch (or about 3 cm). Hence, using quarter-wavelength patch antennas allows radio suppliers to make miniature WiFi and BLE antennas. IFA (inverted F) antennas and PIFA (planar inverted F) antennas are representative of technologies that permit local area mapping at a scale sufficient so that positional accuracy is almost close enough that a user can turn their eyes and pick up a cup of coffee while watching the cup's position on a map mirrored to their mobile device from a portal having the face forward mapping capability provided by the invention. This is an advance in the art and is achieved by using two pairs of BLE radios (with precision antennas), one pair on each side of the housing of the portal, with sufficient separation so that the two individual signals, broadcast one after the other, may be triangulated by a common receiver, or inversely, a source broadcast may be triangulated by two BLE radio receivers, one on each side of the casing, separated by anywhere from 12 to 24 inches. In practice, a separation of 18 inches is sufficient.

With further development, rapid switching from broadcast to receive is expected to permit using a single radio on each side of the housing.

Thus proximity assessment is no longer limited to measuring signal strength, which is crude at best. Using the technology developed here, accuracy of a virtual map overlay with user mobile devices and beacons in the vicinity of a portal device will be about 6" and may be improved to about 1" in precision, close enough to reach into a visual map overlay and pick something up.

The radios of the portal in broadcast mode are sending signals perhaps every tenth of a second. Each one of them has a different identifier code. These are the signals that a mobile device sees when it enters the defined local area served by the portal. The mobile device may be set up through an application to watch for signals of this kind and to send the identifier(s) to the cloud administrative server, which will determine if the mobile device should monitor the signal(s) and send additional updates if the signals meet certain parameters of signal strength. The cloud server also sends a request to the mobile device to capture signals corresponding to both of the broadcast radios and their time stamp. The cloud server or the mobile device with navigational application, on receipt of this information, can triangulate a relative location of the mobile device with higher accuracy than other systems such as commercial GPS or cellphone tower triangulation. Generally the position coordinates of the portal devices are extensively calibrated during installation and is known with accuracy. When installed, portals are given directionality so that the administrative server may orient the display on a virtual map of the area so as to match its orientation in real space. This is termed "face forward mapping". The cloud server records the location of the mobile device and enters the location point on a virtual map overlayer of the defined local area map. The basic operating system of the mobile device allows this function to be performed at low power and with a relatively small bandwidth requirement. Those familiar with cellphone technology will recognize that mobile phones search for cellphone towers with high frequency and report signal strength as displayed on the phone after identifying the strongest cellphone tower signal. The functions of the operating system can be co-opted to seek particular broadcast antenna signals and to send their time stamp and identifiers to a cloud server associated with the portal. The cloud server may then close the loop by modifying the display on the sidewalk portal so as to recognize the guest associated with the mobile device, and further may download mirrored local content to the user's internet address, i.e., directly onto the user's display screen. That content is filtered for relevance and is filtered according to location, proximity, time, and user characteristics such as profile, keywords, user searches, user social media web pages, and so forth. Essentially the loop is closed when the mobile device has received the designated duplex signals, and sends a message to the cloud server indicating, "I'm here, now what?" In turn, the cloud server can engage the user, requesting the mobile device to alert the user that there is content waiting. When the user opens the navigational application, the current location is pinpointed on a scaleable vectored map, for example, and the app downloads a dynamic map overlayer that highlights relevant local content.

In practice, the sidewalk portal may also be configured to monitor position of guests. Receivers in the portal monitor radio signals transiting the defined local area. When a signal of interest is detected, each receiver can capture a timestamp of the guest signal. By transmitting this information to the cloud server, the administrative computer will calculate a location of the guest signal by combining the information from the two receivers, and will enter that location data as a breadcrumb in its database. This information can be supplemented with proximity data for particular beacons disposed on the pathway taken by the guests. Multiple guests may be tracked in this way. When a significant event is noted, such as a guest engages the portal, the host server will generate relevant content and display it to the sidewalk portal display or directly to the user's device, or the content can be mirrored from the portal to the user's mobile device. User's who initiate a contact soon learn that the information is dynamically updated, and may choose to refer to the virtual map overlay at frequent intervals so as to be informed about what's in the urban space around them.

And it is apparent that the same technology may be used to map parking, to map vehicles in the parking areas, and to contact users to collect parking fees, and to exercise enforcement when needed.

This technology also allows the cloud server to collect general information about pedestrian and vehicular traffic in a defined local area (or larger area networks served by multiple portals disposed throughout a neighborhood or downtown) and to refine locations of accessory beacons and highlighted places of interest by a process of quorum mapping, where data from the BLE triangulations, cellphone tower triangulations, and GPS readings are combined into a consensus view of the radio traffic in the area, so that a quorum map is superimposed on physical structures in the real world. For example, an entrance to the Post Office will appear as the trails of multiple users converge on an area, so that the virtual electronic pathway is validated by larger numbers of persons making the journey. In this way, aberrations of individual signals are averaged out.

The system can the point a guest down a sidewalk, putting their steps in line to avoid open manholes and construction zones, and even allowing the blind to make a journey through city streets by translating the sights into a series of verbalizations in an earpiece, or through a braille reader accessory.

Thus in another aspect the invention is an urban interface system having a capacity for forming closed loop cloud-based networks with guest users, which comprises (a) a cloud server; (b) a portal device wirelessly linked to the cloud server; (c) a mobile device wirelessly linked to the cloud server; further characterized in that; (i) the mobile device is configured with two radiosets and a dual-band antenna for transmitting and receiving in a first UHF cellular or WiFi band and in a second UHF BLE band; (ii) the portal device is configured with a pair of radiosets with separate antennae, each radioset for transmitting and broadcasting in the BLE band, where the broadcasting antennae are separated within a housing of the portal device by a linear distance that is a multiple or fraction of the wavelength of the BLE band that is sufficient for a mobile device having a capacity to timestamp a signal from each broadcasting antennae with sufficient accuracy to effect a triangulation of position of the mobile device relative to the portal device; and where the receiving antennae are separated with the housing of the portal device by a linear distance that is sufficient for the cloud server or local processor to effect a triangulation of position of the mobile device relative to the portal device. The network forms positional closed loops by identifying guests, locating the guests on a virtual map of the defined local area, sending the guests local content, and accepting feedback from the guests as to content of interest. In escort mode, the system will monitor the guest on a guided journey to a destination suggested by the local content displayed to the guest.

Figure 21:
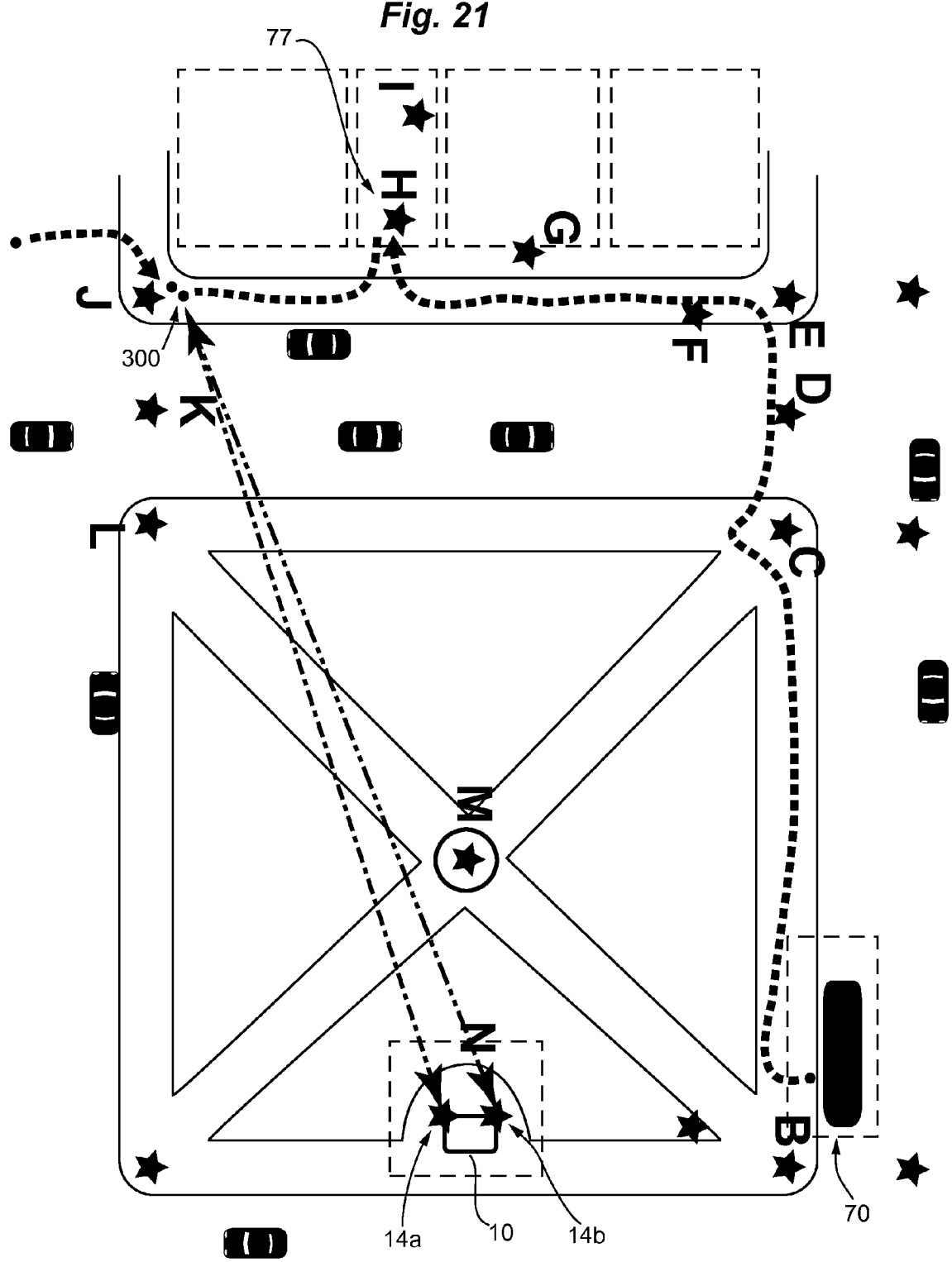
FIG. 21 is an example of an application for the radio location features of the inventive urban portals.

As an exemplary illustration, FIG. 21 shows the urban setting introduced in FIGS. 7 and 8A-8C. An urban communications portal 10 was illustrated in FIG. 2, but the exemplary technology also applies to the urban parking portals of FIGS. 11-20. In the view of FIG. 21, the pathway (bold dashed line) from the bus stop 70 is tracked by monitoring cell phone transmissions. The urban portal 10 includes two radios spaced so that a triangulation can be done. As shown here, a meeting point 300 is triangulated using BLE radio time stamps of two radiosets (14a, 14b) mounted contralaterally in the portal case. The dashed arrows point from the portal device to Jack's cell phone. The digital handshake is facilitated by the navigational application in the mobile device. The system has also been using breadcrumbs to track Jill's cellphone since it approached the town square, and predicts that Jack will intersect Jill's path at or near beacon J as Jack leaves the bakery (door 77a, beacon H) at 11:55.06.22 AM. The system reliably locates the two cell phone users and enables them to meet up on a busy urban street corner with an accuracy of a few inches using the navigational application. The system would have been equally able to arrange the meeting face to face if they had been strangers meeting for the first time and an appointment to meet at a restaurant close by was arranged for lunch. Similarly, if the two guests had similar interests, they could have both been directed to beacon N, where the display on the portal would show local content of likely interest to both. The system may also be used to map the local beacons (marked with stars) and to develop quorum maps of the sidewalks and roads by pooling user traffic. With this new level of precision, surprising reductions in the chaos of big city living are possible and unlike the prior art scene shown in FIG. 1, use of these technological gives users more opportunities to appreciate the urban scene around them.

While the above is a complete description of the preferred embodiments of the present invention, various alternatives, modifications and equivalents are possible. These embodiments, alternatives, modifications and equivalents may be combined to provide further embodiments of the present invention.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. It is to be understood that it is also within the scope of the invention to provide any computer, computer-system and/or computerized tool as is known by one of ordinary skill in the art that is designed, programmed or otherwise configured to perform any of the above-discussed methods, algorithms or processes.

Incorporation by Reference

All of the US patents, US patent application publications, US patent applications, foreign patents, foreign patent applications and non-patent publications referred to in this specification and related filings are incorporated herein by reference in their entirety.

Scope of Claims

Having described the invention with reference to the exemplary embodiments, it is to be understood that it is not intended that any limitations or elements describing the exemplary embodiments set forth herein are to be incorporated into the meanings of the patent claims unless such limitations or elements are explicitly listed in the claims. Likewise, it is to be understood that it is not necessary to meet any or all of the identified advantages or objects of the invention disclose herein in order to fall within the scope of any claims, since the invention is defined by the claims and inherent and/or unforeseen advantages of the present invention may exist even though they may not be explicitly discussed herein. In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited by the disclosure.

REFERENCE NUMBERS OF THE DRAWINGS

1 Urban grid
2 Park square
10 Urban Communications Portal
10a Urban portal node in virtual map layer
11 Pole mount
12 Short range radio
13 Antenna assembly
14, 14a, 14b Bluetooth low energy radiosets
15 GUI with touch screen
16 Protective hood or bib
17 First display panel 17a Video display screen
17b touch screen—GUI
18 second display panel
18a Video display screen
18b touch screen—GUI
19 Emergency alarm activation
20 Camera
21 Payment processing device or card reader
22 Solar panel
23 Emergency lights
24 Streetlamp
25 Schematic of urban portal device
26 Logic circuitry including processor and memory
26a Processor
27 Radio for linking to internet
28 A wireless relay
29 Administrative complex
29a Administrative server
30 Fiber optic or cable relay
31 Administrative database
32 Internet
33 Administrative user interface w/ login
34 Supplemental display features and user controls
35 Payment module
36 Environmental sensors
38 Beacon housed in urban portal device
39 Cloud with admin server and internet
40 Mobile device with dual band
41 Radio beacon network
42a, 42b, 42c Radio beacon
52 ROM memory
53 RAM memory
54 Memory utility
55 Video controller
56 Touchscreen controller
57 Sound controller
58 Speakers
60 Closed loop
61 Internet access portal
62 Host server
65 Mobile device
66 Radio beacon
67 Bicycle rider
70 Bus stop in virtual map overlayer
71 Bus
72 First user with mobile device
73 Second user with mobile device
74 First beacon
75 Second beacon
76 News stand in virtual map layer
77 Bakery in virtual map layer
77a Bakery door
78 Coffee shop in virtual map layer
79 Tailor shop in virtual map layer
80 Bookstore in virtual map layer
81 Fashion shop in virtual map layer
82 Restaurant in virtual map layer
83 Beacon associated with equestrian statue in town square
84 Capture step
85 Engagement step
86 Escort step
87 Portal server initiation and synchronization
88 Step to cycle local event updates and notices
89 Step to update dynamic virtual map overlayer on physical map
90 Step to push display cycle
91 Filter local content and offers before making notifications
92 Send notification or send mirror of displayed content
93 Detect radio transmission entering area
94 Establish handshake
95 Destination selection step
96 Pathfinder subroutine
97 Virtual map overlayer populated with dynamic local content
98 Tracking subroutine
99 Ping tabulation step
100 Parking portal apparatus
101 Sidewalk
102 Parking space
103 Sensor with protective cover
104 Vehicle
105 Vehicle license plate
106 display module with interactive user interface
107 Communications module with antenna
108 Solar panel
109 Curb-mounted sensor
110 Receptacle for curb-mounted sensor
111 First parking spot
112 Second parking spot
114 Lt indicator arrow
115 Rt indicator arrow
116 Selector switch
117 Lt signal panel
118 Rt signal panel
120 Modular parking portal apparatus
121 Detector module with radio
122 User interface module with radio
123 Cloud-based administrative module
124 Wireless radio link (extended range)
125 Alternate schematic
126 Integrated user interface, sensor and radio on motherboard
127 Optional components
128 Environmental sensors
129 Payment module
130 Street in an urban grid
131 Sidewalk
132 Parking portal
133 Parking portal
134 Parking portal
135 Parking portal
136 Truck
137 Vehicle
140 Urban boulevard
141a, 141b First traffic light pair
142a, 142b Second traffic light pair
143 First intersection
144 Second intersection
200 Urban parking portal
201 Camera
202 Parking zone/space
203 Parking zone
204 Parking zone
205 Communications module with antenna
206 Parking zone virtual grid unit
207 User interface/display
208 LED display
209 Payment module
210 Lighting segments
220 Initial baseline bandwidth usage
221 Parking initiation event
222 Break in timeline
223 Vehicle exit event detection
224 Low bandwidth signal 225 Medium bandwidth signal
226 Larger bandwidth imaging signal
227 Interval between parking and exiting
228 No activity
229 Low bandwidth signal
230 Confirmation of exit, parking space empty
231 New baseline—quiescent
250 Network
251 Parking portal with master comm radioset
252 Parking portal member of local network
253 Parking portal member of local network
254 Parking portal member of local network
256 Parking space or zone
257 Parking space or zone
258 Parking space or zone
259 Parking space or zone
260 Vehicle with wireless transceiver
300 Place of meeting

We claim:

1. An urban communications and service-providing system for networking one or more guest mobile devices, each mobile device having a unique address or handle identifiably associated with a guest user, a viewing screen, a memory for storing any keywords or records entered on the mobile device and for storing digital breadcrumbs, each breadcrumb defining data identifiably associated with a radio contact or ping and a timestamp, which comprises:
   a network having,
   a) an urban communications portal or portals:
   b) one or more non-satellite radio beacons in radio proximity to at least one said portal, each said radio beacon broadcasting a beacon ping, wherein said beacon ping is adapted to be identified as a radio contact by said portal and by one or more mobile devices of said network;
   c) an administrative server in communication with said portal, said server having at least one accessible database and search engine;
   and further, each said portal comprising:
   i) a body with housing;
   ii) a display screen, wherein said display screen is configured to display a map or map overlayer content;
   iii) a pair of low energy radio transceivers, each having a contralaterally disposed antenna adapted to be in communication with one or more mobile devices and said one or more beacons of said network within a defined area around said portal, said defined area having an outer boundary within which said communication is effective;
   iv) a processor with memory and program instructions, wherein said processor and instructions are configured to detect one or more mobile devices within range of said pair of low energy radio transceivers and to initiate a query to any detected mobile devices;
   and further, wherein said administrative server is configured to:
   i) receive said breadcrumbs from one or more mobile devices,
   ii) calculate a first position of at least one mobile device from timestamps associated with said breadcrumbs,
   iii) search said database or databases accessible to said administrative server for first local content related to said first position, proximity thereto, a keyword relating to said first position, a keyword in a database, a unique address or handle, a timestamp contained in said breadcrumbs, a user profile, any recent search or messaging activity, a mobile device record of the journey, a destination, a quorum map, a location of a radio beacon, any commercial content offering, or based on data entries directed at particular content, and to dynamically generate contextually relevant map content in response thereto; and,
   d) an application enabled to be operated on one or more mobile devices of said network, said application comprising instructions to
   i) upload said breadcrumbs to said administrative server in response to a query,
   ii) allow and establish a communication link with said urban communications portal and said administrative server,
   iii) trigger a display of a map of said first local content on at least one said display screen of said portal if a viewing screen of a mobile device is locked.

2. The system of claim 1, wherein said map is a quorum map generated by a quorum mapping function of said administrative server, wherein said quorum map is assembled from pooled data of previously recorded pathways captured from said network as trails of breadcrumbs through said defined area.

3. The system of claim 2, wherein said application comprises a pathfinder subroutine operated by said administrative server, said pathfinder subroutine operating to escort a user of a mobile device from said first position to a destination selected from said first local content, and to populate said map overlayers on a pathway taken by a user with other selected local content, and further wherein said pathfinder subroutine updates said map overlayers for one or more mobile devices according to a direction of motion of each mobile device through said defined area.

4. The system of claim 2, wherein one or more mobile devices are configured to detect a ping from one or more of said radio beacons disposed in said defined area, to create a breadcrumb defining a radio contact and timestamp for each of said radio contacts, and to relay said breadcrumbs as a trail of breadcrumbs to said administrative server.

5. The system of claim 4, wherein said administrative server is enabled to collect said trail of breadcrumbs from a plurality of mobile devices transiting said defined area, each trail of breadcrumbs defining a pathway, and to define a quorum map of said pathways, wherein said plurality of radio beacons are assigned map locations by proximity mapping, by triangulation mapping, and are further localized by said quorum mapping function.

6. The system of claim 5, wherein said system is enabled to detect traffic in said defined area and to analyze said traffic so as to refine at least one said map overlayer of said defined area.

7. The system of claim 5, wherein said map location of one said radio beacon triggers a display of local content on said display screen of said portal or on a viewing screen of a mobile device when said pathway is proximate to said map location.

8. The system of claim 2, wherein said map overlayers are generated based on relevancy to a guest user in control of a mobile device, wherein relevancy is computed by parsing any user profile, prior searches, social media posts, emails, messages, or keywords accessible on a mobile device, or by refining said search results.

9. The system of claim 2, wherein said map overlayers are generated based on offers associated with radio beacons in proximity to a mobile device.

10. The system of claim 1, wherein said system is enabled to access a user profile from an address or handle, and to push at least one notification or offer to a mobile device based on said user profile.

11. The system of claim 10, wherein said system is enabled to mirror said at least one notification onto said display screen of said portal when a mobile device is in proximity thereto.

* * * * *